(12) United States Patent
Nakamura et al.

(10) Patent No.: US 10,394,079 B2
(45) Date of Patent: Aug. 27, 2019

(54) LIQUID CRYSTAL DISPLAY PANEL

(71) Applicant: SHARP KABUSHIKI KAISHA, Sakai, Osaka (JP)

(72) Inventors: Kohzoh Nakamura, Sakai (JP); Kiyoshi Minoura, Sakai (JP); Akira Sakai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/559,823

(22) PCT Filed: Mar. 11, 2016

(86) PCT No.: PCT/JP2016/057799
§ 371 (c)(1),
(2) Date: Sep. 19, 2017

(87) PCT Pub. No.: WO2016/148067
PCT Pub. Date: Sep. 22, 2016

(65) Prior Publication Data
US 2018/0052351 A1    Feb. 22, 2018

(30) Foreign Application Priority Data

Mar. 19, 2015    (JP) .................. 2015-056557

(51) Int. Cl.
G02F 1/13363    (2006.01)
G02F 1/1343     (2006.01)
(Continued)

(52) U.S. Cl.
CPC ........ G02F 1/13363 (2013.01); G02F 1/1393 (2013.01); G02F 1/133528 (2013.01);
(Continued)

(58) Field of Classification Search
CPC .......... G02F 1/13363; G02F 1/134363; G02F 1/133528; G02F 1/1393
See application file for complete search history.

(56) References Cited

U.S. PATENT DOCUMENTS 7,446,838 B2 * 11/2008 Jeon ................. G02F 1/133634
349/117
2005/0068480 A1 * 3/2005 Hiyama ............. G02F 1/13363
349/119
(Continued)

FOREIGN PATENT DOCUMENTS

JP    2006-521570 A    9/2006
JP    2012-134475 A    7/2012
(Continued)

*Primary Examiner* — Dung T Nguyen
(74) *Attorney, Agent, or Firm* — ScienBiziP, P.C.

(57) ABSTRACT

A liquid crystal display panel (100) according to an embodiment includes: a first polarizer (22) and a first phase plate (32) on the viewer's side; and a second polarizer (24) and a second phase plate (34) on the rear face side. A liquid crystal layer, which takes a homogeneous alignment in the absence of an applied electric field, has a Δnd of not less than 360 nm and not more than 490 nm; a retardation R1 of the first phase plate is not less than 100 nm and not more than 160 nm; and a retardation R2 of the second phase plate is not less than 200 nm and not more than 360 nm. The slow axes of the first and second phase plates are substantially parallel to each other and substantially orthogonal to the azimuth direction of the director of the liquid crystal.

6 Claims, 41 Drawing Sheets

(51) Int. Cl.
*G02F 1/1335* (2006.01)
*G02F 1/139* (2006.01)
*G02F 1/137* (2006.01)

(52) U.S. Cl.
CPC .......... *G02F 1/134363* (2013.01); *G02F 2001/13712* (2013.01); *G02F 2001/133562* (2013.01); *G02F 2001/133567* (2013.01); *G02F 2001/133638* (2013.01); *G02F 2201/121* (2013.01); *G02F 2201/122* (2013.01); *G02F 2413/02* (2013.01); *G02F 2413/05* (2013.01); *G02F 2413/08* (2013.01)

(56) References Cited

U.S. PATENT DOCUMENTS

| | | |
|---|---|---|
| 2005/0110933 A1 | 5/2005 | Jeon et al. |
| 2012/0138922 A1 | 6/2012 | Yamazaki et al. |
| 2012/0218497 A1 | 8/2012 | Kajita |
| 2013/0320334 A1 | 12/2013 | Yamazaki et al. |
| 2014/0286076 A1 | 9/2014 | Aoki et al. |
| 2015/0177572 A1 | 6/2015 | Kita et al. |

FOREIGN PATENT DOCUMENTS

| | | |
|---|---|---|
| JP | 2012-173672 A | 9/2012 |
| JP | 2014-007399 A | 1/2014 |
| JP | 2014-209727 A | 11/2014 |
| WO | 2014/017364 A1 | 1/2014 |

* cited by examiner (a)

(b)

(c)

(a)

(b)

(c)

(a)

(b)

(c)

(a)

(b)

(c)

(a)

(b)

(c)

(a)

Φ=275°

(b)

Φ=320°

(a) Φ=175°

(b) Φ=220°

(c) Φ=265°

(a)

(b)

(a)

(b)

(c)

(a)

Φ=310°

(b)

Φ=355°

(a)

(b)

(c)

(a)

(b)

(c)

(a)

(b)

(c)

(a)

(b)

(c)

(a)

Φ=310°

(b)

Φ=355°

(a) Φ=40°

(b) Φ=85°

(c) Φ=130°

(a)

(b)

(c)

(a)

Φ=5°

(b)

Φ=50°

(c)

Φ=95°

(a)

(b)

(c)

(a)

(b)

(c)

(a)

(b)

(c)

(a) Φ=275°

(b) Φ=320°

(a)

(b)

(a)

(b)

(a)

(b)

LIQUID CRYSTAL DISPLAY PANEL

TECHNICAL FIELD

The present invention relates to a liquid crystal display panel, and more particularly to a liquid crystal display panel of a lateral electric field mode.

BACKGROUND ART

Liquid crystal display panels of lateral electric field modes, such as the In-Plane Switching (IPS) mode or the Fringe Field Switching (FFS) mode, have the advantage of smaller viewing angle dependence of γ (gamma) characteristics than in conventional liquid crystal display panels of vertical electric field modes (e.g., the VA mode). This has led to their use as medium- to small-sized liquid crystal display panels in particular.

On the other hand, as liquid crystal display panels increase in resolution, their pixel aperture ratio (i.e., a ratio of the total area of pixel apertures to the display region) becomes smaller, thus making it difficult to obtain sufficient display luminance. Of particular problem is the decrease in the contrast ratio when medium- to small-sized liquid crystal display panels for mobile applications are observed in a bright environment, e.g., outdoors.

A conventional remedy has been to increase the backlight luminance in order to enhance the display luminance, thus improving the contrast ratio. However, an increased backlight luminance induces a problem of increased power consumption, and thus any remedy that is based on increased backlight luminance has come near its limit.

One cause for the decreased contrast ratio of a liquid crystal display panel in a bright environment is reflection by the liquid crystal display panel. Accordingly, attempts have also been made to improve the contrast ratio by suppressing reflection by the liquid crystal display panel.

For example, Patent Document 1 discloses a liquid crystal display panel of the IPS mode, in which a phase plate (which may also be referred to as the "front phase plate") is provided between a linear polarizer (which may also be referred to as the "front linear polarizer") that is disposed on the viewer's side (which may also be referred to as the "front" side) and a liquid crystal cell, thus restraining light which has been reflected by the liquid crystal cell from going out to the viewer's side. The front phase plate is designed so that linearly polarized light which has been transmitted through the front linear polarizer becomes circularly polarized light that rotates in a first direction and enters the liquid crystal cell. In other words, the front linear polarizer and the front phase plate together function as a circular polarizer. When circularly polarized light is reflected (at an interface where the refractive index changes from small to large), a phase shift by n radians occurs in both the P wave and the S wave, whereby the direction of rotation is inverted. As a result, light which has been reflected by the liquid crystal cell (transparent substrate) becomes circularly polarized light whose direction of rotation is a second direction (being opposite to the first direction), and this circularly polarized light passes through the front phase plate to be converted into linearly polarized light, which is absorbed by the front linear polarizer.

The liquid crystal display panel of Patent Document 1 further includes a phase plate (which may also be referred to as the "rear phase plate") being disposed between a linear polarizer (which may also be referred to as the "rear linear polarizer") that is disposed on the backlight side (which may also be referred to as the "rear" side) and the liquid crystal cell. The rear phase plate is designed so that, when linearly polarized light that has been transmitted through the rear linear polarizer passes through the rear phase plate and the liquid crystal layer in a black displaying state, it becomes circularly polarized light whose direction of rotation is the second direction, which is opposite to the first direction. When circularly polarized light whose direction of rotation is the second direction passes through the front phase plate, it is converted into linearly polarized light, which is absorbed by the front polarizer. According to Patent Document 1, a liquid crystal display panel of the IPS mode is obtained which can provide a good image quality even in outdoor use.

CITATION LIST

Patent Literature

[Patent Document 1] Japanese Laid-Open Patent Publication No. 2012-173672

SUMMARY OF INVENTION

Technical Problem

However, the liquid crystal display panel described in Patent Document 1 has a problem in that light which is emitted from the backlight has a low efficiency of utilization. The liquid crystal display panel described in Patent Document 1 includes a circular polarizer also on the backlight side. Therefore, light which has entered the liquid crystal panel from the backlight is restrained from being reflected, and this hinders reuse of reflected light, i.e., by allowing light which has been reflected toward the backlight to be again reflected toward the liquid crystal display panel.

Moreover, a study by the inventors has led to the new finding that the γ characteristics (i.e., a relationship between the input gray scale level and the output gray scale level) of a liquid crystal display panel of a lateral electric field mode depend on the relationship between the direction of rotation of the director (liquid crystal molecules) of the liquid crystal and the azimuth direction of the slow axis of the circular polarizer on the viewer's side, and retardations of the liquid crystal layer and the phase plate. The liquid crystal display panel of Patent Document 1 does not factor these in, hence resulting in the problem of the γ characteristics having large viewing angle dependence.

The present invention has been made in order to solve the aforementioned problems, and an objective thereof is to provide a liquid crystal display panel of a lateral electric field mode which provides a higher-than-conventional efficiency of utilization for light that is emitted from a backlight, a high photopic contrast ratio, and/or little viewing angle dependence of the γ characteristics.

Solution to Problem

A liquid crystal display panel according to an embodiment of the present invention comprises: a liquid crystal cell including a lower substrate, an upper substrate on a viewer's side of the lower substrate, a liquid crystal layer provided between the lower substrate and the upper substrate, and an electrode pair formed on one of the lower substrate and the upper substrate to generate a lateral electric field across the liquid crystal layer; a first polarizer disposed on the viewer's side of the liquid crystal cell; a first phase plate disposed between the liquid crystal layer and the first polarizer; a second polarizer disposed on a rear face side of the liquid crystal cell; and a second phase plate disposed between the second polarizer and the liquid crystal layer, wherein, the liquid crystal layer contains nematic liquid crystal, and takes a homogeneous alignment in the absence of an applied electric field, such that $\Delta nd$ is not less than 360 nm and not more than 490 nm, where $\Delta n$ is a birefringence of the nematic liquid crystal and d is a thickness of the liquid crystal layer; a retardation R1 of the first phase plate is not less than 100 nm and not more than 160 nm; a retardation R2 of the second phase plate is not less than 200 nm and not more than 360 nm; and a slow axis of the first phase plate and a slow axis of the second phase plate are substantially parallel to each other, and substantially orthogonal to an azimuth direction of a director of the nematic liquid crystal under a homogeneous alignment.

In one embodiment, the liquid crystal display panel has a plurality of pixels, wherein a structure corresponding to each of the plurality of pixels has a region in which an azimuth direction of the director, an azimuth direction of the lateral electric field, and azimuth directions of the slow axes of the first and second phase plates are set so that the director of the nematic liquid crystal on the lower substrate is rotated in a left-handed direction by the lateral electric field, and light which has passed through the first phase plate from the viewer's side becomes left-handed circularly polarized light or left-handed elliptically polarized light; or the director of the nematic liquid crystal on the lower substrate is rotated in a right-handed direction by the lateral electric field, and light which has passed through the first phase plate from the viewer's side becomes right-handed circularly polarized light or right-handed elliptically polarized light.

In one embodiment, the nematic liquid crystal has a negative dielectric anisotropy, and the region accounts for 38% or more of the pixel aperture in area ratio.

In one embodiment, the nematic liquid crystal has a positive dielectric anisotropy, and the region accounts for 45% or more of the pixel aperture in area ratio.

In one embodiment, $\Delta nd$ of the liquid crystal layer is essentially equal to a sum R1+R2 of the retardation R1 of the first phase plate and the retardation R2 of the second phase plate.

In one embodiment, the retardation R2 of the second phase plate is not less than 220 nm and not more than 330 nm.

In one embodiment, the electrode pair includes a pixel electrode having a plurality of rectangular apertures extending in parallel to one another, and a common electrode formed opposite to the pixel electrode with a dielectric layer interposed therebetween; and L+S is not less than 4 μm and not more than 8 μm, where S is a width of the aperture and L is a distance between adjacent ones of the apertures.

In one embodiment, L/S is more than 40/60 but not more than 55/45.

In one embodiment, the nematic liquid crystal has a negative dielectric anisotropy.

Advantageous Effects of Invention

According to an embodiment of the present invention, there is provided a liquid crystal display panel of a lateral electric field mode which provides a higher-than-conventional efficiency of utilization for light that is emitted from a backlight, a high photopic contrast ratio, and/or little viewing angle dependence of the characteristics.

DESCRIPTION OF EMBODIMENTS

Figure 1:
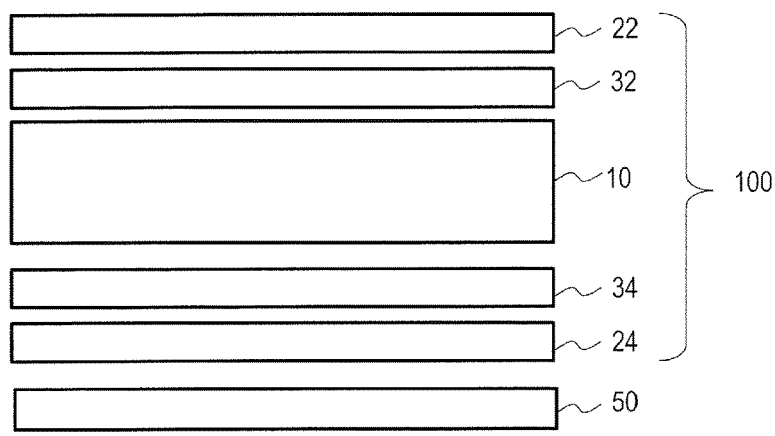
FIG. 1 (a) is a schematic exploded cross-sectional view of a liquid crystal display panel 100 according to Embodiment 1 of the present invention, where a backlight 50 is also shown; (b) shows a schematic cross section of a portion corresponding to one pixel in a liquid crystal cell 10 of the liquid crystal display panel 100; and (c) is a schematic plan view of a portion corresponding to one pixel in the liquid crystal cell 10.
Figure 1:
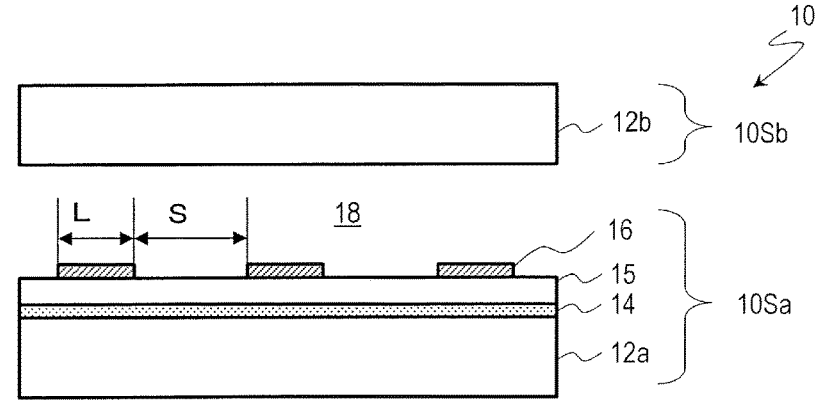
Figure 1:
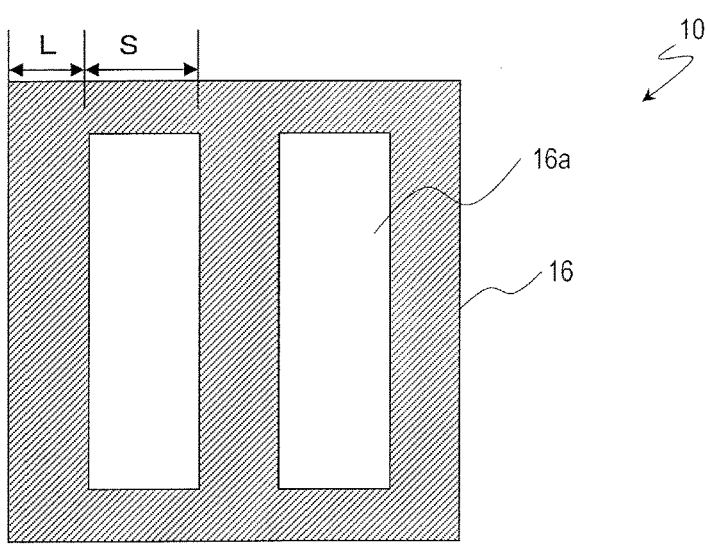

A liquid crystal display panel according to an embodiment of the present invention includes: a liquid crystal cell including a lower substrate (which is a rear substrate provided on the backlight side, e.g., a TFT substrate), an upper substrate (a substrate on the viewer's side, e.g., a color filter substrate), a liquid crystal layer provided between the lower substrate and the upper substrate, an electrode pair formed on one of the lower substrate and the upper substrate to generate a lateral electric field across the liquid crystal layer; a first polarizer disposed on the viewer's side of the liquid crystal cell; a first phase plate disposed between the liquid crystal layer and the first polarizer; a second polarizer disposed on the rear face side of the liquid crystal cell; and a second phase plate disposed between the second polarizer and the liquid crystal layer. Hereinafter, a liquid crystal display panel according to an embodiment of the present invention will be specifically described with respect to an exemplary liquid crystal display panel having a TFT substrate as the lower substrate, which lower substrate has an electrode pair to generate a lateral electric field across the liquid crystal layer. Alternatively, the upper substrate may be a TFT substrate, and the upper substrate may have the electrode pair to generate a lateral electric field across the liquid crystal layer. A liquid crystal display panel according to an embodiment of the present invention is a liquid crystal display panel of a lateral electric field mode such as the IPS mode or the FFS mode.

The liquid crystal layer contains nematic liquid crystal, and takes a homogeneous alignment in the absence of an applied electric field. As used herein, a homogeneous alignment encompasses both of: an alignment in which pretilt directions as regulated by an alignment film on the lower substrate and by an alignment film on the upper substrate, which are provided in contact with the liquid crystal layer, are parallel to each other; and an alignment in which these are antiparallel to each other.

Assuming that the nematic liquid crystal has a birefringence Δn and the liquid crystal layer has a thickness d, Δnd is not less than 360 nm and not more than 490 nm; a retardation R1 of the first phase plate is not less than 100 nm and not more than 160 nm; a retardation R2 of the second phase plate is not less than 200 nm and not more than 360 nm; and the slow axis of the first phase plate and the slow axis of the second phase plate are substantially parallel to each other, and substantially orthogonal to the azimuth direction of the director of the nematic liquid crystal under a homogeneous alignment.

The first phase plate is typically a ¼ wave plate (λ/4 plate). As the wavelength λ, 550 nm is used. This is because, in general design practice, 550 nm which is associated with the highest sensitivity of the human eye is adopted as the wavelength λ.

The second phase plate is typically a ½ wave plate (λ/2 plate). A ½ wave plate causes the polarization direction of linearly polarized light, whose polarization direction constitutes an angle α with respect to the slow axis thereof, to be rotated by 2α. As is described in Patent Document 1, when a ¼ wave plate (λ/4 plate) is used as the second phase plate, reflection of light entering the liquid crystal panel from the backlight is suppressed, and this hinders reuse of reflected light, i.e., by allowing light which has been reflected toward the backlight to be again reflected toward the liquid crystal display panel. On the other hand, if a ½ wave plate (λ/2 plate) is disposed as the second phase plate, e.g., so that the polarization direction of linearly polarized light which has passed through the second polarizer makes 45° with respect to the slow axis of the ½ wave plate, only a 90° rotation of the polarization direction (polarization plane) of linearly polarized light will occur, thus making it possible to reuse the reflected light.

Typically, Δnd of the liquid crystal layer is a ¾ wavelength (3λ/4=412.5 nm), which is equal to a sum R1+R2 of the retardation R1 of the first phase plate (typically, λ/4=137.5 nm) and the retardation R2 of the second phase plate (typically, λ/2=275.0 nm). The slow axis of the first phase plate and the slow axis of the second phase plate are disposed so as to be substantially parallel to each other and substantially orthogonal to the azimuth direction of the director of the nematic liquid crystal under a homogeneous alignment (corresponding to the slow axis of the liquid crystal layer). Through such setting, good black displaying can be attained in the absence of an applied voltage (NB mode). Since the slow axis of the first phase plate and the slow axis of the second phase plate are substantially orthogonal to the slow axis of the liquid crystal layer in the absence of an applied voltage, their retardations counteract each other. Thus, when Δnd is equal to R1+R2, Δnd in the absence of an applied voltage across the liquid crystal layer and R1+R2 cancel each other, so that there is substantially zero retardation.

As will later be illustrated by simulation results, without being limited to the aforementioned typical scenario, reflection of light entering the liquid crystal display panel from the viewer's side can be suppressed, and displaying with a high contrast ratio is possible, so long as: Δnd of the liquid crystal layer is not less than 360 nm and not more than 490 nm; the retardation R1 of the first phase plate is not less than 100 nm and not more than 160 nm; and the retardation R2 of the second phase plate is not less than 200 nm and not more than 360 nm.

Furthermore, a pixel structure in a liquid crystal display panel according to an embodiment of the present invention has a region in which the azimuth direction of the director, the azimuth direction of the lateral electric field, and the azimuth directions of the slow axes of the first and second phase plates are set so that the following Condition (1) or (2) is satisfied. Note that a "pixel structure" refers to a structure in a liquid crystal display panel whose outer edge is defined by a pixel, as the pixel is viewed from the normal direction of the display surface of the liquid crystal display panel.

Condition (1): the director of the nematic liquid crystal near the lower substrate is rotated in a left-handed direction by a lateral electric field, and light which has passed through the first phase plate from the viewer's side becomes left-handed circularly polarized light or left-handed elliptically polarized light.

Condition (2): the director of the nematic liquid crystal near the lower substrate is rotated in a right-handed direction by a lateral electric field, and light which has passed through the first phase plate from the viewer's side becomes right-handed circularly polarized light or right-handed elliptically polarized light.

As will later be illustrated by simulation results, viewing angle dependence of the γ characteristics (relationship between the input gray scale level and the output gray scale level) can be improved when the azimuth direction of the director, the azimuth direction of the lateral electric field, and the azimuth directions of the slow axes of the first and second phase plates are set so that Condition (1) or (2) is satisfied. The inventors had not predicted this effect, and it was found through simulations.

In the Examples illustrated below, the operation and effect will be described with respect to liquid crystal display panels in which the entire pixel aperture satisfies Condition (1) or (2); however, the effect of improving viewing angle dependence of the γ characteristics can be obtained even if it is not necessarily the entire pixel aperture that satisfies Condition (1) or (2). When the nematic liquid crystal has a negative dielectric anisotropy, the area ratio of the region that satisfies Condition (1) or (2) to the pixel aperture is preferably e.g. 38% or more. When the nematic liquid crystal has a positive dielectric anisotropy, the area ratio of the aforementioned region to the pixel aperture is preferably e.g. 45% or more. In the present specification, the portion in a pixel through which light that contributes to displaying is transmitted is specifically referred to as a "pixel aperture". For example, when the edge portion of the pixel electrode is shielded from light by a black matrix, the aperture in the black matrix defines the pixel aperture.

Types of liquid crystal display panels of lateral electric field modes are known such that two or more liquid crystal domains with different alignment directions exist within the pixel (so-called multidomain structure). In such a pixel, it is possible to improve the viewing angle dependence of the γ characteristics even if only a region(s) corresponding to fewer than all liquid crystal domains satisfies Condition (1) or (2).

Also, phase plates in which regions with different azimuth directions of the slow axis exist (which may also be referred to as "patterned phase plates") are known. When a patterned phase plate is used, it is possible to improve the viewing angle dependence of the γ characteristics even if only a partial region of the pixel aperture satisfies Condition (1) or (2). Furthermore, by combining a patterned phase plate and pixels of multidomain structure, it may be ensured that a partial or the entire region of the pixel aperture satisfies Condition (1) or (2). Note that a patterned phase plate may in some cases be formed within the liquid crystal cell.

Hereinafter, with reference to the drawings, the structure and characteristics of a liquid crystal display panel according to an embodiment of the present invention will be described. Note that embodiments of the present invention are not limited to the illustrated liquid crystal display panel.

With reference to FIG. 1, the structure of a liquid crystal display panel 100 according to an embodiment of the present invention will be described. FIG. 1(*a*) is a schematic exploded cross-sectional view of the liquid crystal display panel 100 according to an embodiment of the present invention, where a backlight 50 is also shown; FIG. 1(*b*) shows a schematic cross section of a portion corresponding to one pixel in a liquid crystal cell 10 of the liquid crystal display panel 100; and FIG. 1(*c*) is a schematic plan view of a portion corresponding to one pixel in the liquid crystal cell 10.

As shown in FIG. 1(*a*), the liquid crystal display panel 100 includes the liquid crystal cell 10, a first polarizer 22 disposed on the viewer's side of the liquid crystal cell 10, a first phase plate 32 disposed between the liquid crystal cell 10 and the first polarizer 22, a second polarizer 24 disposed on the rear face side of the liquid crystal cell 10, and a second phase plate 34 disposed between the second polarizer 24 and the liquid crystal cell 10. It suffices if the first phase plate 32 and the second phase plate 34 are provided, respectively, between the first polarizer 22 and the liquid crystal layer 18 and between the second polarizer 24 and the liquid crystal layer 18, and the first phase plate 32 and the second phase plate 34 may be provided within the liquid crystal cell 10.

As shown in FIG. 1(b), the liquid crystal cell 10 includes a first substrate 10Sa, a second substrate 10Sb, and the liquid crystal layer 18 provided between the first substrate 10Sa and the second substrate 10Sb. The first substrate 10Sa includes a transparent substrate 12a, a common electrode 14 formed on the transparent substrate 12a, a dielectric layer 15 formed on the common electrode 14, and a pixel electrode 16 formed on the dielectric layer 15. As necessary, a protection film and/or an alignment film are formed on the liquid crystal layer 18 side of the pixel electrode 16. The first substrate 10Sa may also include a thin film transistor (hereinafter referred to as a "TFT") for supplying a display signal voltage to the pixel electrode 16, and a gate bus line and a source bus line for supplying the signal voltage to the TFT (none of these is shown). The first substrate 10Sa includes an electrode pair to generate a lateral electric field across the liquid crystal layer 18; herein, the common electrode 14 and the pixel electrode 16 constitutes an electrode pair. As shown in FIG. 1(c), the pixel electrode 16 has a plurality of rectangular apertures 16a extending in parallel to one another. The liquid crystal cell 10 is a liquid crystal cell of the FFS mode. The second substrate 10Sb includes a transparent substrate 12b. On the liquid crystal layer 18 side of the transparent substrate 12b, for example, a color filter layer and/or an alignment film may be formed (none of these is shown). Without being limited to the illustrated construction, the FFS mode liquid crystal display panel according to an embodiment of the present invention is broadly applicable to known FFS mode liquid crystal display panels. For example, the relative positioning between the common electrode 14 and the pixel electrode 16 may be the opposite.

First, with respect to the liquid crystal display panel 100, it will be described how viewing angle dependence of the γ characteristics can be improved by adopting either of the following constructions: (1) the director of the nematic liquid crystal near the first substrate 10Sa is rotated in a left-handed direction by a lateral electric field, and light which has passed through the first phase plate from the viewer's side becomes left-handed circularly polarized light or left-handed elliptically polarized light; and (2) the director of the nematic liquid crystal near the first substrate 10Sa is rotated in a right-handed direction by a lateral electric field, and light which has passed through the first phase plate from the viewer's side becomes right-handed circularly polarized light or right-handed elliptically polarized light.

Figure 2:
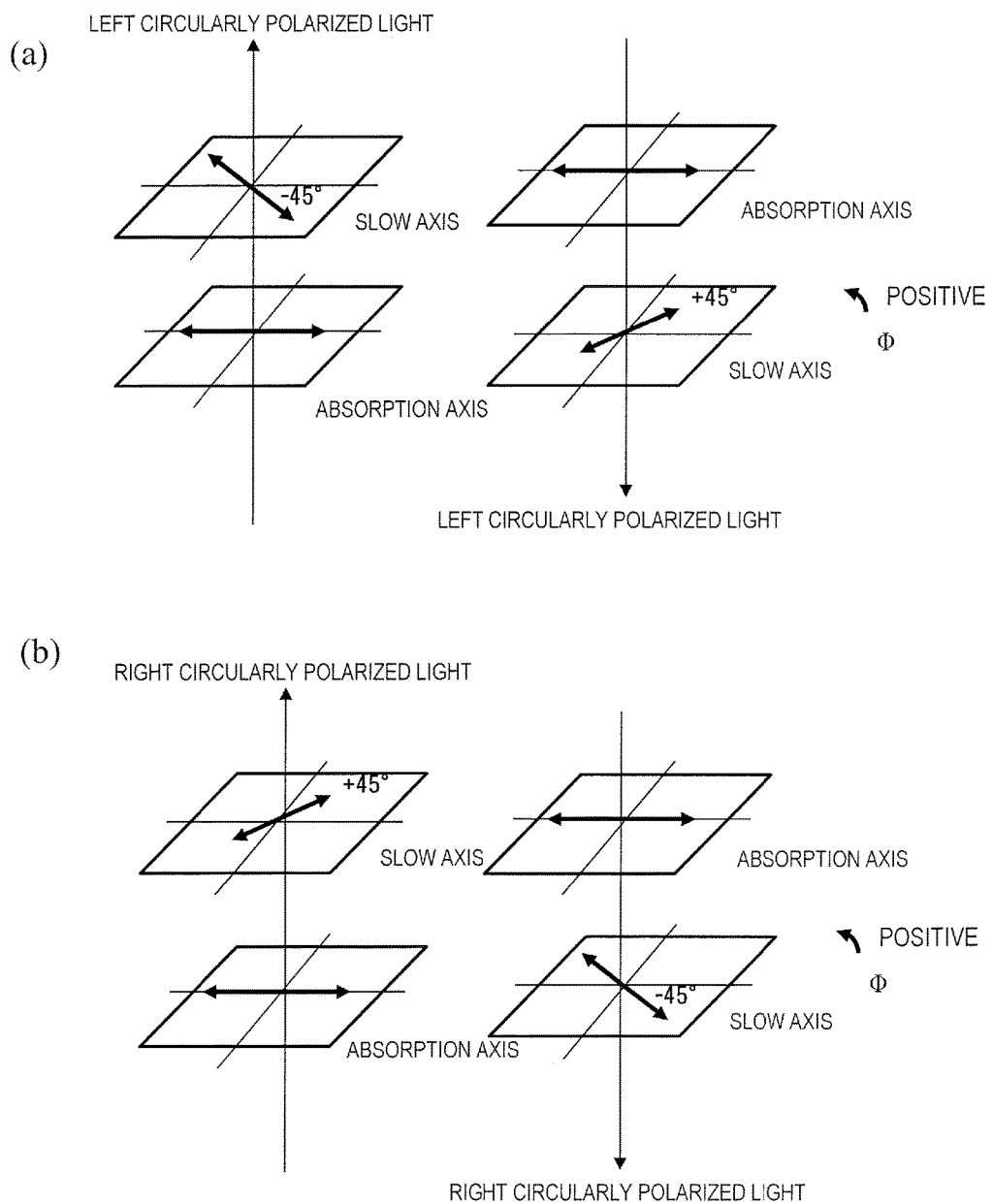
FIG. 2 (a) is a diagram showing relative positioning, in the case where a linear polarizer and a λ/4 plate are used in combination to generate right-handed circularly polarized light, of the absorption axis (orthogonal to the polarization axis=the transmission axis) of the polarizer and the slow axis of the λ/4 plate; and (b) is diagram showing relative positioning, in the case where a linear polarizer and a λ/4 plate are used in combination to generate left-handed circularly polarized light, of the absorption axis of the polarizer and the slow axis of the λ/4 plate.

Now, right-handed circularly polarized light and left-handed circularly polarized light are defined as follows. Any circularly polarized light is referred to as right-handed circularly polarized light (or right circularly polarized light) if the direction of rotation of the electric field vector of the circularly polarized light is clockwise in the direction of travel; and any circularly polarized light is referred to as left-handed circularly polarized light (or left circularly polarized light) if the direction of rotation of the electric field vector of the circularly polarized light is counterclockwise in the direction of travel. FIGS. 2(a) and 2(b) show relative positioning of the absorption axis (orthogonal to the polarization axis=the transmission axis) of the polarizer and the slow axis of the λ/4 plate, FIG. 2(a) showing the case where a linear polarizer and a λ/4 plate are used in combination to generate left-handed circularly polarized light, and FIG. 2(b) showing the case where a linear polarizer and a λ/4 plate are used in combination to generate right-handed circularly polarized light. In the present specification, as shown in FIGS. 2(a) and (b), the azimuth angle Φ is based on the 3 o'clock direction on the face of the clock being 0°, where counterclockwise is defined as positive.

A direction that the director of the nematic liquid crystal near the first substrate 10Sa is rotated by a lateral electric field is defined as the direction of the rotation of the director of the liquid crystal being rotated by the lateral electric field as being viewed from the viewer's side.

The typical scenario is assumed for the retardations of the liquid crystal layer 18, the first phase plate 32 and the second phase plate 34. In other words, Δnd of the liquid crystal layer 18 is 3λ/4=412.5 nm; the retardation R1 of the first phase plate 32 is λ/4=137.5 nm; and the retardation R2 of the second phase plate 34 is λ/2=275.0 nm; thus, Δnd=R1+R2 holds true. It was assumed that the birefringence Δn of the nematic liquid crystal material was 0.111, and that the thickness d of the liquid crystal layer 18 Was 3.716 μm.

Herein, nematic liquid crystal having a negative dielectric anisotropy was used. The nematic liquid crystal had a dielectric anisotropy Δε of −3.2. Using nematic liquid crystal having a negative dielectric anisotropy provides the following advantages. When a voltage is applied to an electrode pair to generate a lateral electric field across the liquid crystal layer, not only a lateral electric field (i.e., an electric field in the horizontal direction; an electric field which is parallel to the plane of the liquid crystal layer) but also (e.g., near the edge of the electrode pair) a vertical electric field component is generated in the liquid crystal layer. Since molecules of the nematic liquid crystal having a positive dielectric anisotropy are aligned so that the major axes (which is assumed to be parallel to the director) of the molecules are parallel to the electric field, the liquid crystal molecules will erect in regions with a strong vertical electric field component, whereby decrease or unevenness of retardation may occur within the plane of the liquid crystal layer. On the other hand, since molecules of nematic liquid crystal having a negative dielectric anisotropy are aligned so that the major axes of the molecules is orthogonal to the electric field, the liquid crystal molecules will not significantly erect even in regions with a strong vertical electric field component, thus maintaining an alignment which is parallel to the plane of the liquid crystal layer. Therefore, by using nematic liquid crystal having a negative dielectric anisotropy, it is possible to enhance transmittance and display quality.

Moreover, the width S of the aperture 16a of the pixel electrode 16 was 3.3 μm, the distance L between the aperture 16a and the edge of the pixel electrode 16 was 2.7 μm. In other words, there was a slit structure such that L+S was 6.0 μm and L/S was 2.7 μm/3.3 μm=45/55. The dielectric layer 15 had a thickness of 100 nm, and its relative dielectric constant was 6.

For the constructions (Examples 1-1, 1-2, Comparative Examples 1-1, 1-2) shown in Table 1 below, a graph of viewing angle dependence of the γ characteristics was determined with respect to various azimuth angles through simulation. LCDMaster2-D (manufactured by SHINTECH, INC.) was used for the simulation. Table 1 also indicates pass/fail judgments for viewing angle dependence based on the simulation results. Given an input level of 0.5, the viewing angle dependence was determined to be large (X) if an output level at a polar angle of 30° had a fluctuation over ±10% with respect to an output level at a polar angle of 0°.

TABLE 1

|  | Example 1-1 | Example 1-2 | Comparative Example 1-1 | Comparative Example 1-2 |
|---|---|---|---|---|
| rotation direction of circularly polarized light on viewer's side | left | right | right | left |
| rotation direction of LC director under applied voltage | left | right | left | right |
| viewing angle dependence of γ characteristics | ◯ | ◯ | X | X |

Figure 3:
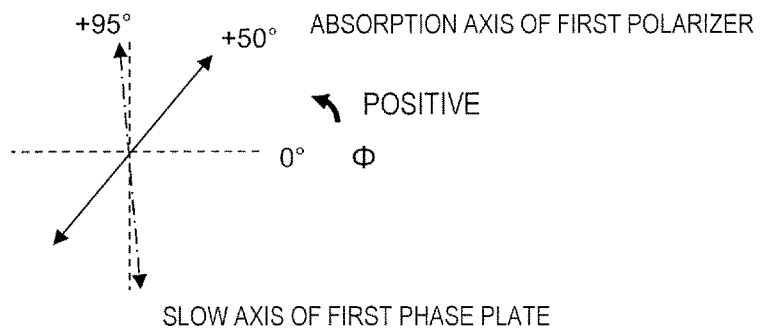
FIG. 3 Diagrams schematically showing the construction of a liquid crystal display panel according to Example 1-1, where (a) is a schematic diagram showing a relationship between the absorption axis of a first polarizer 22 and the slow axis of a first phase plate 32; (b) is a schematic diagram showing a relationship between the director of nematic liquid crystal and the direction of a lateral electric field, and a direction in which a liquid crystal molecule is rotated by the lateral electric field; and (c) is a schematic diagram showing a relationship between the absorption axis of a second polarizer 24 and the slow axis of a second phase plate 34.
Figure 3:
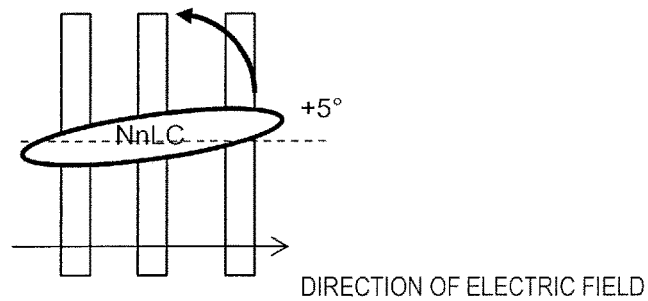
Figure 3:
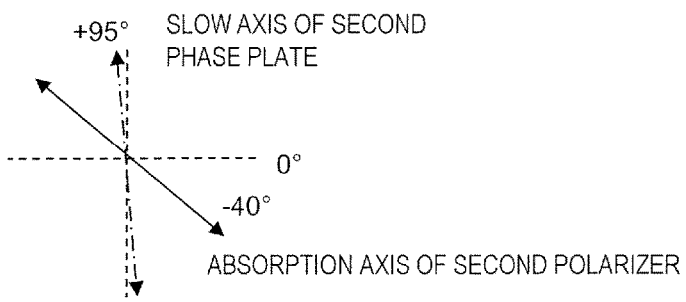

FIG. 3 schematically shows the construction of the liquid crystal display panel according to Example 1-1. FIG. 3(a) is a schematic diagram showing a relationship between the absorption axis of the first polarizer 22 and the slow axis of the first phase plate 32; FIG. 3(b) is a schematic diagram showing a relationship between the director of the nematic liquid crystal and the direction of a lateral electric field, and a direction in which a liquid crystal molecule near the lower substrate is rotated by a lateral electric field; and FIG. 3(c) is a schematic diagram showing a relationship between the absorption axis of the second polarizer 24 and the slow axis of the second phase plate 34. Each diagram illustrates a relationship as viewed from the viewer's side.

In the absence of an applied voltage, the director of the nematic liquid crystal having a negative dielectric anisotropy (NnLC) (which is parallel to the major axis of a liquid crystal molecule represented as an ellipse) is aligned so as to constitute an angle of 5° with respect to the direction of the lateral electric field (azimuth angle 0°), as is shown in FIG. 3(b). When the lateral electric field is applied, the director of the nematic liquid crystal having a negative dielectric anisotropy is aligned so as to be orthogonal to the direction of the electric field, and therefore is rotated in the counterclockwise direction (left-handed rotation), as indicated by the arrow.

The slow axis of the first phase plate 32 and the slow axis of the second phase plate 34 are disposed so as to be orthogonal (azimuth angle 95°) to the director of the liquid crystal (azimuth angle 5°), as are shown in FIGS. 3(a) and (c), respectively.

As shown in FIG. 3(a), the absorption axis of the first polarizer 22 is disposed so as to constitute 45° (azimuth angle 50°) with respect to the director of the liquid crystal (azimuth angle 5°). As shown in FIG. 3(c), the absorption axis of the second polarizer 24 is disposed so as to constitute −45° (azimuth angle −40°) with respect to the director of the liquid crystal (azimuth angle 5°). The absorption axis of the first polarizer 22 and the absorption axis of the second polarizer 24 are orthogonal (in crossed Nicols).

Note that the aforementioned angles depend on the accuracy of attachment during the assembly process of the liquid crystal display panel, for example, and therefore deviate from their design values. Each angle tolerates an error of approximately ±1°. In the present specification, when it is said that two directions are "substantially orthogonal", for example, it is meant that an error of ±1° is tolerated for each of the two directions, such that the two directions may constitute an angle of not less than 88° and not more than 92°. Errors are also tolerated of retardations. For example, the thickness of the liquid crystal layer and the retardations of the phase plates have manufacturing variations. Errors of such retardations are approximately ±3 nm. Therefore, Δnd, R1 and R2 each tolerate an error of ±3 nm from its design value. The same will also apply hereinafter.

Figure 4:
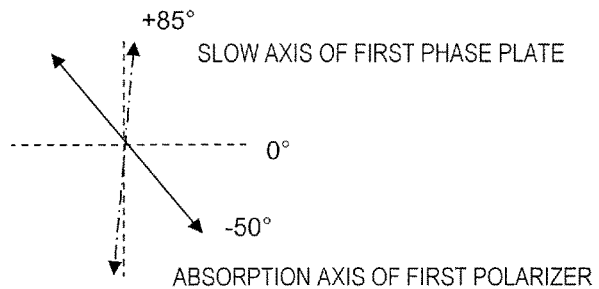
FIG. 4 Diagrams schematically showing the construction of a liquid crystal display panel according to Example 1-2, where (a) is a schematic diagram showing a relationship between the absorption axis of a first polarizer 22 and the slow axis of a first phase plate 32; (b) is a schematic diagram showing a relationship between the director of nematic liquid crystal and the direction of a lateral electric field, and a direction in which a liquid crystal molecule is rotated by the lateral electric field; and (c) is a schematic diagram showing a relationship between the absorption axis of a second polarizer 24 and the slow axis of a second phase plate 34.
Figure 4:
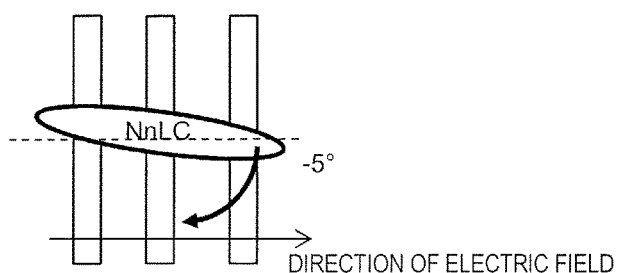
Figure 4:
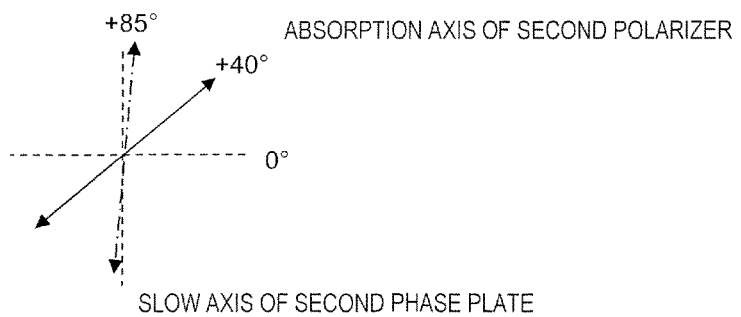

FIG. 4 schematically shows the construction of the liquid crystal display panel according to Example 1-2. FIG. 4(a) is a schematic diagram showing a relationship between the absorption axis of the first polarizer 22 and the slow axis of the first phase plate 32; FIG. 4(b) is a schematic diagram showing a relationship between the director of nematic liquid crystal and the direction of a lateral electric field, and a direction in which a liquid crystal molecule is rotated by the lateral electric field; and FIG. 4(c) is a schematic diagram showing a relationship between the absorption axis of the second polarizer 24 and the slow axis of the second phase plate 34. Each diagram illustrates a relationship as viewed from the viewer's side.

In the absence of an applied voltage, the director of the nematic liquid crystal having a negative dielectric anisotropy (NnLC) is aligned so as to constitute an angle of −5° with respect to the direction of the lateral electric field (azimuth angle 0°), as is shown in FIG. 4(b). When the lateral electric field is applied, the director of the nematic liquid crystal having a negative dielectric anisotropy is aligned so as to be orthogonal to the direction of the electric field, and therefore is rotated in the clockwise direction (right-handed rotation), as indicated by the arrow.

The slow axis of the first phase plate 32 and the slow axis of the second phase plate 34 are disposed so as to be orthogonal (azimuth angle 85°) to the director of the liquid crystal (azimuth angle −5°), as are shown in FIGS. 4(a) and (c), respectively.

As shown in FIG. 4(a), the absorption axis of the first polarizer 22 is disposed so as to constitute −45° (azimuth angle −50°) with respect to the director of the liquid crystal (azimuth angle −5°). As shown in FIG. 4(c), the absorption axis of the second polarizer 24 is disposed so as to constitute 45° (azimuth angle 40°) with respect to the director of the liquid crystal (azimuth angle −5°). The absorption axis of the first polarizer 22 and the absorption axis of the second polarizer 24 are orthogonal (in crossed Nicols).

Figure 5:
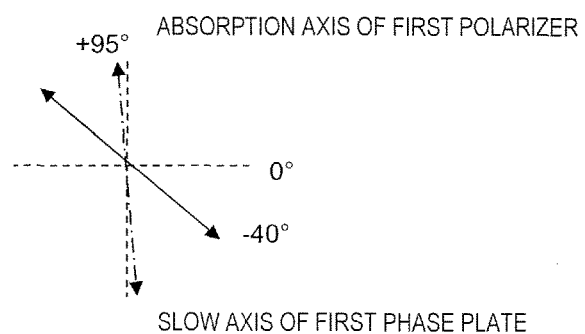
FIG. 5 Diagrams schematically showing the construction of a liquid crystal display panel according to Comparative Example 1-1, where (a) is a schematic diagram showing a relationship between the absorption axis of a first polarizer 22 and the slow axis of a first phase plate 32; (b) is a schematic diagram showing a relationship between the director of nematic liquid crystal and the direction of a lateral electric field, and a direction in which a liquid crystal molecule is rotated by the lateral electric field; and (c) is a schematic diagram showing a relationship between the absorption axis of a second polarizer 24 and the slow axis of a second phase plate 34.
Figure 5:
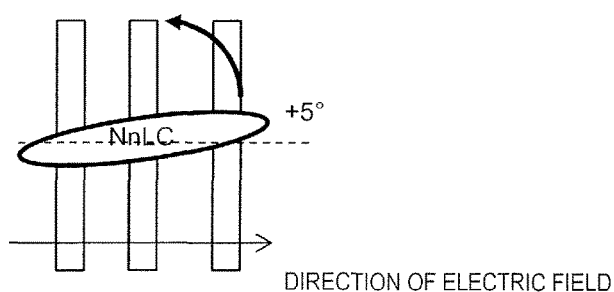
Figure 5:
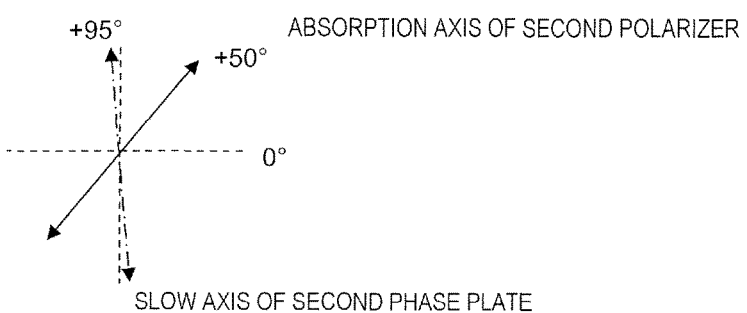

FIG. 5 schematically shows the construction of the liquid crystal display panel according to Comparative Example 1-1. FIG. 5(a) is a schematic diagram showing a relationship between the absorption axis of the first polarizer 22 and the slow axis of the first phase plate 32; FIG. 5(b) is a schematic diagram showing a relationship between the director of nematic liquid crystal and the direction of a lateral electric field, and a direction in which a liquid crystal molecule is rotated by the lateral electric field; and FIG. 5(c) is a schematic diagram showing a relationship between the absorption axis of the second polarizer 24 and the slow axis of the second phase plate 34. Each diagram illustrates a relationship as viewed from the viewer's side.

In the absence of an applied voltage, the director of the nematic liquid crystal having a negative dielectric anisotropy (NnLC) is aligned so as to constitute an angle of 5° with respect to the direction of the lateral electric field (azimuth angle 0°), as is shown in FIG. 5(b). When the lateral electric field is applied, the director of the nematic liquid crystal having a negative dielectric anisotropy is aligned so as to be orthogonal to the direction of the electric field, and therefore is rotated in the counterclockwise direction (left-handed rotation), as indicated by the arrow.

The slow axis of the first phase plate 32 and the slow axis of the second phase plate 34 are disposed so as to be orthogonal (azimuth angle 95°) to the director of the liquid crystal (azimuth angle 5°), as are shown in FIGS. 5(*a*) and (*c*), respectively.

As shown in FIG. 5(*a*), the absorption axis of the first polarizer 22 is disposed so as to constitute −45° (azimuth angle −40°) with respect to the director of the liquid crystal (azimuth angle 5°). As shown in FIG. 5(*c*), the absorption axis of the second polarizer 24 is disposed so as to constitute 45° (azimuth angle 50°) with respect to the director of the liquid crystal (azimuth angle 5°). The absorption axis of the first polarizer 22 and the absorption axis of the second polarizer 24 are orthogonal (in crossed Nicols).

Figure 6:
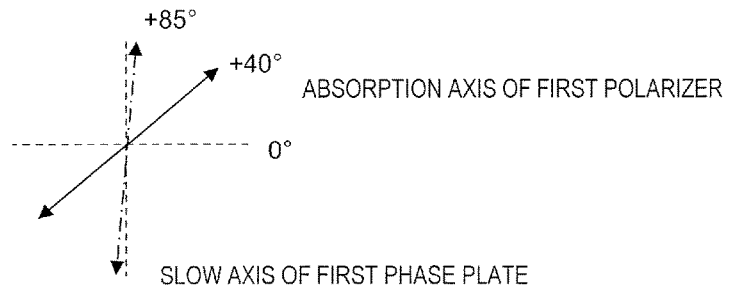
FIG. 6 Diagrams schematically showing the construction of a liquid crystal display panel according to Comparative Example 1-2, where (a) is a schematic diagram showing a relationship between the absorption axis of a first polarizer 22 and the slow axis of a first phase plate 32; (b) is a schematic diagram showing a relationship between the director of nematic liquid crystal and the direction of a lateral electric field, and a direction in which a liquid crystal molecule is rotated by the lateral electric field; and (c) is a schematic diagram showing a relationship between the absorption axis of a second polarizer 24 and the slow axis of a second phase plate 34.
Figure 6:
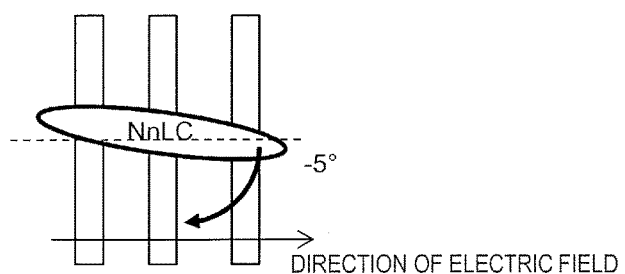
Figure 6:
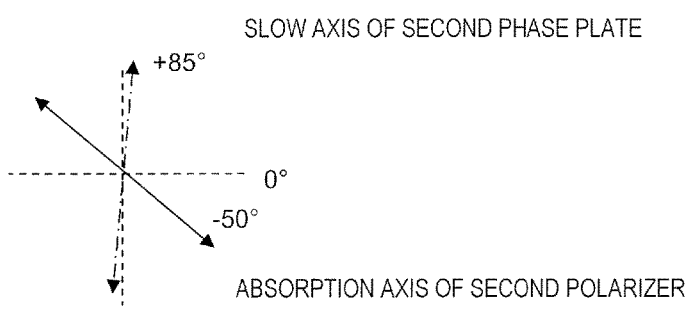

FIG. 6 schematically shows the construction of the liquid crystal display panel according to Comparative Example 1-2. FIG. 6(*a*) is a schematic diagram showing a relationship between the absorption axis of the first polarizer 22 and the slow axis of the first phase plate 32; FIG. 6(*b*) is a schematic diagram showing a relationship between the director of nematic liquid crystal and the direction of a lateral electric field, and a direction in which a liquid crystal molecule is rotated by the lateral electric field; and FIG. 6(*c*) is a schematic diagram showing a relationship between the absorption axis of the second polarizer 24 and the slow axis of the second phase plate 34. Each diagram illustrates a relationship as viewed from the viewer's side.

In the absence of an applied voltage, the director of the nematic liquid crystal having a negative dielectric anisotropy (NnLC) is aligned so as to constitute an angle of −5° with respect to the direction of the lateral electric field (azimuth angle 0°), as is shown in FIG. 6(*b*). When the lateral electric field is applied, the director of the nematic liquid crystal having a negative dielectric anisotropy is aligned so as to be orthogonal to the direction of the electric field, and therefore is rotated in the clockwise direction (right-handed rotation), as indicated by the arrow.

The slow axis of the first phase plate 32 and the slow axis of the second phase plate 34 are disposed so as to be orthogonal (azimuth angle 85°) to the director of the liquid crystal (azimuth angle −5°), as are shown in FIGS. 6(*a*) and (*c*), respectively.

As shown in FIG. 6(*a*), the absorption axis of the first polarizer 22 is disposed so as to constitute 45° (azimuth angle 40°) with respect to the director of the liquid crystal (azimuth angle −5°). As shown in FIG. 6(*c*), the absorption axis of the second polarizer 24 is disposed so as to constitute −45° (azimuth angle −50°) with respect to the director of the liquid crystal (azimuth angle −5°). The absorption axis of the first polarizer 22 and the absorption axis of the second polarizer 24 are orthogonal (in crossed Nicols).

Figure 7A:
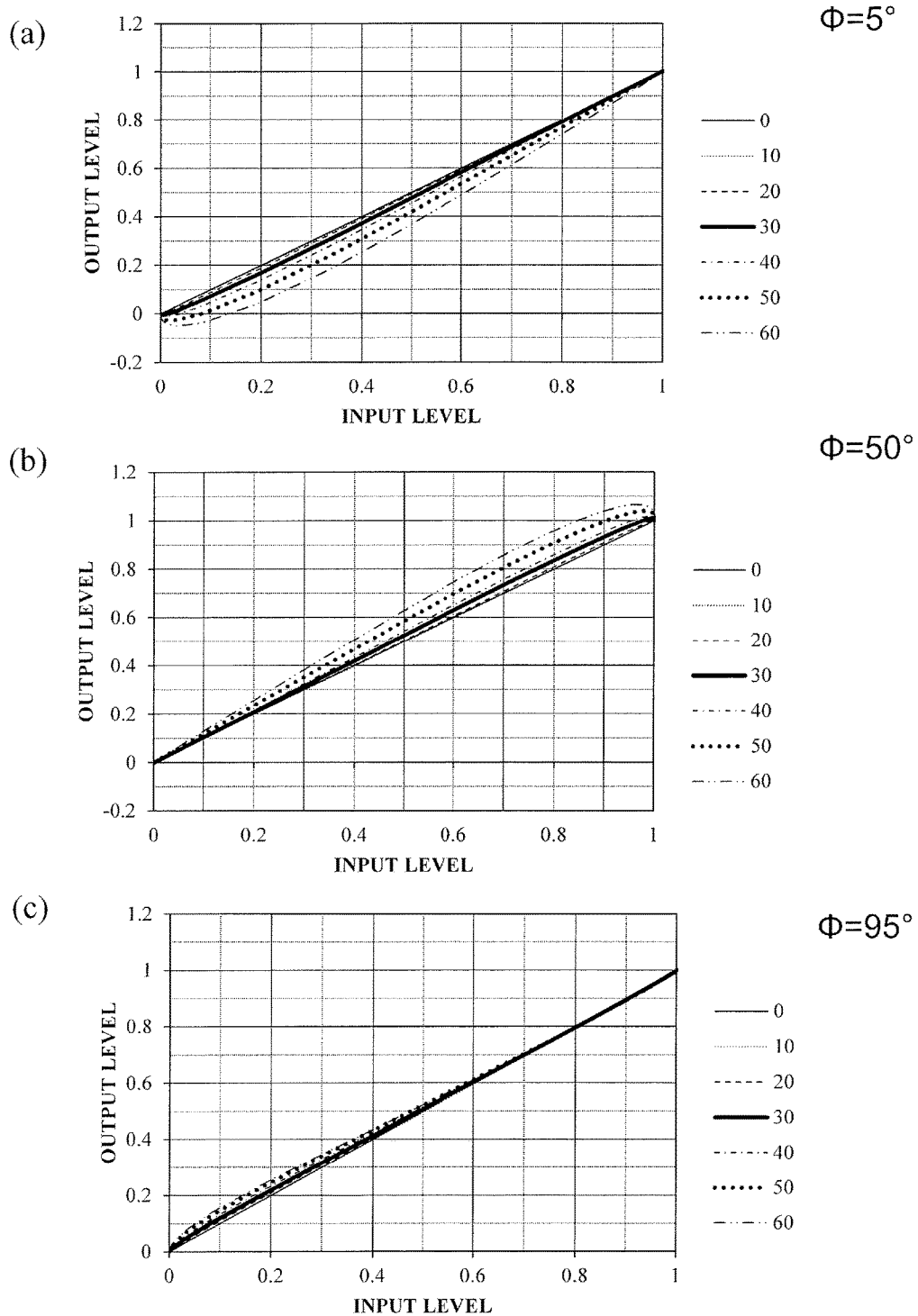
FIG. 7A A graph showing viewing angle dependence of the γ characteristics of the liquid crystal display panel according to Example 1-1 (where the azimuth angle Φ is 5°, 50°, 95°).
Figure 7B:
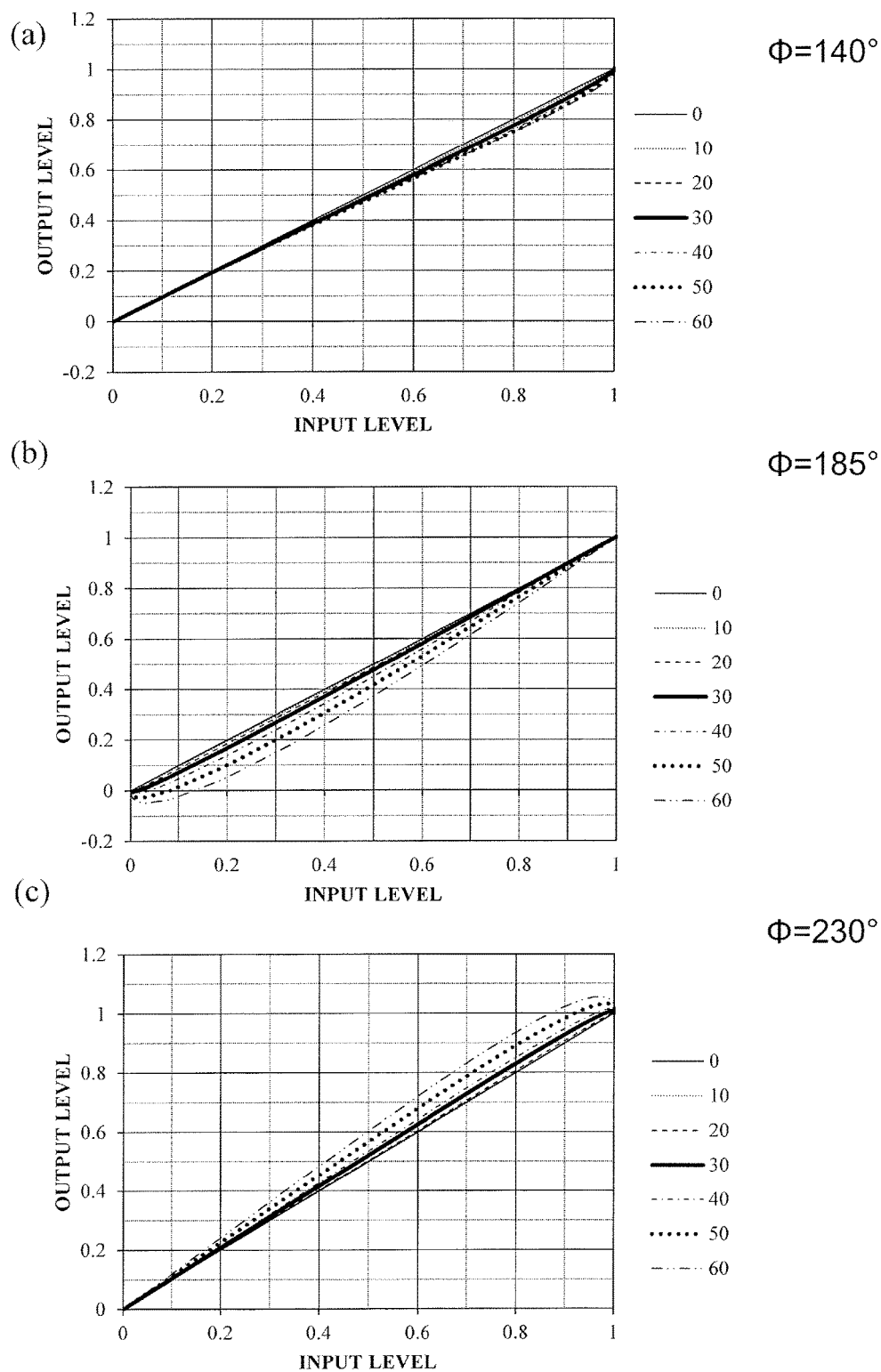
FIG. 7B A graph showing viewing angle dependence of the γ characteristics of the liquid crystal display panel according to Example 1-1 (where the azimuth angle Φ is 140°, 185°, 230°).
Figure 7C:
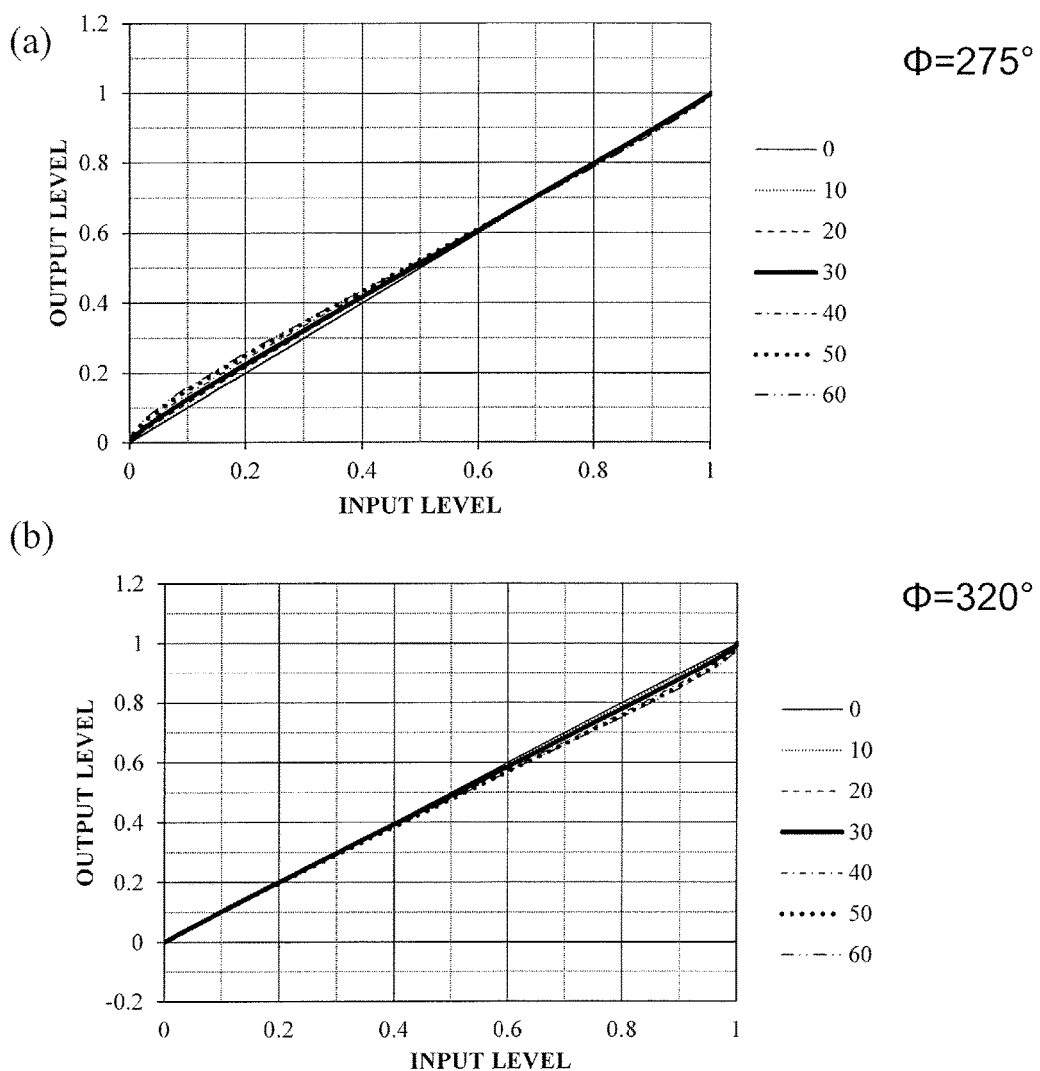
FIG. 7C A graph showing viewing angle dependence of the γ characteristics of the liquid crystal display panel according to Example 1-1 (where the azimuth angle Φ is 275°, 320°).
Figure 8A:
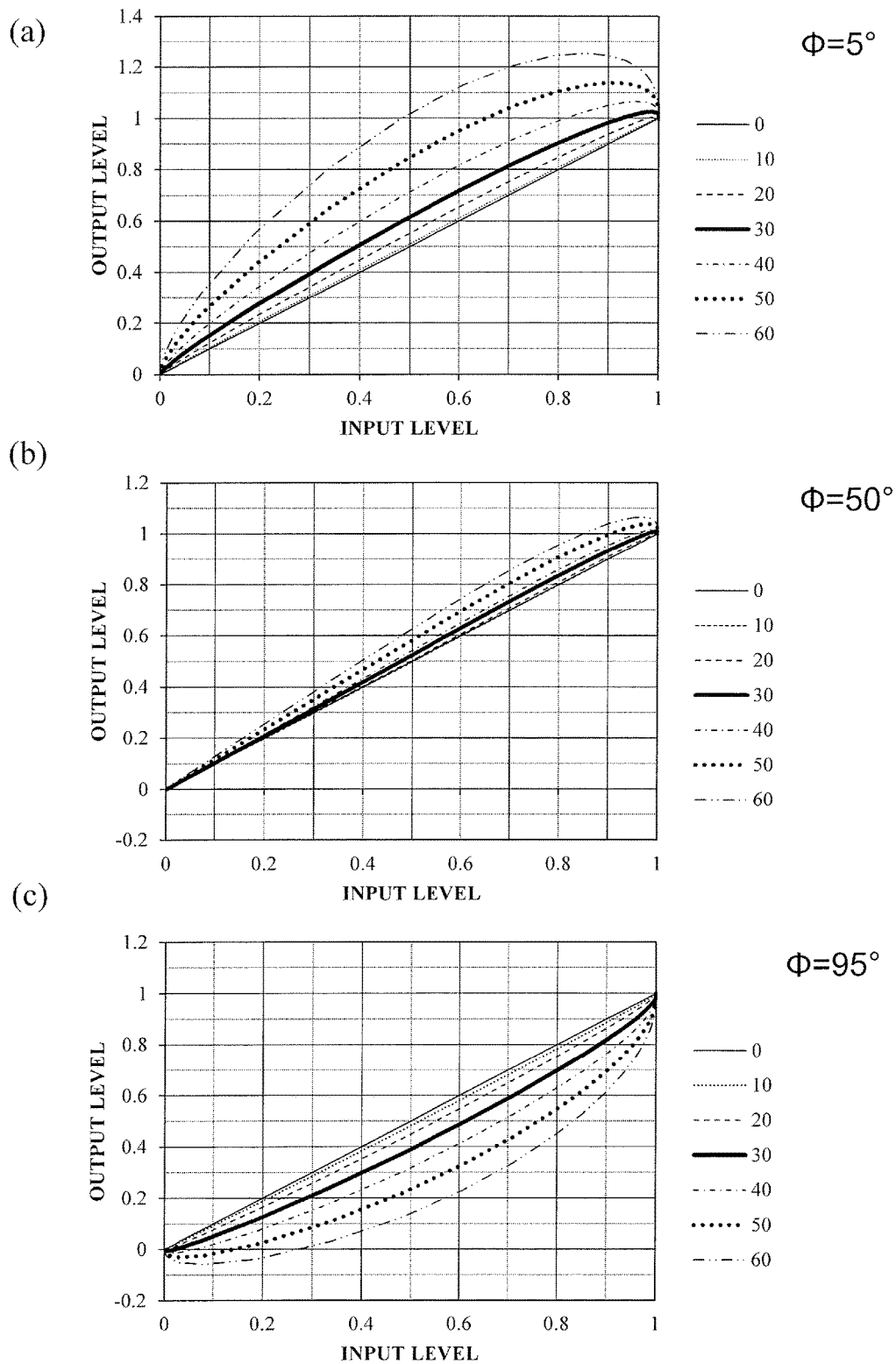
FIG. 8A A graph showing viewing angle dependence of the γ characteristics of the liquid crystal display panel according to Comparative Example 1-1 (where the azimuth angle Φ is 5°, 50°, 95°).
Figure 8B:
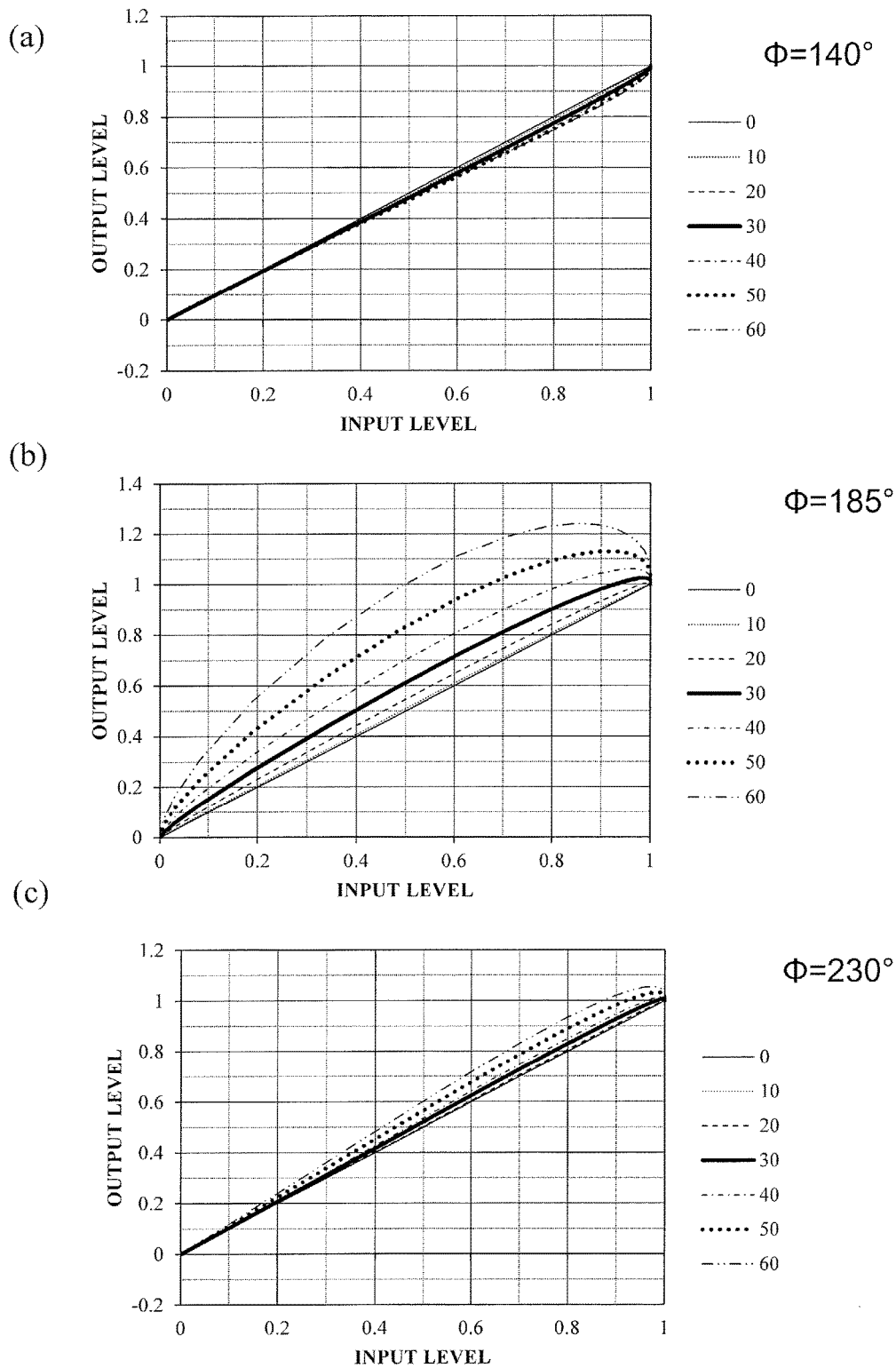
FIG. 8B A graph showing viewing angle dependence of the γ characteristics of the liquid crystal display panel according to Comparative Example 1-1 (where the azimuth angle Φ is 140°, 185°, 230°).
Figure 8C:
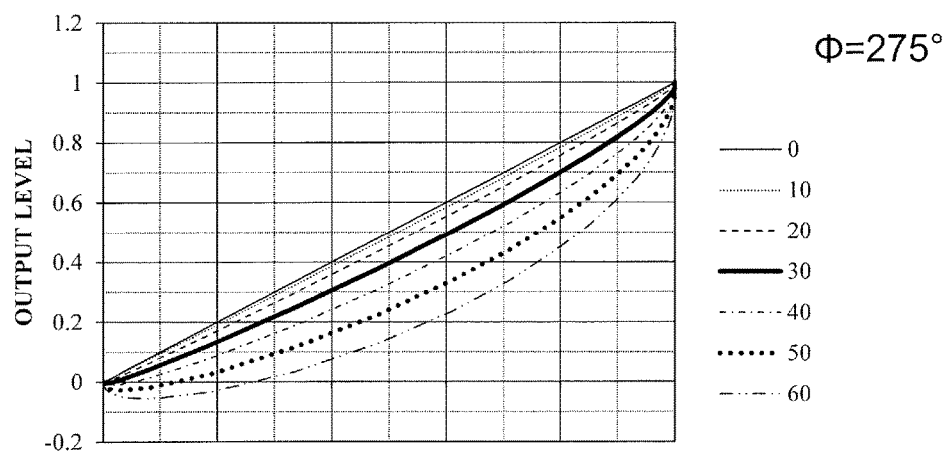
FIG. 8C A graph showing viewing angle dependence of the γ characteristics of the liquid crystal display panel according to Comparative Example 1-1 (where the azimuth angle Φ is 275°, 320°).
Figure 8C:
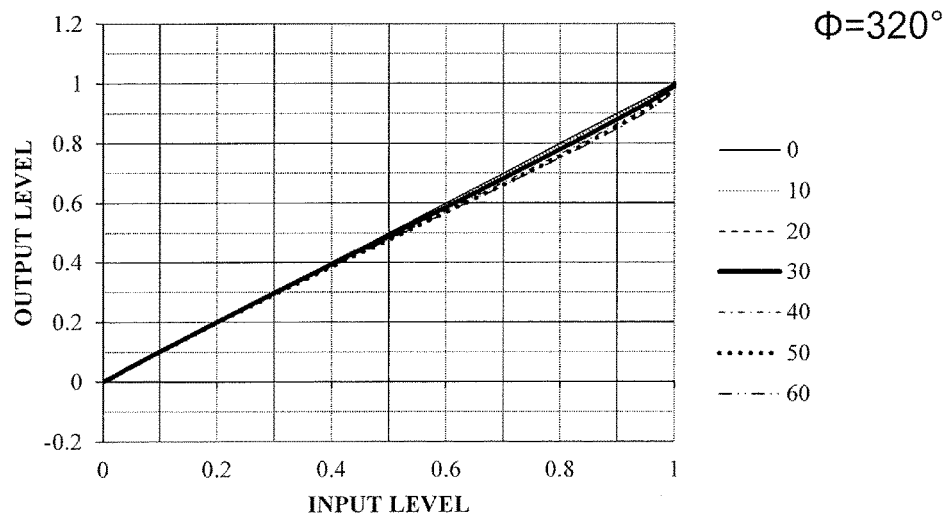

Graphs representing viewing angle dependence of the γ characteristics of the liquid crystal display panel of Example 1-1 are shown in FIG. 7A(a) to (c), FIG. 7B(a) to (c), and FIG. 7C(a) and (b). These indicate polar angle (θ) dependence of the γ characteristics for, respectively, azimuth angles Φ of 5°, 50°, 95°, 140°, 185°, 230°, 275° and 320° (i.e., azimuth directions which are apart by every 45° from the azimuth direction of the director of the liquid crystal). A polar angle of 0° is synonymous to the normal direction of the display surface, and results at 0°, 10°, 20°, 30°, 40°, 50° and 60° are respectively shown. In each graph, the horizontal axis represents the input (gray scale) level and the vertical axis represents the output (gray scale) level, which are both normalized by the highest gray scale level. If the γ characteristics did not have any polar angle dependence, in each graph, all lines would coincide with a single straight line (i.e., a straight line connecting a point (0, 0) and a point (1, 1)). Graphs representing viewing angle dependence of the γ characteristics of the liquid crystal display panel of Comparative Example 1-1 are shown in FIG. 8A(a) to (c), FIG. 8B(a) to (c), and FIG. 8C(a) and (b). FIGS. 8A through 8C respectively correspond to FIGS. 7A through 7C.

As indicated by FIGS. 7A through 7C, viewing angle dependence of the γ characteristics of the liquid crystal display panel of Example 1-1 is small for any azimuth angle, and particularly the viewing angle dependences of γ characteristics at Φ=95°, 140°, 275°, 320° are small.

In contrast, viewing angle dependence of the γ characteristics of the liquid crystal display panel of Comparative Example 1-1 as shown in FIGS. 8A through 8C indicates that, while the viewing angle dependences of γ characteristics at Φ=140° and 320° are small, the viewing angle dependences of γ characteristics at other azimuth angles are clearly greater than in Example 1-1.

Figure 9A:
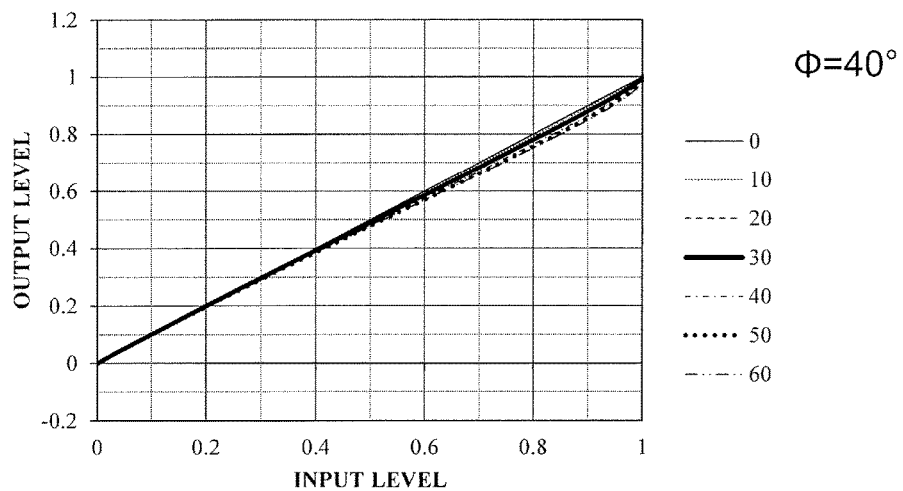
FIG. 9A A graph showing viewing angle dependence of the γ characteristics of the liquid crystal display panel according to Example 1-2 (where the azimuth angle Φ is 40°, 85°, 130°).
Figure 9A:
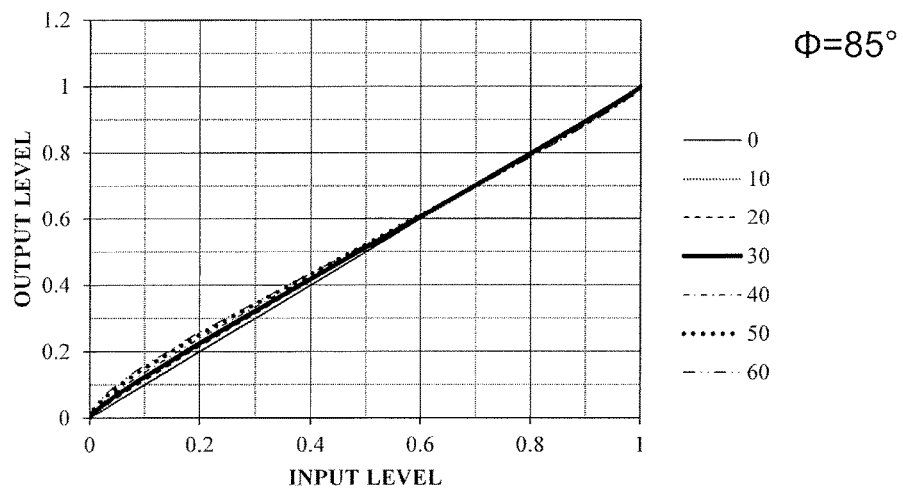
Figure 9A:
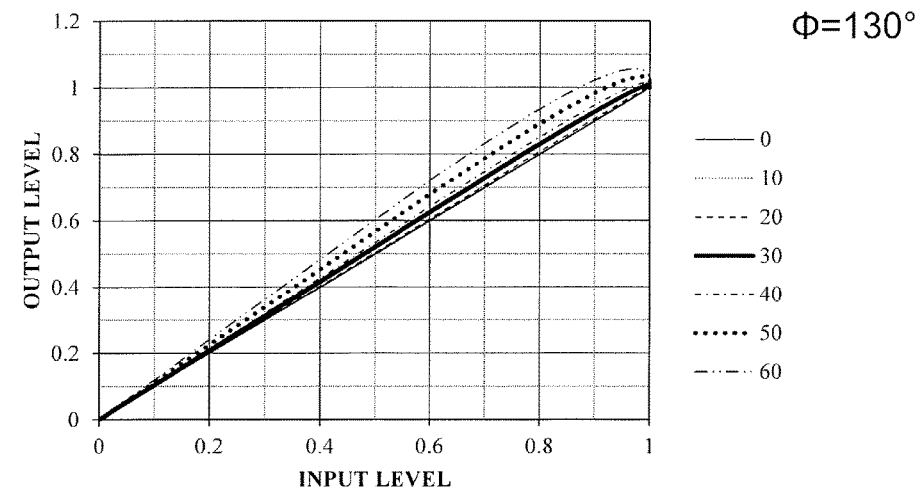
Figure 9B:
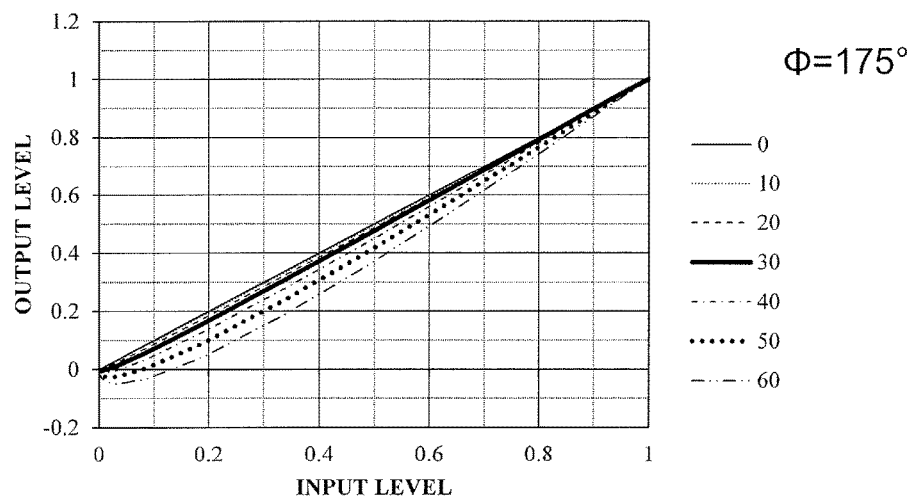
FIG. 9B A graph showing viewing angle dependence of the γ characteristics of the liquid crystal display panel according to Example 1-2 (where the azimuth angle is 175°, 220°, 265°).
Figure 9B:
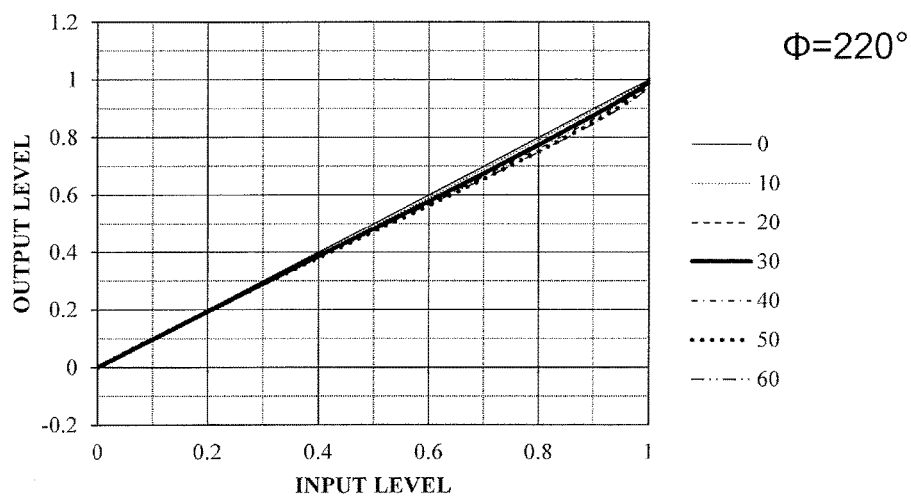
Figure 9B:
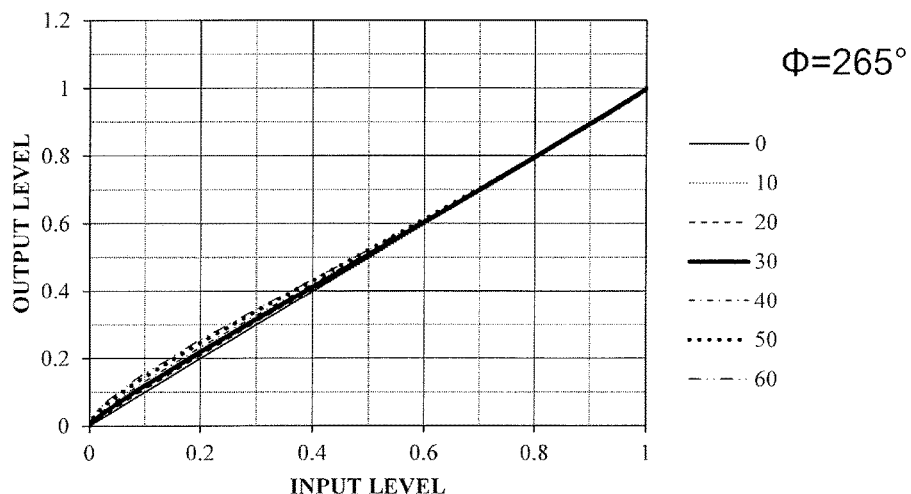
Figure 9C:
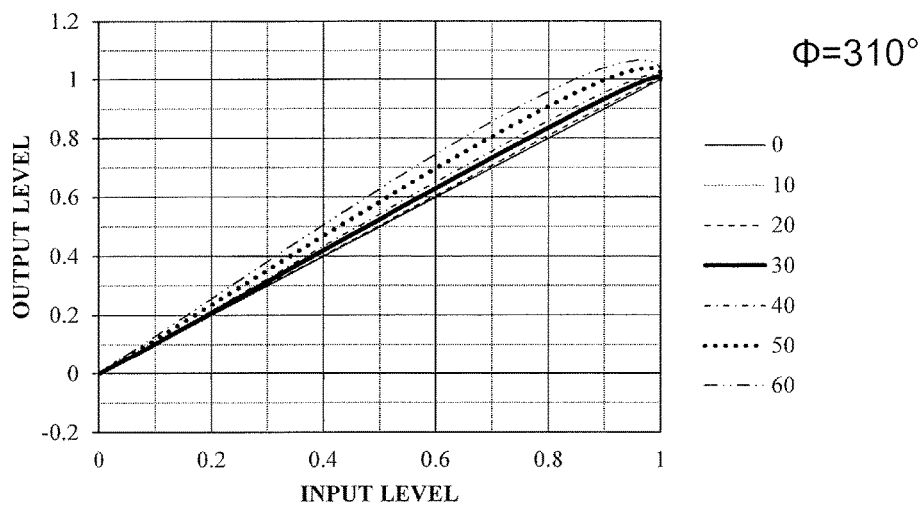
FIG. 9C A graph showing viewing angle dependence of the γ characteristics of the liquid crystal display panel according to Example 1-2 (where the azimuth angle Φ is 310° and 355°).
Figure 9C:
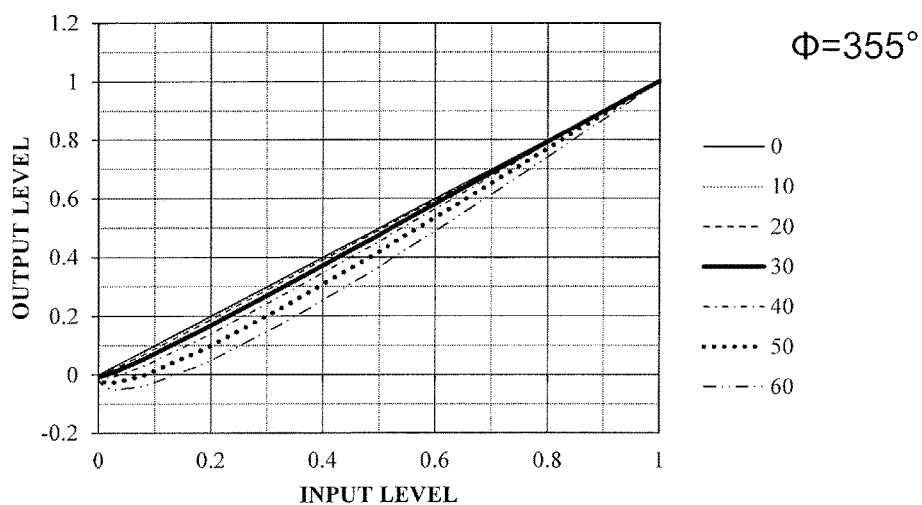
Figure 10A:
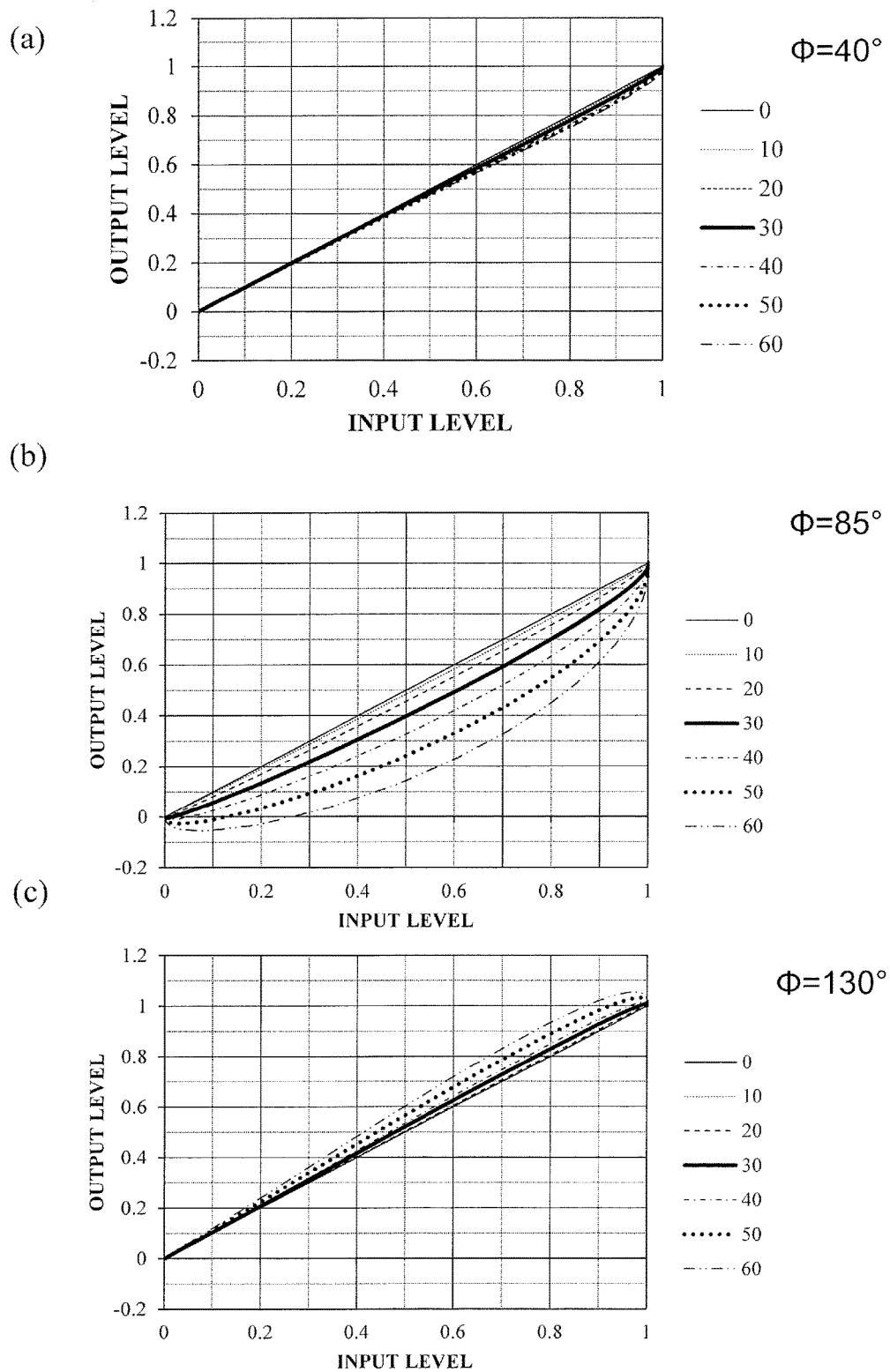
FIG. 10A A graph showing viewing angle dependence of the γ characteristics of the liquid crystal display panel according to Comparative Example 1-2 (where the azimuth angle Φ is 40°, 85°, 130°).
Figure 10B:
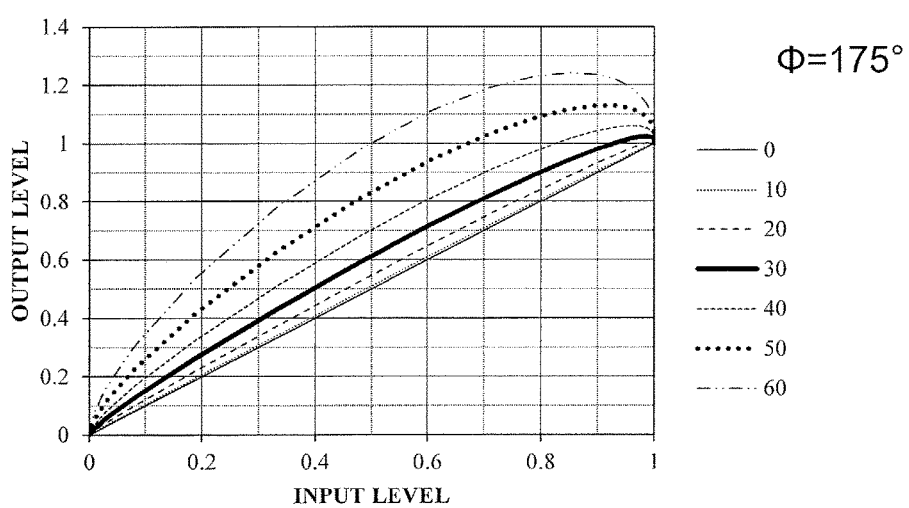
FIG. 10B A graph showing viewing angle dependence of the γ characteristics of the liquid crystal display panel according to Comparative Example 1-2 (where the azimuth angle Φ is 175°, 220°, 265°).
Figure 10B:
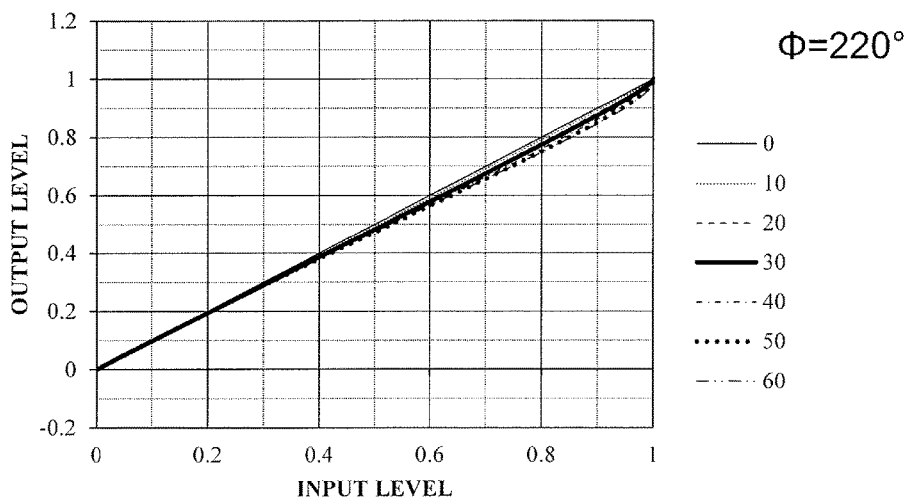
Figure 10B:
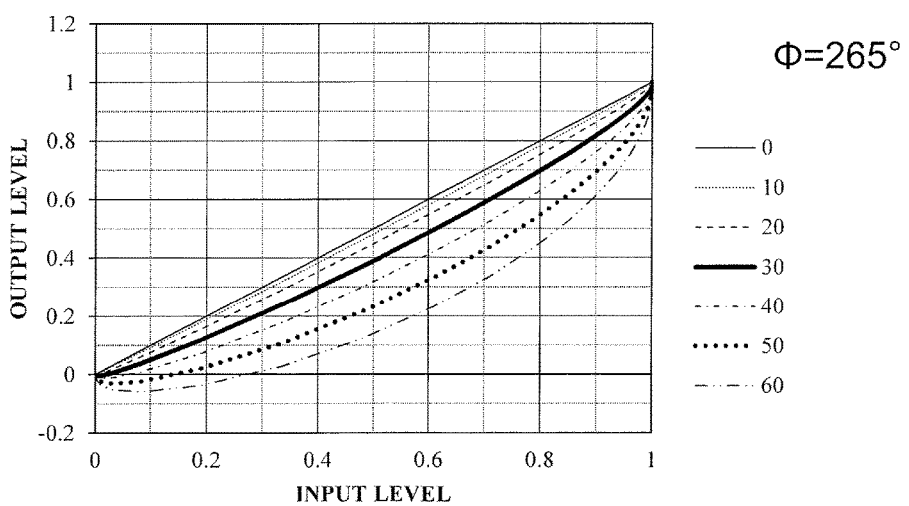
Figure 10C:
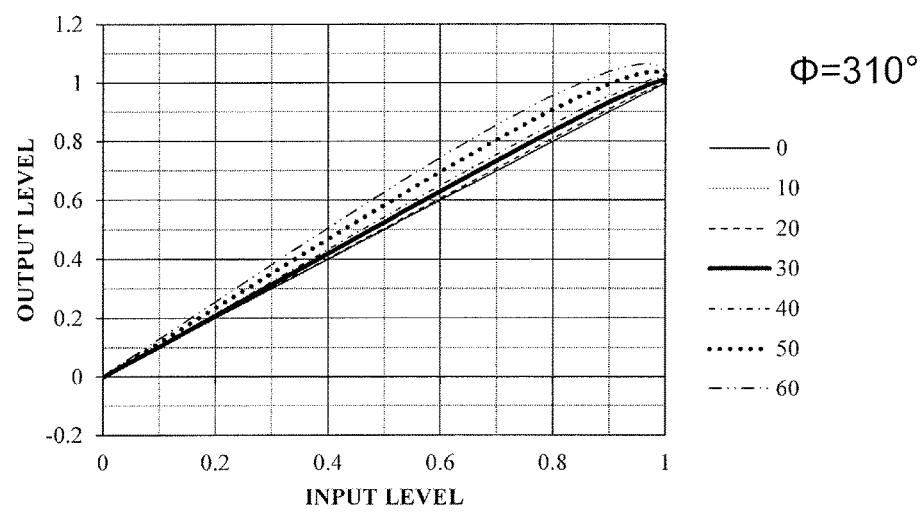
FIG. 10C A graph showing viewing angle dependence of the γ characteristics of the liquid crystal display panel according to Comparative Example 1-2 (where the azimuth angle Φ is 310° and 355°).
Figure 10C:
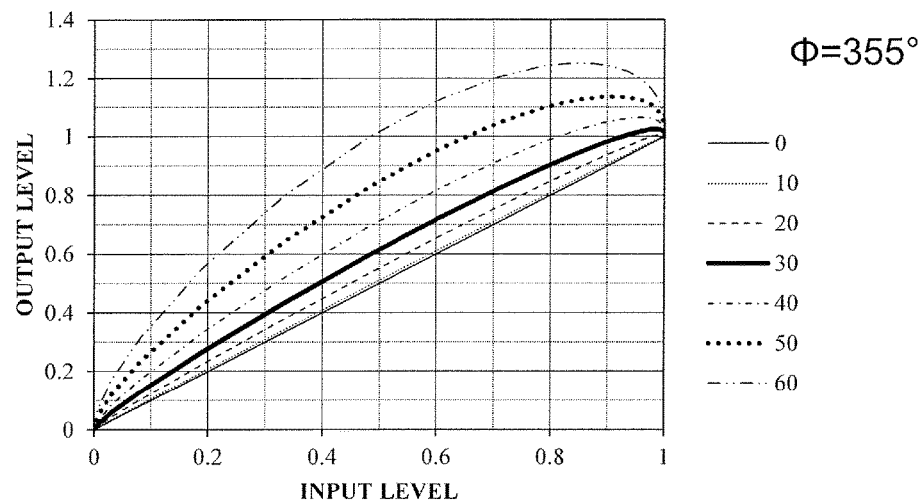

Next, graphs representing viewing angle dependence of the γ characteristics of the liquid crystal display panel of Example 1-2 are shown in FIG. 9A(a) to (c), FIG. 9B(a) to (c), and FIG. 9C(a) and (b). These indicate polar angle (θ) dependence of the γ characteristics for, respectively, azimuth angles of 40°, 85°, 130°, 175°, 220°, 265°, 310° and 355° (i.e., azimuth directions which are apart by every 45° from the azimuth direction of the director of the liquid crystal). Graphs representing viewing angle dependence of the γ characteristics of the liquid crystal display panel of Comparative Example 1-2 are shown in FIG. 10A(a) to (c), FIG. 10B(a) to (c), and FIG. 10C(a) and (b). FIGS. 10A through 10C respectively correspond to FIGS. 9A through 9C.

As indicated by FIGS. 9A through 9C, viewing angle dependence of the γ characteristics of the liquid crystal display panel of Example 2-1 is small for any azimuth angle, and particularly the viewing angle dependences of γ characteristics at Φ=40°, 85°, 220°, 265° are small.

In contrast, viewing angle dependence of the γ characteristics of the liquid crystal display panel of Comparative Example 1-2 as shown in FIGS. 10A through 10C indicates that, while the viewing angle dependences of characteristics at Φ=40° and 220° are small, the viewing angle dependences of γ characteristics at other azimuth angles are clearly greater than in Example 1-2.

These indicate that, when nematic liquid crystal having a negative dielectric anisotropy is used, based on the combinations of the rotation directions of circularly polarized light and the rotation direction of the liquid crystal director (left-handed & left-handed, or right-handed & right-handed) as indicated at Example 1-1 and Example 1-2 of Table 1, a liquid crystal display panel is obtained such that the viewing angle dependence of its γ characteristics is small in any azimuth direction.

Although Condition (1) or (2) is satisfied by the entire pixel aperture in the liquid crystal display panels of Example 1-1 and Example 1-2, the effect of improving the viewing angle dependence of γ characteristics can be obtained even if the entire pixel aperture does not necessarily satisfy Condition (1) or (2).

Figure 11:
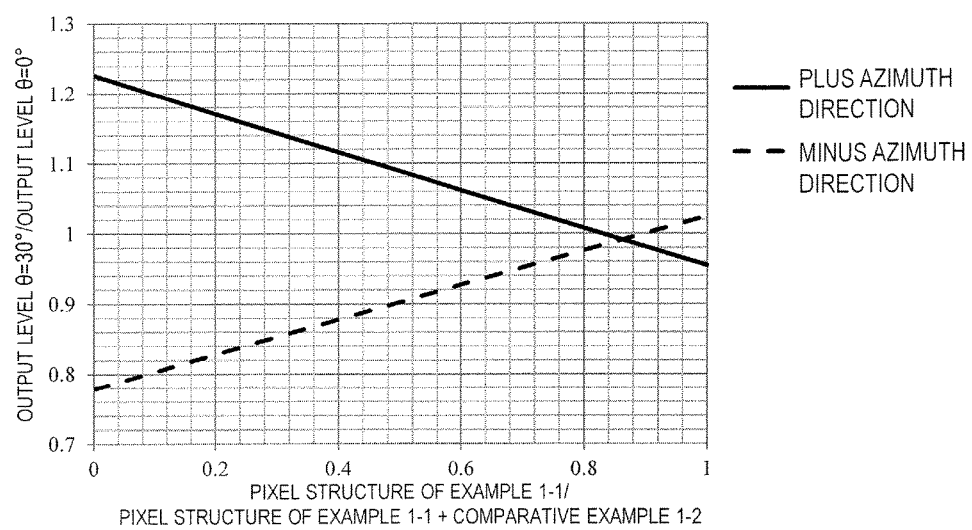
FIG. 11 A graph for a liquid crystal display panel having a mixed pixel structure that includes the pixel structure of Example 1-1 and the pixel structure of Comparative Example 1-2, showing a relationship between: the ratio at which the pixel structures are mixed; and the ratio of the output level value at a polar angle of 30° to the output level value at a polar angle of 0°, given an input level of 0.5.

For example, a result of evaluating the characteristics of a liquid crystal display panel having a mixed pixel structure including the pixel structure of Example 1-1 and the pixel structure of Comparative Example 1-2 through simulation is shown in FIG. 11. FIG. 11 is a graph for a liquid crystal display panel having the above mixed pixel structure, showing a relationship between: the ratio at which the pixel structures are mixed; and the ratio of the output level value at a polar angle of 30° to the output level value at a polar angle of 0°, given an input level of 0.5. The plus azimuth direction is the azimuth direction in which the output level becomes the largest, whereas the minus azimuth direction is the azimuth direction in which the output level becomes the smallest.

As can be seen from FIG. 11, when the pixel structure of Example 1-1 accounts for 45% or more, there is ±10% or less of fluctuation in the output level, and thus the viewing angle dependence of γ characteristics can be improved.

Next, simulation results in the case of using nematic liquid crystal having a positive dielectric anisotropy (NpLC) will be described. The fundamental construction of the liquid crystal display panel is the same as in the above examples. It was assumed that the birefringence Δn of the nematic liquid crystal having a positive dielectric anisotropy was 0.106, and that the thickness d of the liquid crystal layer was 3.892 μm. The dielectric anisotropy Δε of the nematic liquid crystal was assumed to be +7.0.

Similarly to the above, for the constructions (Examples 2-1, 2-2, Comparative Examples 2-1, 2-2) shown in Table 2 below, a graph of viewing angle dependence of the γ characteristics was determined with respect to various azimuth angles through simulation. Table 2 also indicates pass/fail judgments for viewing angle dependence based on the simulation results. Given an input level of 0.5, the viewing angle dependence was determined to be large (X) if an output level at a polar angle of 30° had a fluctuation over ±10% with respect to an output level at a polar angle of 0°.

TABLE 2

| | Example 2-1 | Example 2-2 | Comparative Example 2-1 | Comparative Example 2-2 |
|---|---|---|---|---|
| rotation direction of circularly polarized light on viewer's side | right | left | left | right |
| rotation direction of LC director under applied voltage | right | left | right | left |
| viewing angle dependence of γ characteristics | ○ | ○ | X | X |

Figure 12:
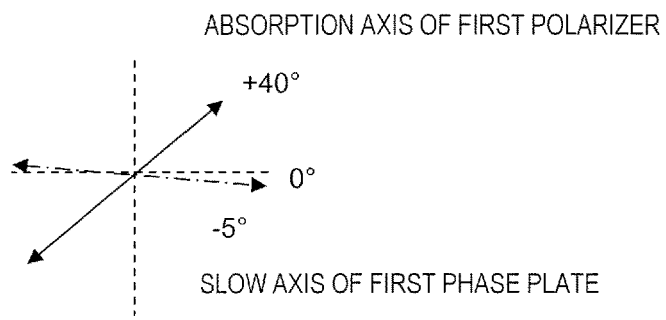
FIG. 12 Diagrams schematically showing the construction of a liquid crystal display panel according to Example 2-1, where (a) is a schematic diagram showing a relationship between the absorption axis of a first polarizer 22 and the slow axis of a first phase plate 32; (b) is a schematic diagram showing a relationship between the director of nematic liquid crystal and the direction of a lateral electric field, and a direction in which a liquid crystal molecule is rotated by the lateral electric field; and (c) is a schematic diagram showing a relationship between the absorption axis of a second polarizer 24 and the slow axis of a second phase plate 34.
Figure 12:
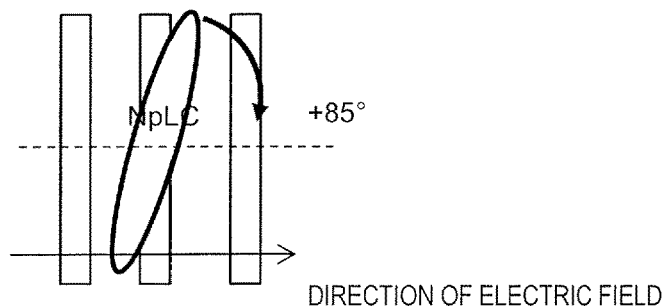
Figure 12:
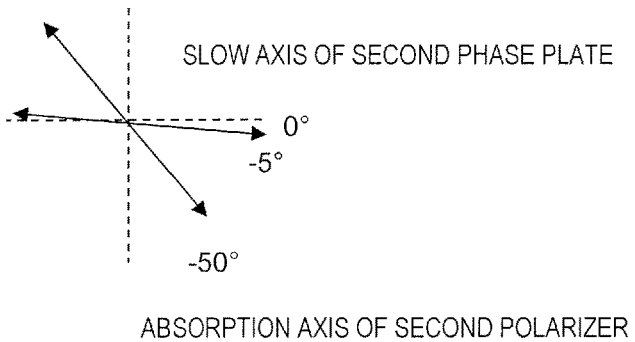

FIG. 12 schematically shows the construction of the liquid crystal display panel according to Example 2-1. FIG. 12(a) is a schematic diagram showing a relationship between the absorption axis of the first polarizer 22 and the slow axis of the first phase plate 32; FIG. 12(b) is a schematic diagram showing a relationship between the director of nematic liquid crystal and the direction of a lateral electric field, and a direction in which a liquid crystal molecule is rotated by the lateral electric field; and FIG. 12(c) is a schematic diagram showing a relationship between the absorption axis of the second polarizer 24 and the slow axis of the second phase plate 34. Each diagram illustrates a relationship as viewed from the viewer's side.

In the absence of an applied voltage, the director of the nematic liquid crystal having a positive dielectric anisotropy (NpLC) (which is parallel to the major axis of a liquid crystal molecule represented as an ellipse) is aligned so as to constitute an angle of 85° with respect to the direction of the lateral electric field (azimuth angle 0°), as is shown in FIG. 12(b). When the lateral electric field is applied, the director of the nematic liquid crystal having a positive dielectric anisotropy is aligned so as to be parallel to the direction of the electric field, and therefore is rotated in the clockwise direction (right-handed rotation), as indicated by the arrow.

The slow axis of the first phase plate 32 and the slow axis of the second phase plate 34 are disposed so as to be orthogonal (azimuth angle −5°) to the director of the liquid crystal (azimuth angle 85°), as are shown in FIGS. 12(a) and (c), respectively.

As shown in FIG. 12(a), the absorption axis of the first polarizer 22 is disposed so as to constitute −45° (azimuth angle 40°) with respect to the director of the liquid crystal (azimuth angle 85°). As shown in FIG. 12(c), the absorption axis of the second polarizer 24 is disposed so as to constitute 45° (azimuth angle −50°=130°) with respect to the director of the liquid crystal (azimuth angle 85°). The absorption axis of the first polarizer 22 and the absorption axis of the second polarizer 24 are orthogonal (in crossed Nicole).

Figure 13:
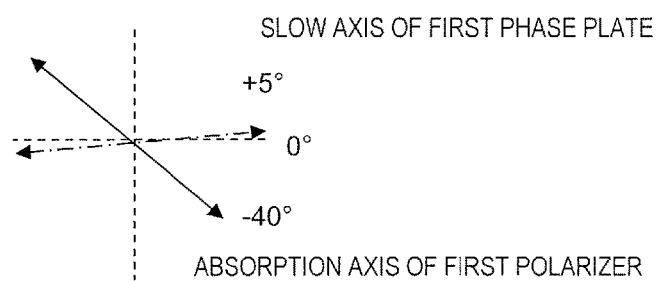
FIG. 13 Diagrams schematically showing the construction of a liquid crystal display panel according to Example 2-2, where (a) is a schematic diagram showing a relationship between the absorption axis of a first polarizer 22 and the slow axis of a first phase plate 32; (b) is a schematic diagram showing a relationship between the director of nematic liquid crystal and the direction of a lateral electric field, and a direction in which a liquid crystal molecule is rotated by the lateral electric field; and (c) is a schematic diagram showing a relationship between the absorption axis of a second polarizer 24 and the slow axis of a second phase plate 34.
Figure 13:
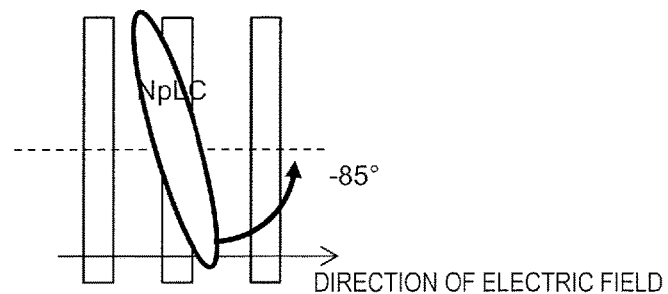
Figure 13:
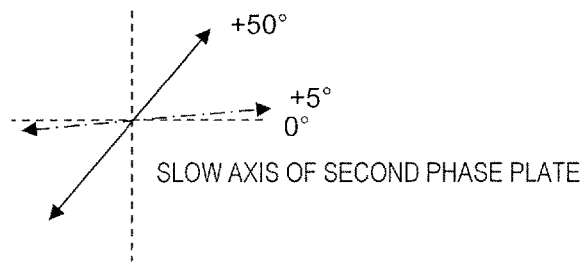

FIG. 13 schematically shows the construction of the liquid crystal display panel according to Example 2-2. FIG. 13(a) is a schematic diagram showing a relationship between the absorption axis of the first polarizer 22 and the slow axis of the first phase plate 32; FIG. 13(b) is a schematic diagram showing a relationship between the director of nematic liquid crystal and the direction of a lateral electric field, and a direction in which a liquid crystal molecule is rotated by the lateral electric field; and FIG. 13(c) is a schematic diagram showing a relationship between the absorption axis of the second polarizer 24 and the slow axis of the second phase plate 34. Each diagram illustrates a relationship as viewed from the viewer's side.

In the absence of an applied voltage, the director of the nematic liquid crystal having a positive dielectric anisotropy (NpLC) is aligned so as to constitute an angle of −85° with respect to the direction of the lateral electric field (azimuth angle 0°), as is shown in FIG. 13(b). When the lateral electric field is applied, the director of the nematic liquid crystal having a positive dielectric anisotropy is aligned so as to be parallel to the direction of the electric field, and therefore is rotated in the counterclockwise direction (left-handed rotation), as indicated by the arrow.

The slow axis of the first phase plate 32 and the slow axis of the second phase plate 34 are disposed so as to be orthogonal (azimuth angle 5°) to the director of the liquid crystal (azimuth angle −85°), as are shown in FIGS. 13(a) and (c), respectively.

As shown in FIG. 13(a), the absorption axis of the first polarizer 22 is disposed so as to constitute 45° (azimuth angle −40°) with respect to the director of the liquid crystal (azimuth angle −85°). As shown in FIG. 13(c), the absorption axis of the second polarizer 24 is disposed so as to constitute −45° (azimuth angle 50°=−130°) with respect to the director of the liquid crystal (azimuth angle −85°). The absorption axis of the first polarizer 22 and the absorption axis of the second polarizer 24 are orthogonal (in crossed Nicols).

Figure 14:
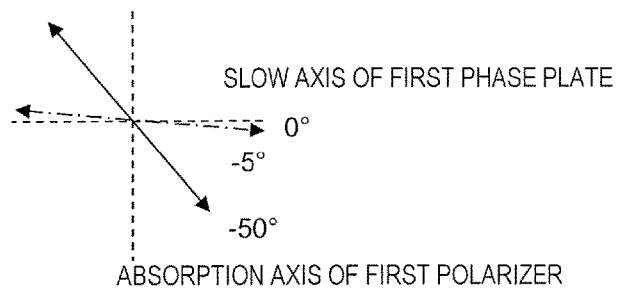
FIG. 14 Diagrams schematically showing the construction of a liquid crystal display panel according to Comparative Example 2-1, where (a) is a schematic diagram showing a relationship between the absorption axis of a first polarizer 22 and the slow axis of a first phase plate 32; (b) is a schematic diagram showing a relationship between the director of nematic liquid crystal and the direction of a lateral electric field, and a direction in which a liquid crystal molecule is rotated by the lateral electric field; and (c) is a schematic diagram showing a relationship between the absorption axis of a second polarizer 24 and the slow axis of a second phase plate 34.
Figure 14:
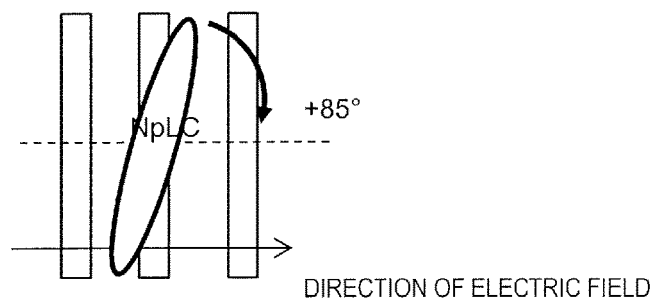
Figure 14:
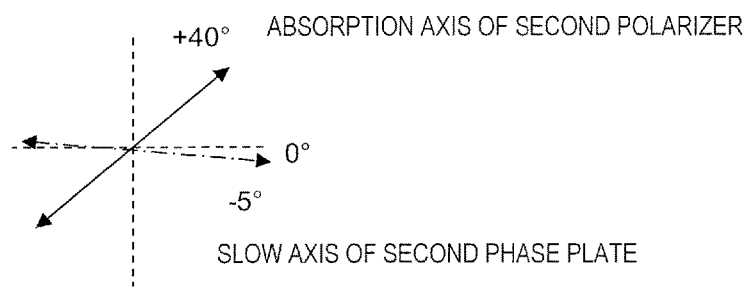

FIG. 14 schematically shows the construction of the liquid crystal display panel according to Comparative Example 2-1. FIG. 14(a) is a schematic diagram showing a relationship between the absorption axis of the first polarizer 22 and the slow axis of the first phase plate 32; FIG. 14(b) is a schematic diagram showing a relationship between the director of nematic liquid crystal and the direction of a lateral electric field, and a direction in which a liquid crystal molecule is rotated by the lateral electric field; and FIG. 14(c) is a schematic diagram showing a relationship between the absorption axis of the second polarizer 24 and the slow axis of the second phase plate 34. Each diagram illustrates a relationship as viewed from the viewer's side.

In the absence of an applied voltage, the director of the nematic liquid crystal having a positive dielectric anisotropy (NpLC) is aligned so as to constitute an angle of 85° with respect to the direction of the lateral electric field (azimuth angle 0°), as is shown in FIG. 14(b). When the lateral electric field is applied, the director of the nematic liquid crystal having a positive dielectric anisotropy is aligned so as to be parallel to the direction of the electric field, and therefore is rotated in the clockwise direction (right-handed rotation), as indicated by the arrow.

The slow axis of the first phase plate 32 and the slow axis of the second phase plate 34 are disposed so as to be orthogonal (azimuth angle −5°) to the director of the liquid crystal (azimuth angle 85°), as are shown in FIGS. 14(a) and (c), respectively.

As shown in FIG. 14(a), the absorption axis of the first polarizer 22 is disposed so as to constitute 45° (azimuth angle −50°=130°) with respect to the director of the liquid crystal (azimuth angle 85°). As shown in FIG. 14(c), the absorption axis of the second polarizer 24 is disposed so as to constitute −45° (azimuth angle 40°) with respect to the director of the liquid crystal (azimuth angle 85°). The absorption axis of the first polarizer 22 and the absorption axis of the second polarizer 24 are orthogonal (in crossed Nicols).

Figure 15:
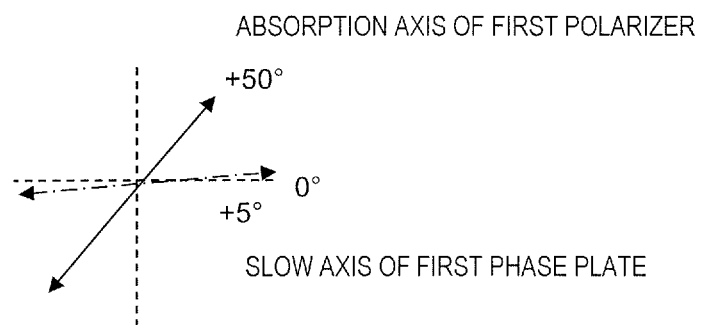
FIG. 15 Diagrams schematically showing the construction of a liquid crystal display panel according to Comparative Example 2-2, where (a) is a schematic diagram showing a relationship between the absorption axis of a first polarizer 22 and the slow axis of a first phase plate 32; (b) is a schematic diagram showing a relationship between the director of nematic liquid crystal and the direction of a lateral electric field, and a direction in which a liquid crystal molecule is rotated by the lateral electric field; and (c) is a schematic diagram showing a relationship between the absorption axis of a second polarizer 24 and the slow axis of a second phase plate 34.
Figure 15:
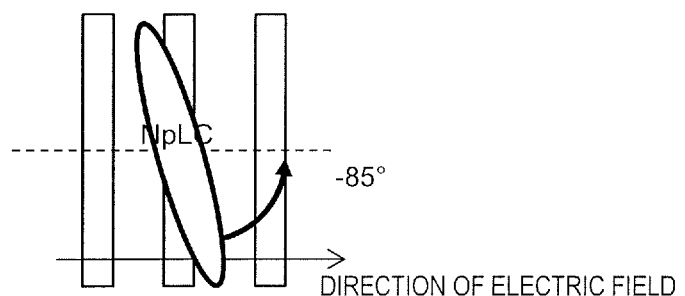
Figure 15:
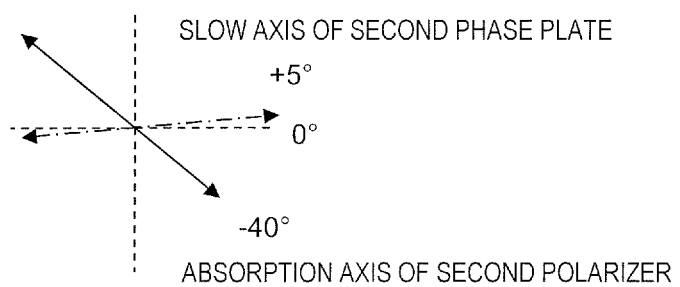

FIG. 15 schematically shows the construction of the liquid crystal display panel according to Comparative Example 2-2. FIG. 15(a) is a schematic diagram showing a relationship between the absorption axis of the first polarizer 22 and the slow axis of the first phase plate 32; FIG. 15(b) is a schematic diagram showing a relationship between the director of nematic liquid crystal and the direction of a lateral electric field, and a direction in which a liquid crystal molecule is rotated by the lateral electric field; and FIG. 15(c) is a schematic diagram showing a relationship between the absorption axis of the second polarizer 24 and the slow axis of the second phase plate 34. Each diagram illustrates a relationship as viewed from the viewer's side.

In the absence of an applied voltage, the director of the nematic liquid crystal having a positive dielectric anisotropy (NpLC) is aligned so as to constitute an angle of −85° with respect to the direction of the lateral electric field (azimuth angle 0°), as is shown in FIG. 15(b). When the lateral electric field is applied, the director of the nematic liquid crystal having a positive dielectric anisotropy is aligned so as to be parallel to the direction of the electric field, and therefore is rotated in the counterclockwise direction (left-handed rotation), as indicated by the arrow.

The slow axis of the first phase plate 32 and the slow axis of the second phase plate 34 are disposed so as to be orthogonal (azimuth angle 5°) to the director of the liquid crystal (azimuth angle −85°), as are shown in FIGS. 15(a) and (c), respectively.

As shown in FIG. 15(a), the absorption axis of the first polarizer 22 is disposed so as to constitute −45° (azimuth angle 50°=−130°) with respect to the director of the liquid crystal (azimuth angle −85°). As shown in FIG. 15(c), the absorption axis of the second polarizer 24 is disposed so as to constitute 45° (azimuth angle −40°) with respect to the director of the liquid crystal (azimuth angle −85°). The absorption axis of the first polarizer 22 and the absorption axis of the second polarizer 24 are orthogonal (in crossed Nicols).

Figure 16A:
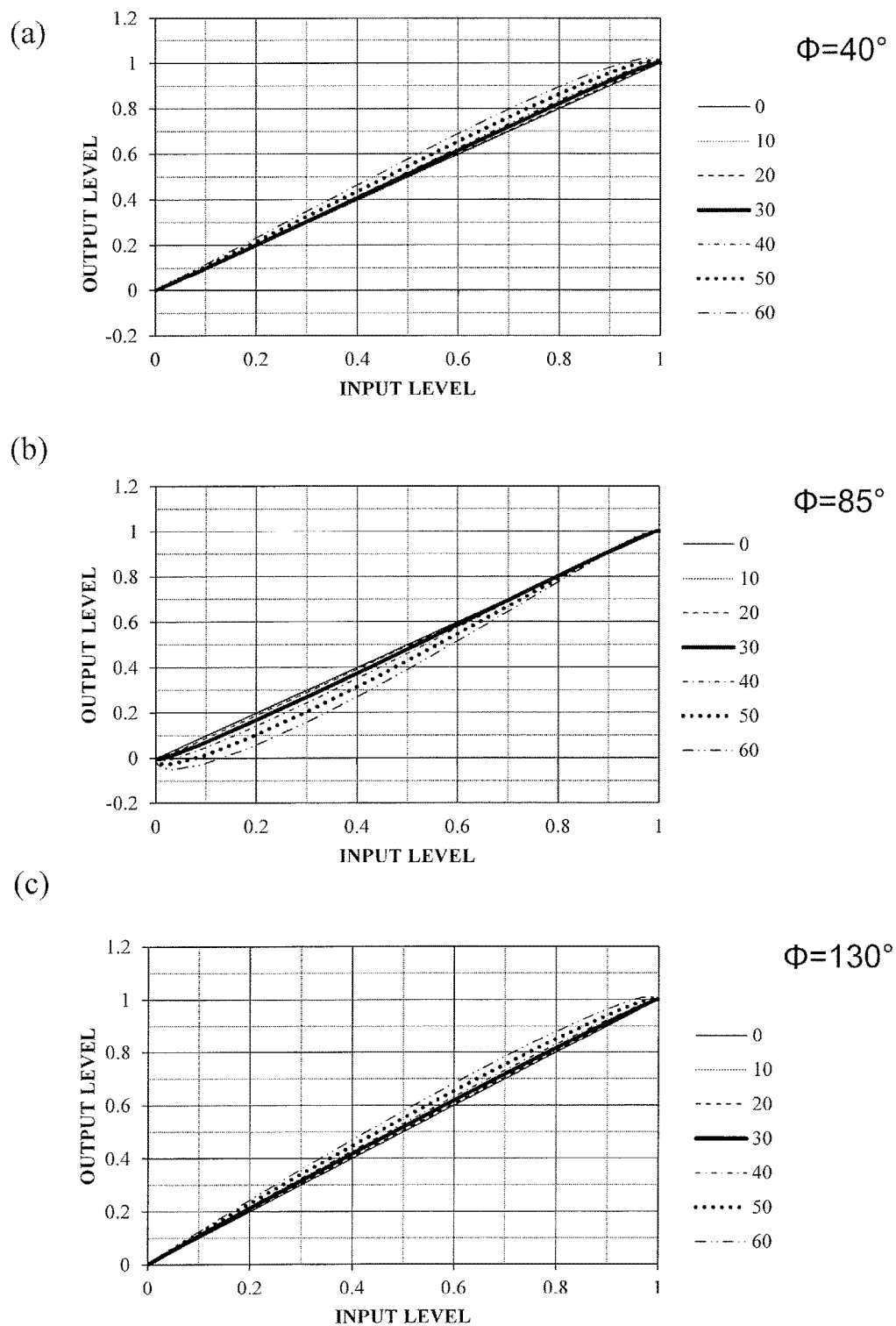
FIG. 16A A graph showing viewing angle dependence of the γ characteristics of the liquid crystal display panel according to Example 2-1 (where the azimuth angle Φ is 40°, 85°, 130°).
Figure 16B:
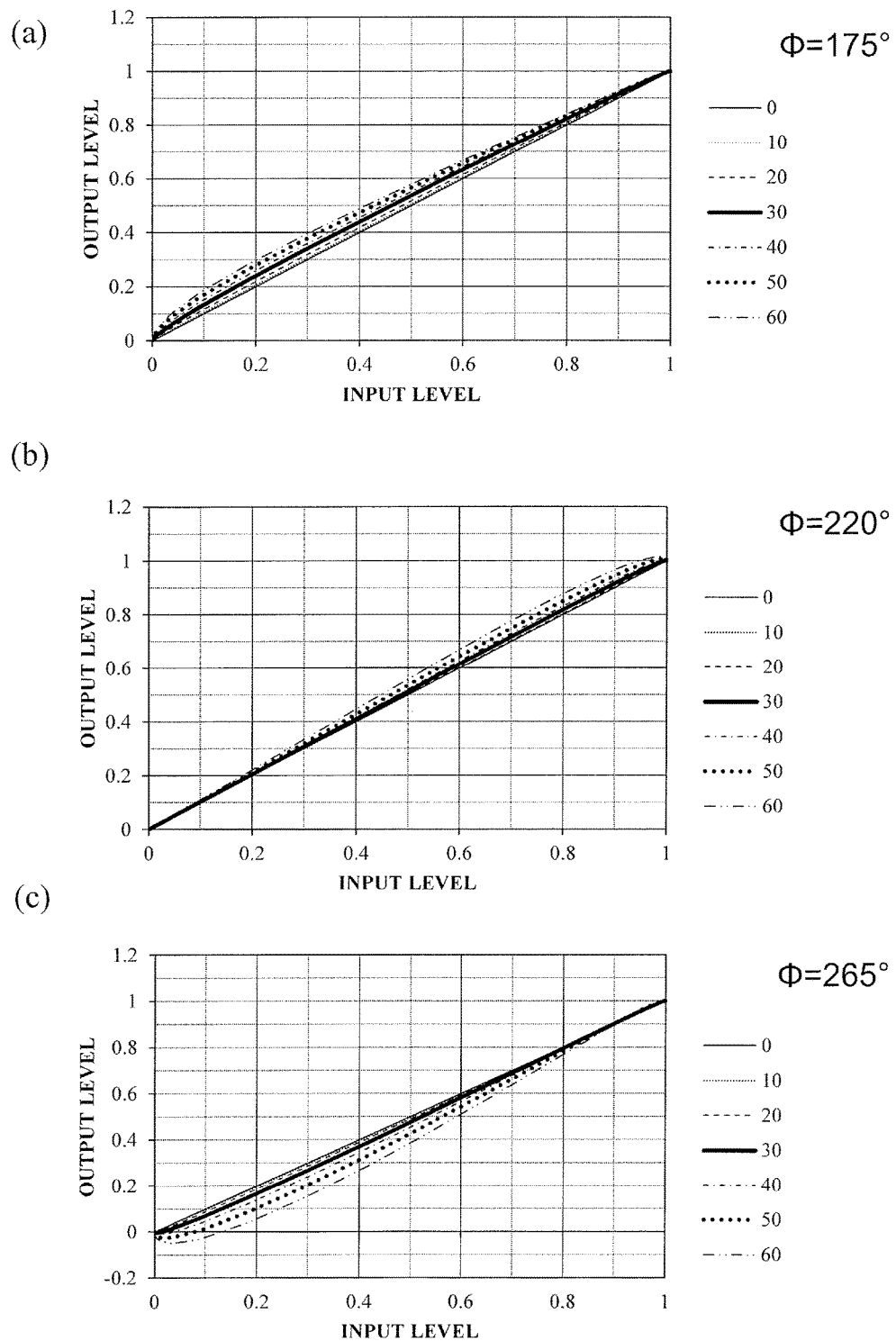
FIG. 16B A graph showing viewing angle dependence of the γ characteristics of the liquid crystal display panel according to Example 2-1 (where the azimuth angle Φ is 175°, 220°, 265°).
Figure 16C:
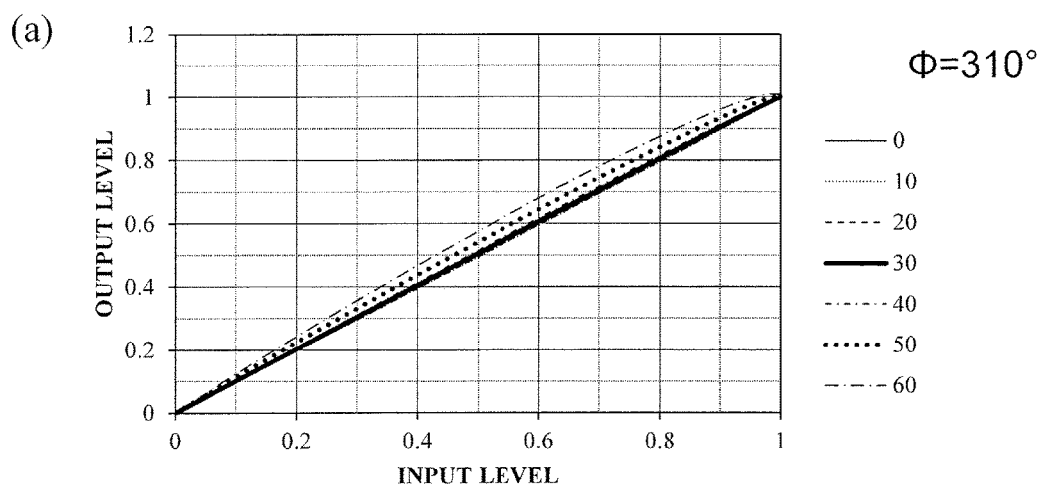
FIG. 16C A graph showing viewing angle dependence of the γ characteristics of the liquid crystal display panel according to Example 2-1 (where the azimuth angle Φ is 310° and 355°).
Figure 16C:
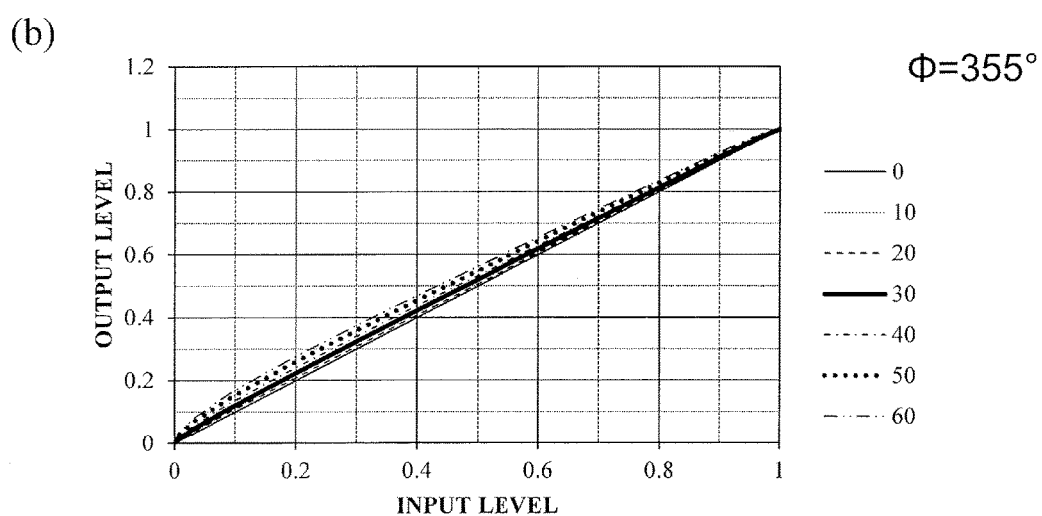
Figure 17A:
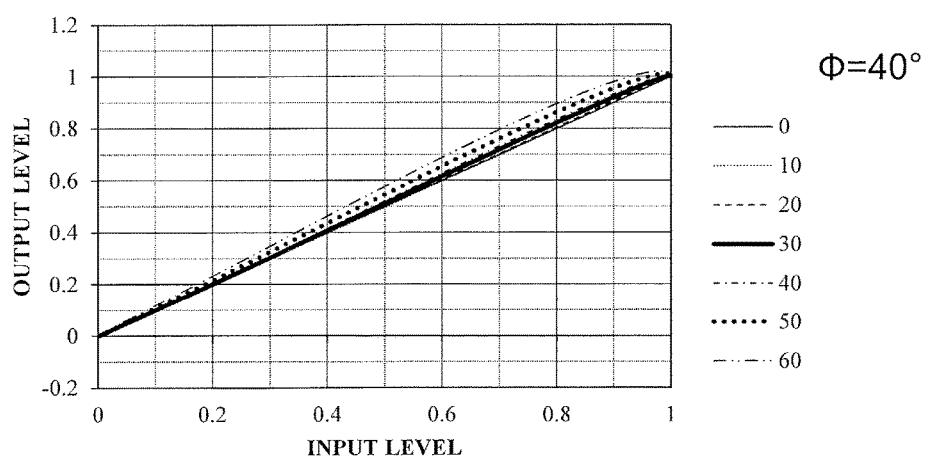
FIG. 17A A graph showing viewing angle dependence of the γ characteristics of the liquid crystal display panel according to Comparative Example 2-1 (where the azimuth angle Φ is 40°, 85°, 130°).
Figure 17A:
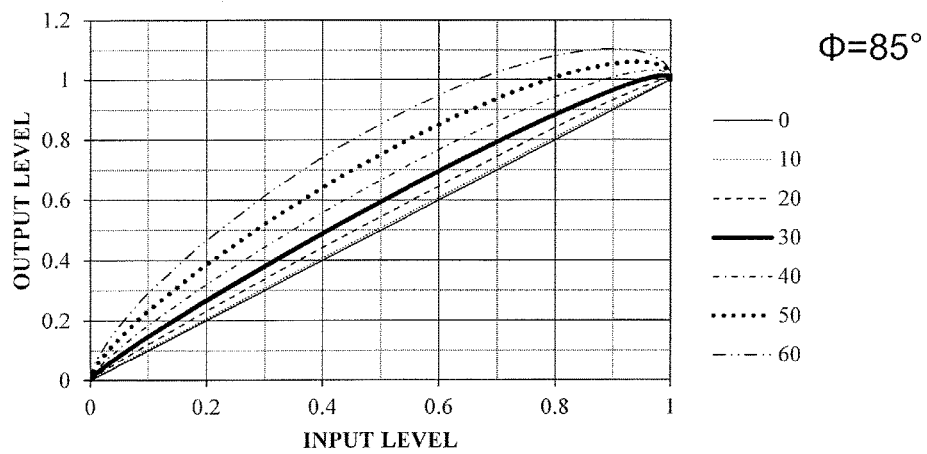
Figure 17A:
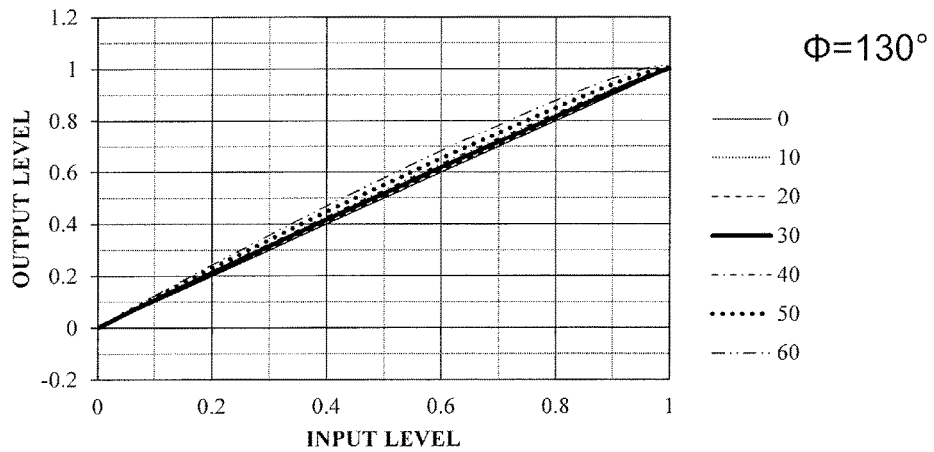
Figure 17B:
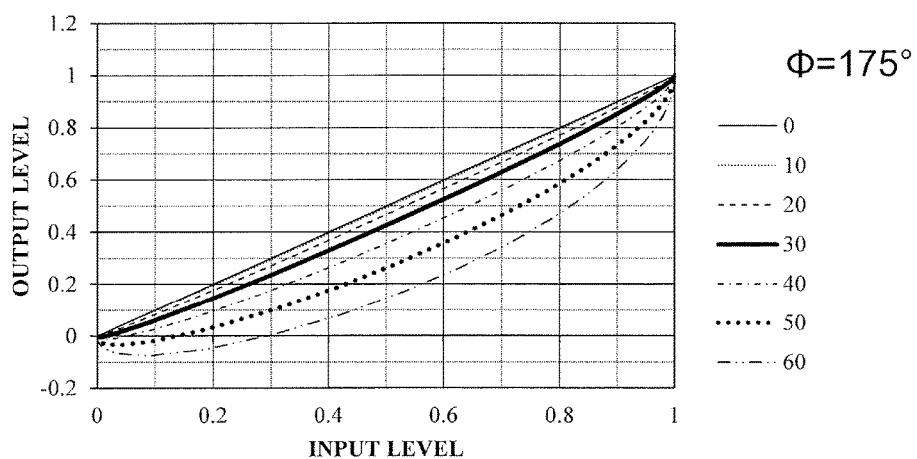
FIG. 17B A graph showing viewing angle dependence of the γ characteristics of the liquid crystal display panel according to Comparative Example 2-1 (where the azimuth angle Φ is 175°, 220°, 265°).
Figure 17B:
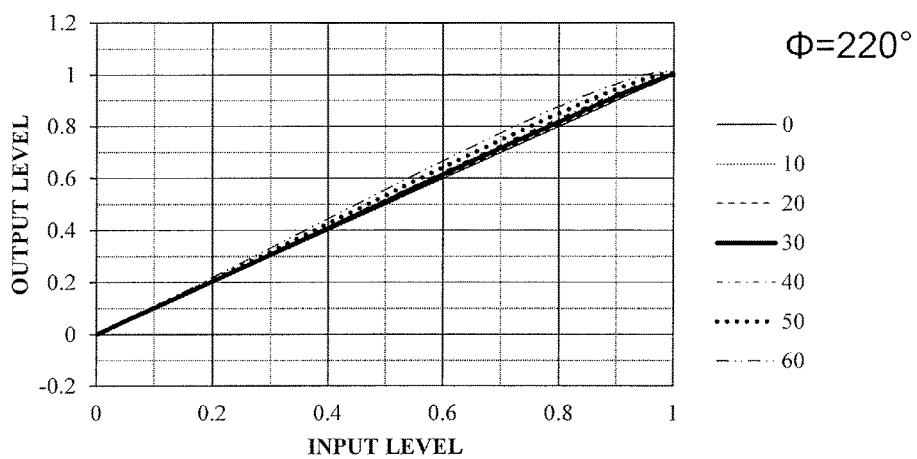
Figure 17B:
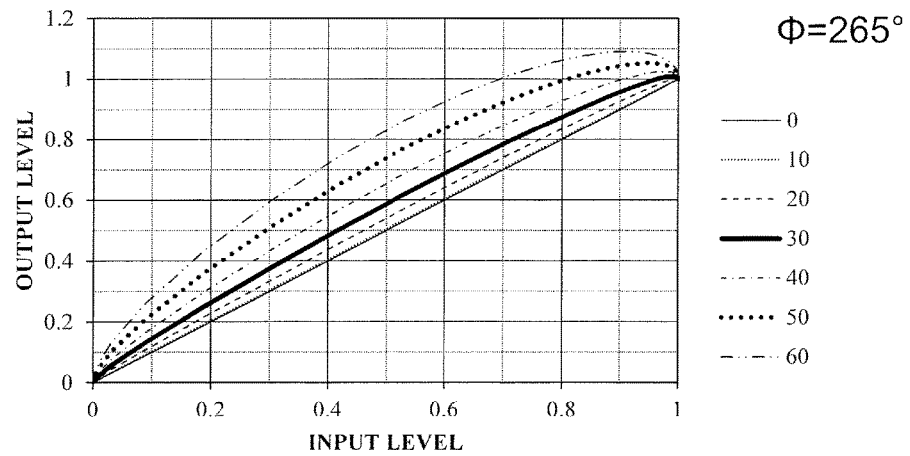
Figure 17C:
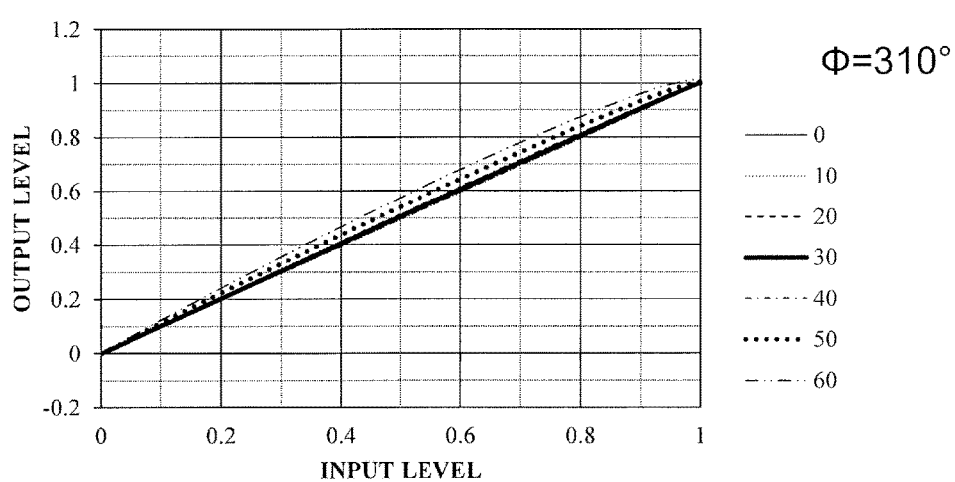
FIG. 17C A graph showing viewing angle dependence of the γ characteristics of the liquid crystal display panel according to Comparative Example 2-1 (where the azimuth angle Φ is 310° and 355°).
Figure 17C:
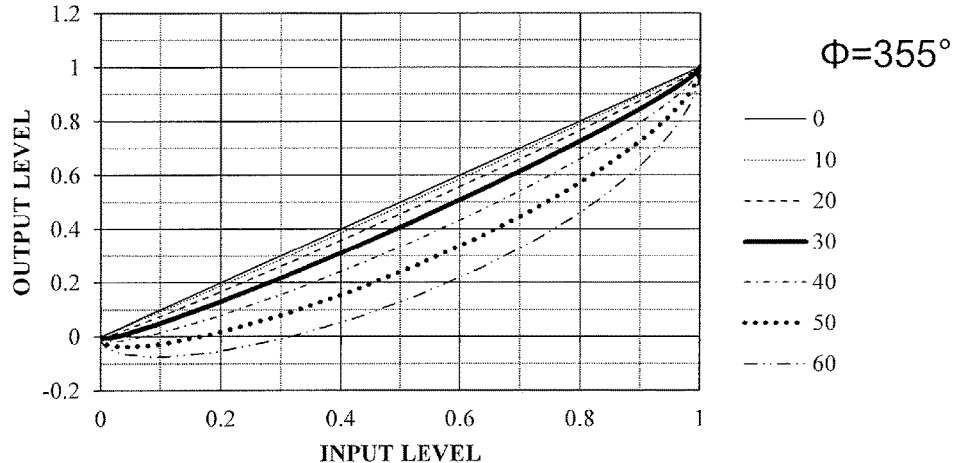

Graphs representing viewing angle dependence of the γ characteristics of the liquid crystal display panel of Example 2-1 are shown in FIG. 16A(a) to (c), FIG. 16B(a) to (c), and FIG. 16C(a) and (b). These indicate polar angle (θ) dependence of the γ characteristics for, respectively, azimuth angles Φ of 40°, 85°, 130°, 175°, 220°, 265°, 310° and 355° (i.e., azimuth directions which are apart by every 45° from the azimuth direction of the director of the liquid crystal). Graphs representing viewing angle dependence of the γ characteristics of the liquid crystal display panel of Comparative Example 2-1 are shown in FIG. 17A(a) to (c), FIG. 17B(a) to (c), and FIG. 17C(a) and (b). FIGS. 17A through 17C respectively correspond to FIGS. 16A through 16C.

FIGS. 16A through 16C indicate that viewing angle dependence of the γ characteristics of the liquid crystal display panel of Example 2-1 is small at any azimuth angle.

In contrast, viewing angle dependence of the γ characteristics of the liquid crystal display panel of Comparative Example 2-1 as shown in FIGS. 17A through 17C indicates that the viewing angle dependences of characteristics at Φ=85°, 175°, 265° and 355° are clearly greater than in Example 2-1.

Figure 18A:
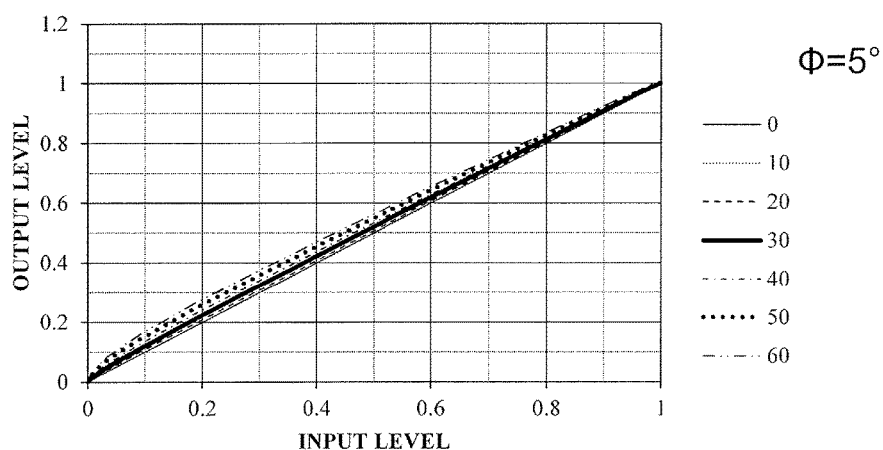
FIG. 18A A graph showing viewing angle dependence of the γ characteristics of the liquid crystal display panel according to Example 2-2 (where the azimuth angle Φ is 5°, 50°, 95°).
Figure 18A:
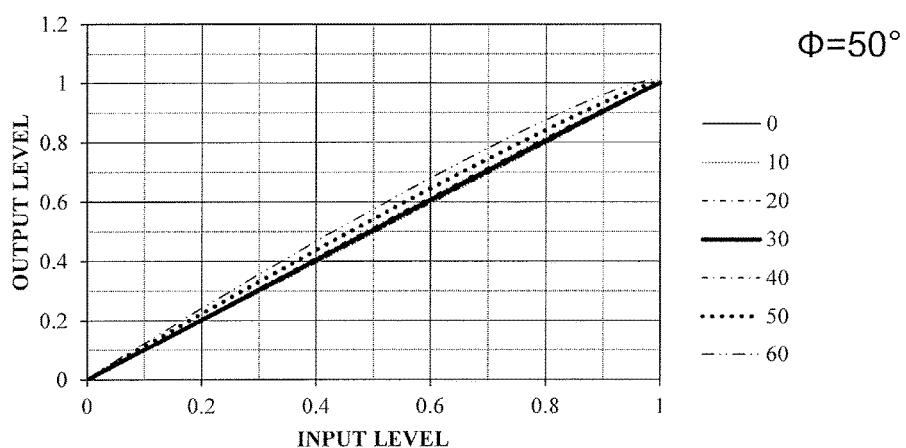
Figure 18A:
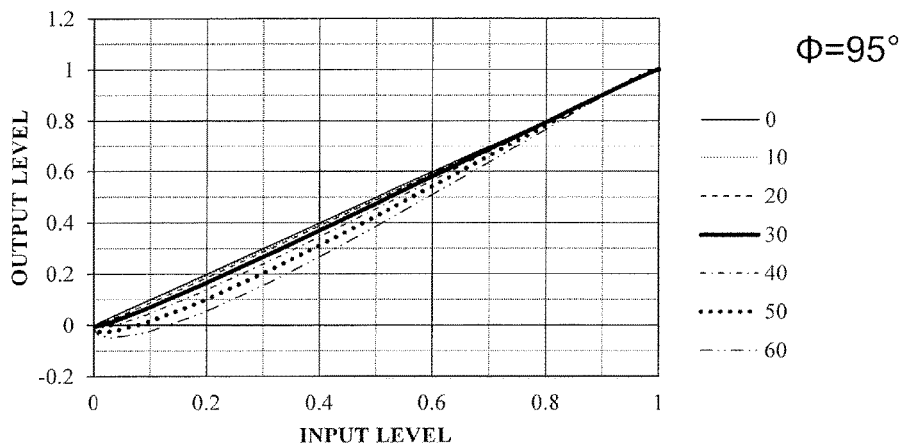
Figure 18B:
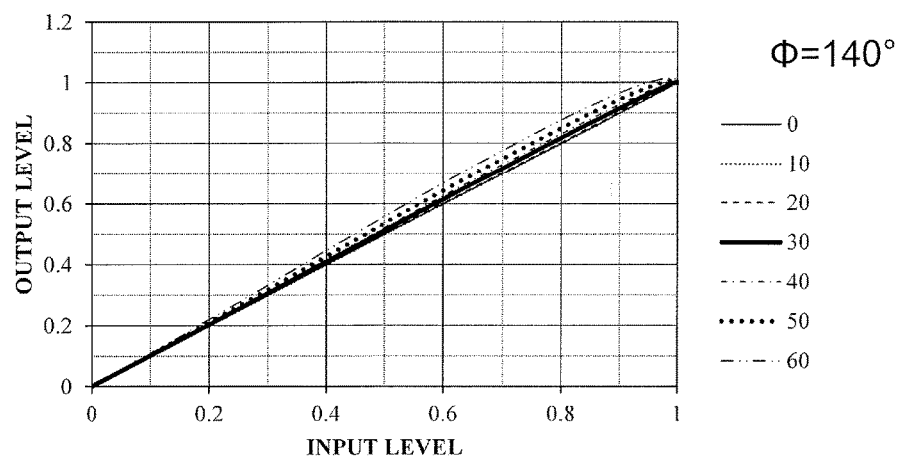
FIG. 18B A graph showing viewing angle dependence of the γ characteristics of the liquid crystal display panel according to Example 2-2 (where the azimuth angle Φ is 140°, 185°, 230°).
Figure 18B:
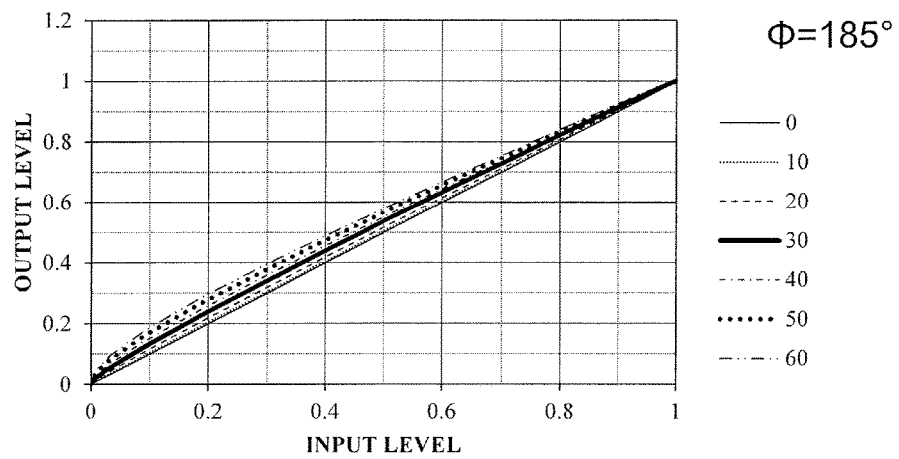
Figure 18B:
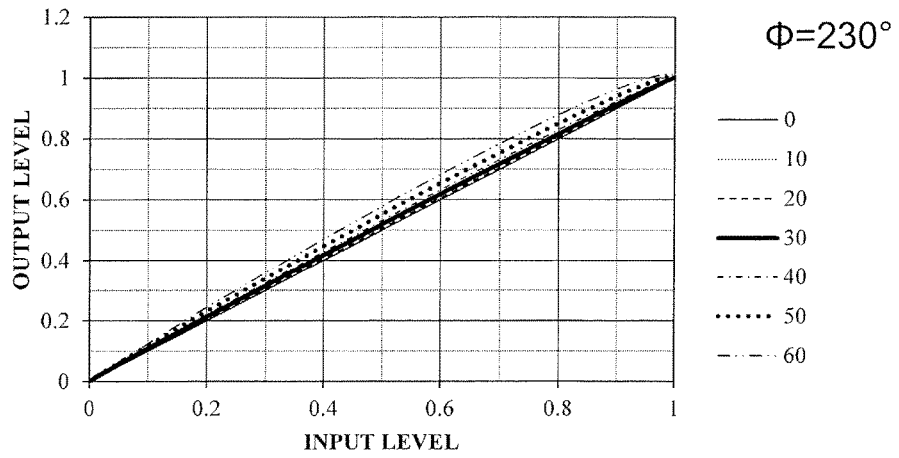
Figure 18C:
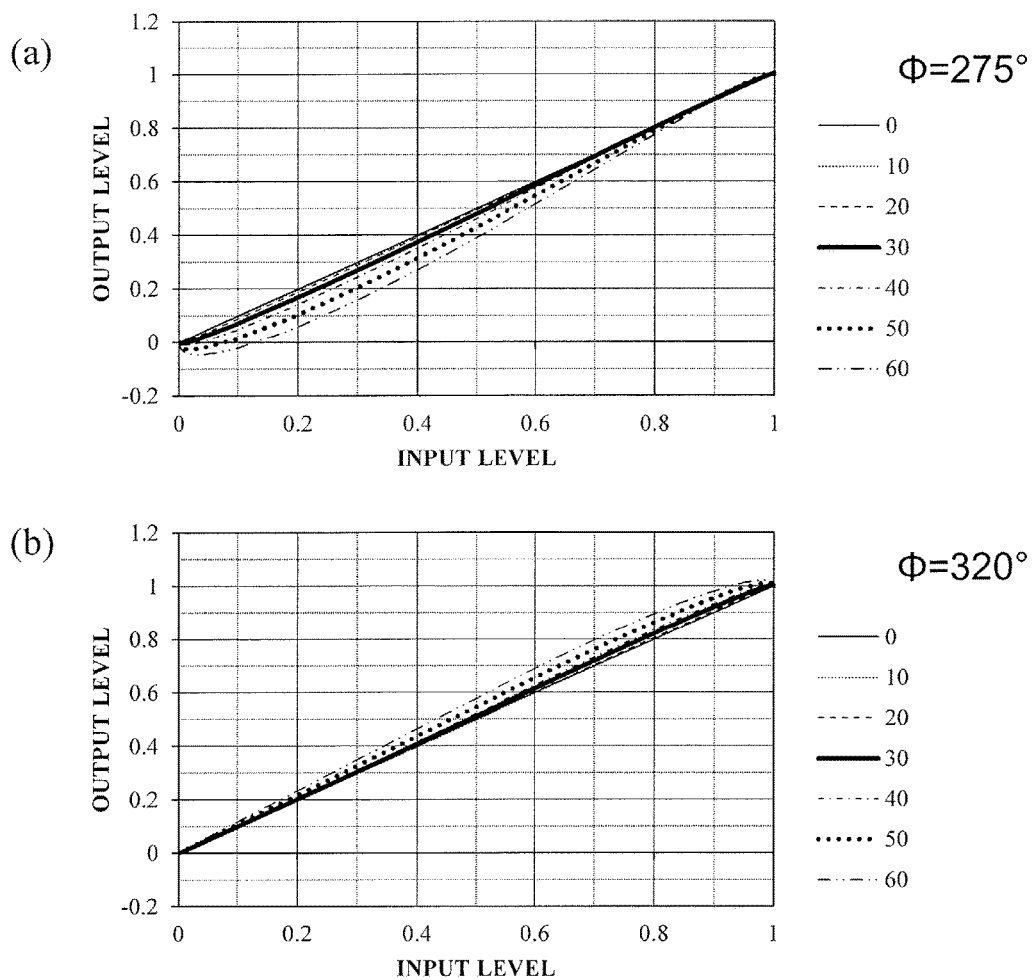
FIG. 18C A graph showing viewing angle dependence of the γ characteristics of the liquid crystal display panel according to Example 2-2 (where the azimuth angle Φ is 275°, 320°).
Figure 19A:
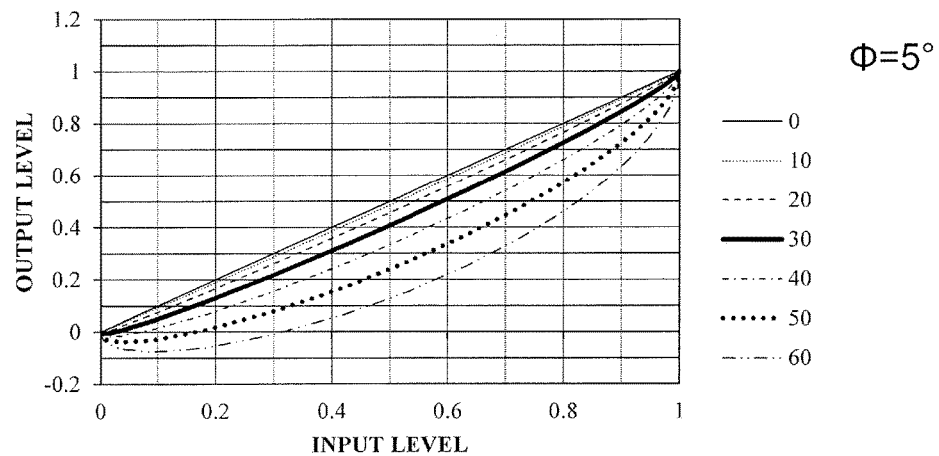
FIG. 19A A graph showing viewing angle dependence of the γ characteristics of the liquid crystal display panel according to Comparative Example 2-2 (where the azimuth angle Φ is 5°, 50°, 95°).
Figure 19A:
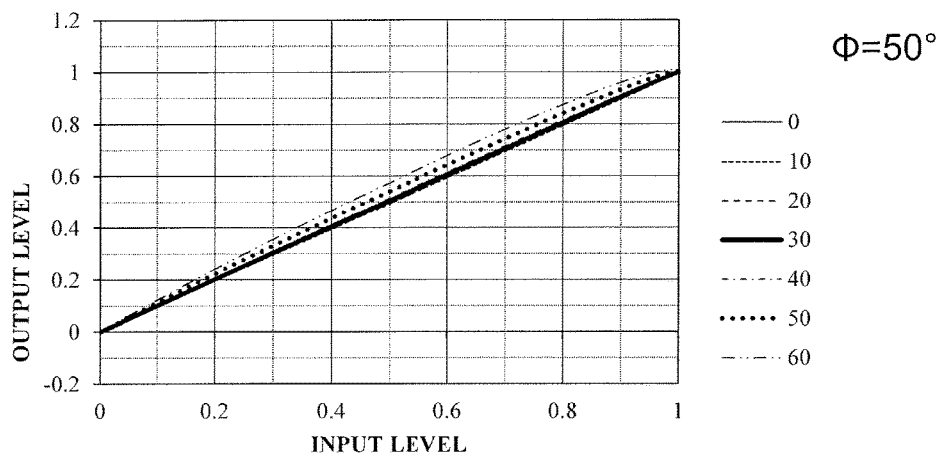
Figure 19A:
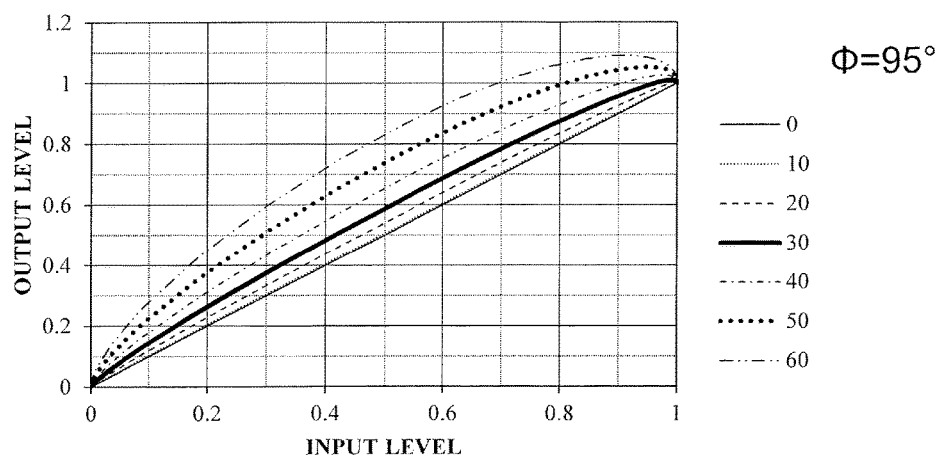
Figure 19B:
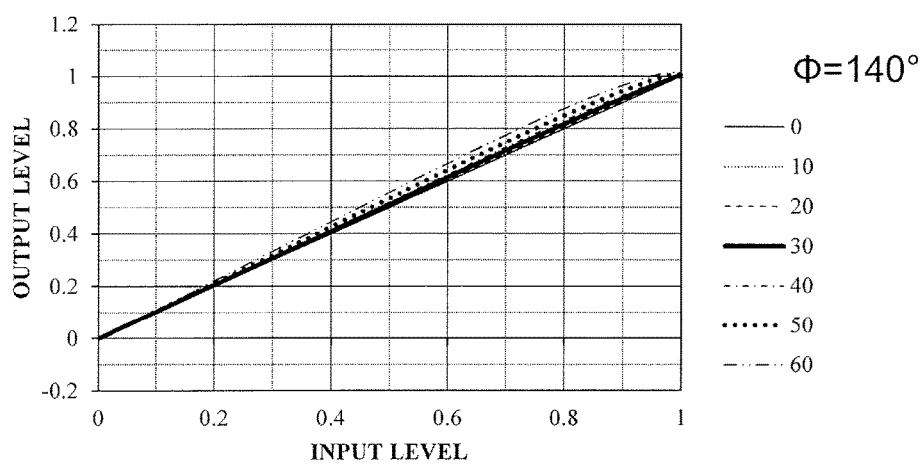
FIG. 19B A graph showing viewing angle dependence of the γ characteristics of the liquid crystal display panel according to Comparative Example 2-2 (where the azimuth angle Φ is 140°, 185°, 230°).
Figure 19B:
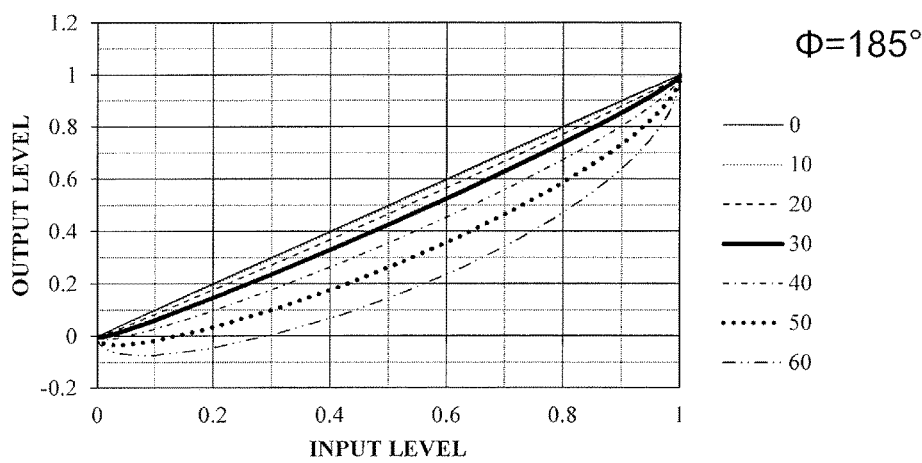
Figure 19B:
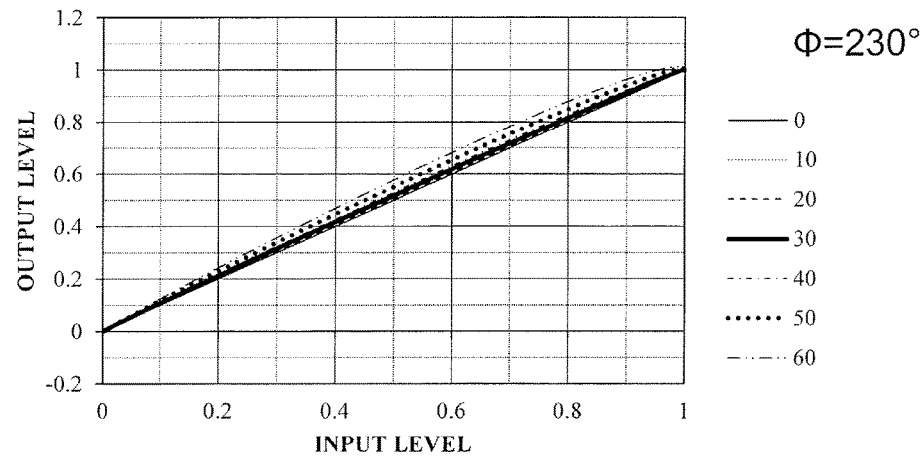
Figure 19C:
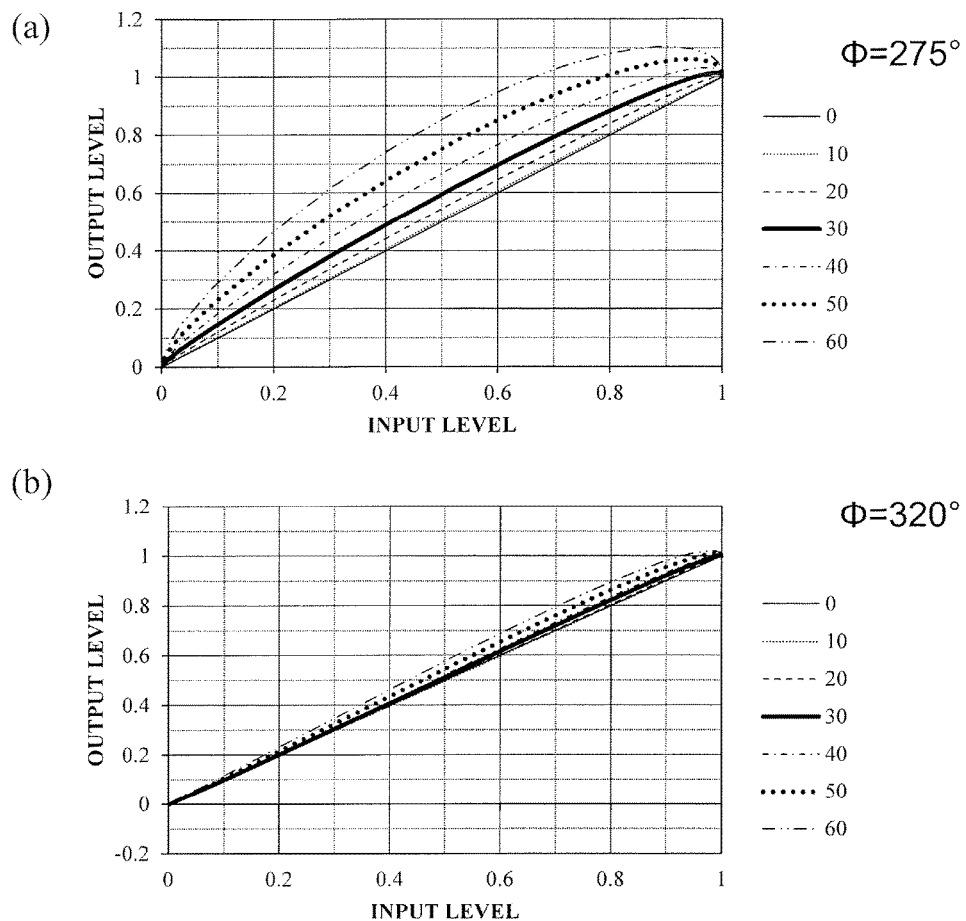
FIG. 19C A graph showing viewing angle dependence of the γ characteristics of the liquid crystal display panel according to Comparative Example 2-2 (where the azimuth angle Φ is 275°, 320°).

Next, graphs representing viewing angle dependence of the γ characteristics of the liquid crystal display panel of Example 2-2 are shown in FIG. 18A(a) to (c), FIG. 18B(a) to (c), and FIG. 18C(a) and (b). These indicate polar angle (θ) dependence of the γ characteristics for, respectively, azimuth angles Φ of 5°, 50°, 95°, 140°, 185°, 230°, 275° and 320° (i.e., azimuth directions which are apart by every 45° from the azimuth direction of the director of the liquid crystal). Graphs representing viewing angle dependence of the γ characteristics of the liquid crystal display panel of Comparative Example 2-2 are shown in FIG. 19A(a) to (c), FIG. 19B(a) to (c), and FIG. 19C(a) and (b). FIGS. 19A through 19C respectively correspond to FIGS. 18A through 18C.

FIGS. 18A through 18C indicate that viewing angle dependence of the γ characteristics of the liquid crystal display panel of Example 2-2 is small at any azimuth angle.

In contrast, viewing angle dependence of the γ characteristics of the liquid crystal display panel of Comparative Example 2-2 as shown in FIGS. 19A through 19C indicates that the viewing angle dependences of γ characteristics at Φ=5°, 95°, 185° and 275° are clearly greater than in Example 2-2.

These indicate that, also when nematic liquid crystal having a positive dielectric anisotropy is used, based on the combinations of the rotation directions of circularly polarized light and the rotation direction of the liquid crystal director (left-handed & left-handed, or right-handed & right-handed) as indicated at Example 2-1 and Example 2-2 of Table 1, a liquid crystal display panel is obtained such that the viewing angle dependence of its γ characteristics is small in any azimuth direction.

Although Condition (1) or (2) is satisfied by the entire pixel aperture in the liquid crystal display panels of Example 2-1 and Example 2-2, the effect of improving the viewing angle dependence of γ characteristics can be obtained even if the entire pixel aperture does not necessarily satisfy Condition (1) or (2).

Figure 20:
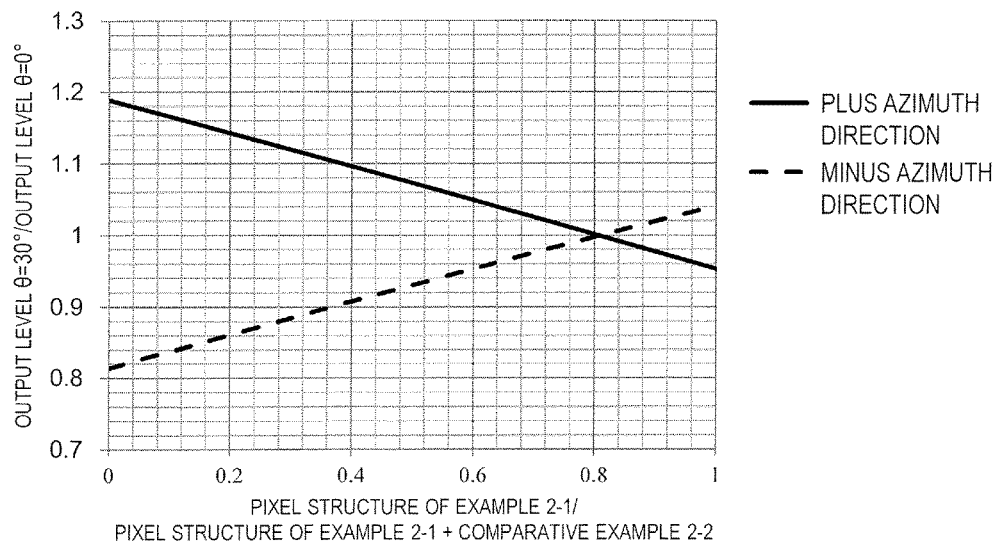
FIG. 20 A graph for a liquid crystal display panel having a mixed pixel structure that includes the pixel structure of Example 2-1 and the pixel structure of Comparative Example 2-2, showing a relationship between: the ratio at which the pixel structures are mixed; and the ratio of the output level value at a polar angle of 30° to the output level value at a polar angle of 0°, given an input level of 0.5.

For example, a result of evaluating the γ characteristics of a liquid crystal display panel having a pixel structure including the pixel structure of Example 2-1 and the pixel structure of Comparative Example 2-2 through simulation is shown in FIG. 20. FIG. 20 is a graph for a liquid crystal display panel having the above mixed pixel structure, showing a relationship between: the ratio at which the pixel structures are mixed; and the ratio of the output level value at a polar angle of 30° to the output level value at a polar angle of 0°, given an input level of 0.5. The plus azimuth direction is the azimuth direction in which the output level becomes the largest, whereas the minus azimuth direction is the azimuth direction in which the output level becomes the smallest.

As can be seen from FIG. 20, when the pixel structure of Example 2-1 accounts for 38% or more, there is ±10% or less of fluctuation in the output level, and thus the viewing angle dependence of γ characteristics can be improved.

Figure 21:
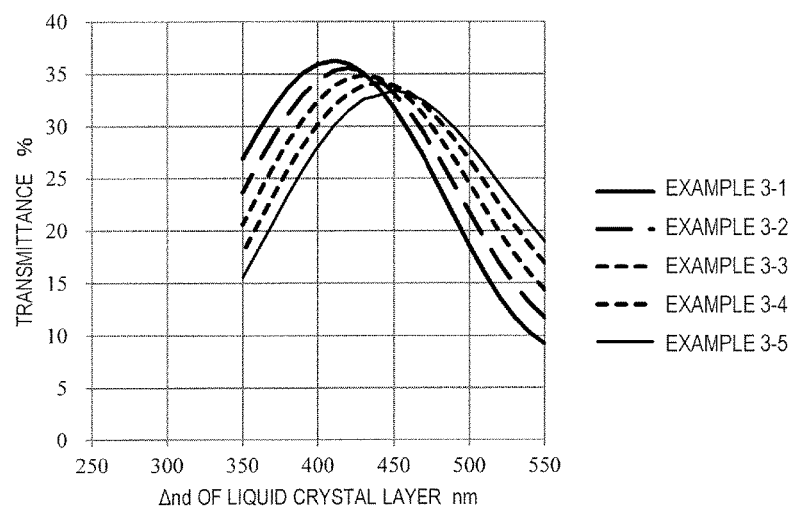
FIG. 21 (*a*) is a graph showing Δnd dependence of the transmittance of the liquid crystal display panels according to Examples 3-1 to 3-5; and (b) is a graph showing Δnd dependence of the transmittance of the liquid crystal display panels according to Comparative Examples 3-1 to 3-3 and 3-5.
Figure 21:
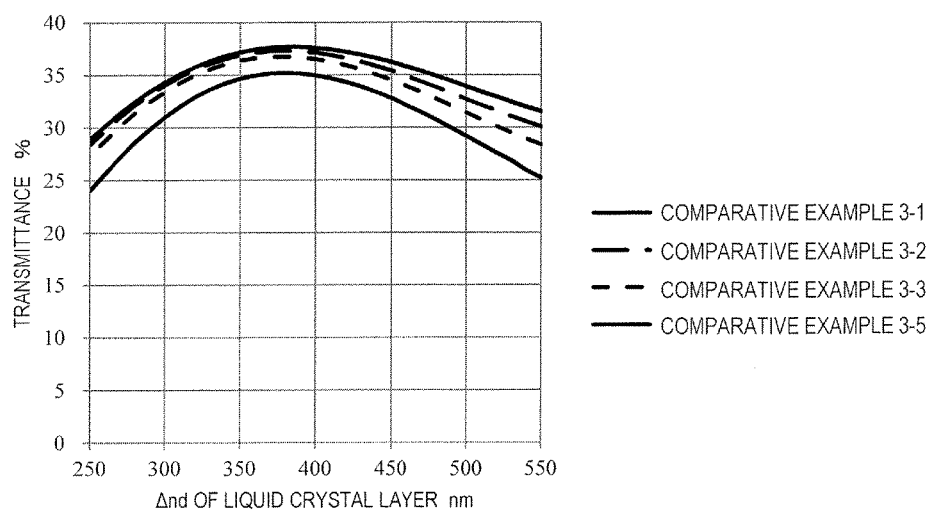

With reference to FIG. 21, a result of studying the tolerable range for Δnd of the liquid crystal layer 18 in the case of using nematic liquid crystal having a negative dielectric anisotropy will be described. In the liquid crystal display panel 100, assuming that the retardation R1 of the first phase plate 32 was 137.5 nm (λ/4), Δnd of the liquid crystal layer 18 was varied between 350 nm and 550 nm, and changes in transmittance were determined. The retardation R2 of the second phase plate 34 was such that R2=Δnd−R1 in each.

Moreover, a simulation was also conducted with respect to liquid crystal display panels with different L+S values in the slit structure of the pixel electrode 16. Table 3 below indicates L+S and L/S of the slit structure used in the simulation.

Moreover, as Comparative Examples 3-1 to 3-3 and 3-5, a simulation was also conducted with respect to conventional FFS mode liquid crystal display panels which had the same construction as do Examples 3-1 to 3-3 and 3-5 but in which the first and second phase plates were omitted.

30% or more can be obtained in a range of Δnd from not less than 370 nm to not more than 450 nm. When L+S is within the range of 5 μm±0.5 μm, a transmittance of 30% or more can be obtained in a range of Δnd from not less than 380 nm to not more than 460 nm. When L+S is within the range of 6 μm±0.5 μm, a transmittance of 30% or more can be obtained in a range of Δnd from not less than 390 nm to not more than 470 nm. When L+S is within the range of 7 μm±0.5 μm, a transmittance of 30% or more can be obtained in a range of Δnd from not less than 400 nm to not more than 480 nm. When L+S is within the range of 8 μm±0.5 μm, a transmittance of 30% or more can be obtained in a range of Δnd from not less than 410 nm to not more than 490 nm.

It can be seen from FIG. 21(b) that transmittances of the liquid crystal display panels of Comparative Examples do not depend much on Δnd, and a Δnd that confers the largest transmittance exists near 380 nm. Compared to this value, the preferable ranges of Δnd for the transmittance of liquid crystal display panels of Examples can be regarded as large. Thus, in the constructions of Examples, regions of high transmittance exist only in limited ranges of Δnd of the liquid crystal layer, unlike in the constructions of Comparative Examples.

TABLE 3

|  | Example 3-1 | Example 3-2 | Example 3-3 | Example 3-4 | Example 3-5 |
| --- | --- | --- | --- | --- | --- |
| first phase plate R1 | 137.5 nm | 137.5 nm | 137.5 nm | 137.5 nm | 137.5 nm |
| liquid crystal layer Δnd | 370 nm~450 nm | 380 nm~460 nm | 390 nm~470 nm | 400 nm~480 nm | 410 nm~490 nm |
| second phase plate R2 | Δnd-R1 | Δnd-R1 | Δnd-R1 | Δnd-R1 | Δnd-R1 |
| L + S | 4 μm | 5 μm | 6 μm | 7 μm | 8 μm |
| L/S | 1.8 μm/2.2 μm 45/55 | 2.2 μm/2.8 μm 44/56 | 2.7 μm/3.3 μm 45/55 | 3.1 μm/3.9 μm 44/56 | 3.6 μm/4.4 μm 45/55 |

FIG. 21(a) is a graph showing Δnd dependence of the transmittance of Examples 3-1 to 3-5; and FIG. 21(b) is a graph showing Δnd dependence of the transmittance of the liquid crystal display panels according to Comparative Examples 3-1 to 3-3 and 3-5.

A comparison between FIG. 21(a) and FIG. 21(b) indicates that, in the liquid crystal display panels of Examples, the transmittance significantly changes depending on L+S in the slit structure, and the transmittance significantly changes depending on Δnd of the liquid crystal layer, unlike in the liquid crystal display panels of Comparative Examples. FIG. 21(a) and Table 3 indicate that, as L+S increases from 4 μm to 8 μm, the Δnd that confers the largest transmittance increases, and a preferable Δnd exists for a given L+S. So long as L+S is not less than 4 μm and not more than 8 μm, it may be said that a Δnd that confers the largest transmittance exists in a range of Δnd from not less than 370 nm to not more than 490 nm. Moreover, a transmittance of 30% or more can be obtained in this range. More preferably, when L+S is within the range of 4 μm±0.5 μm, a transmittance of Note that these results hardly depend on L/S, Δn, and the elastic constant of the liquid crystal material, as will be described later.

Figure 22:
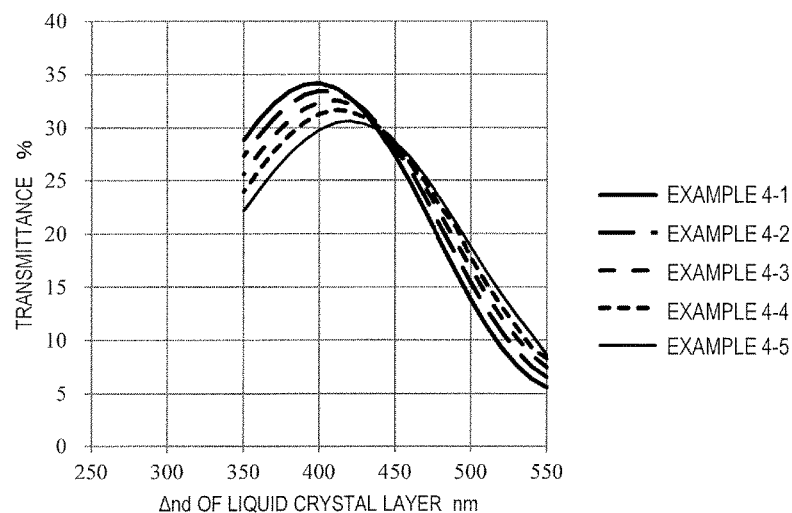
FIG. 22 (*a*) is a graph showing Δnd dependence of the transmittance of the liquid crystal display panels according to Examples 4-1 to 4-5; and (*b*) is a graph showing Δnd dependence of the transmittance of the liquid crystal display panels according to Comparative Examples 4-1 to 4-3 and 4-5.
Figure 22:
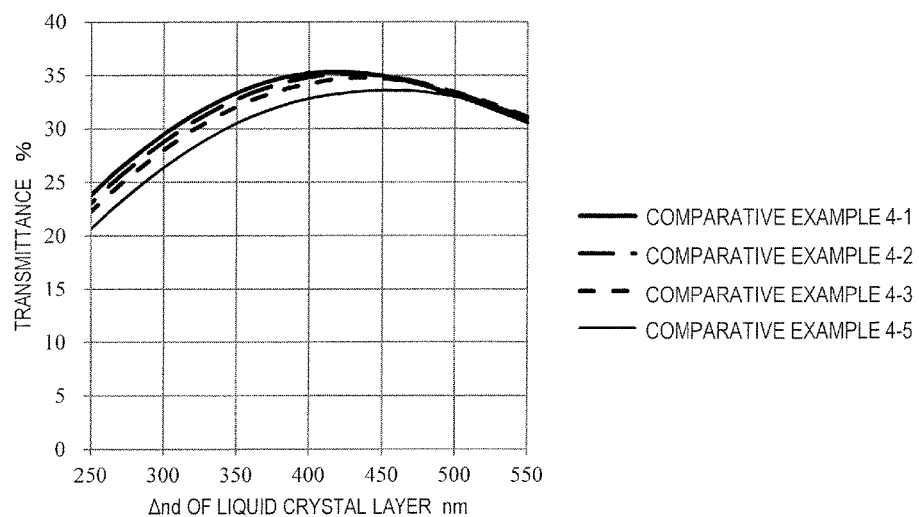

Next, with reference to FIG. 22, a result of studying the tolerable range for Δnd of the liquid crystal layer 18 in the case of using nematic liquid crystal having a positive dielectric anisotropy will be described. Examples 4-1 to 4-5 are identical in construction to Examples 3-1 to 3-5 except that nematic liquid crystal having a positive dielectric anisotropy was used. Because of the use of nematic liquid crystal having a positive dielectric anisotropy, the values of Δnd of the liquid crystal layer and retardation R2 of the second phase plate (=Δnd−R1) are different from the values used in Examples 3-1 to 3-5. Moreover, as Comparative Examples 4-1 to 4-3 and 4-5, a simulation was also conducted with respect to conventional FFS mode liquid crystal display panels which had the same construction as do Examples 4-1 to 4-3 and 4-5 but in which the first and second phase plates were omitted.

TABLE 4

|  | Example 4-1 | Example 4-2 | Example 4-3 | Example 4-4 | Example 4-5 |
| --- | --- | --- | --- | --- | --- |
| first phase plate R1 | 137.5 nm | 137.5 nm | 137.5 nm | 137.5 nm | 137.5 nm |
| liquid crystal layer Δnd | 360 nm~440 nm | 370 nm~440 nm | 370 nm~450 nm | 380 nm~440 nm | 400 nm~440 nm |

TABLE 4-continued

|  | Example 4-1 | Example 4-2 | Example 4-3 | Example 4-4 | Example 4-5 |
|---|---|---|---|---|---|
| second phase plate R2 | Δ nd-R1 | Δ nd-R1 | Δ nd-R1 | Δ nd-R1 | Δ nd-R1 |
| L + S | 4 μm | 5 μm | 6 μm | 7 μm | 8 μm |
| L/S | 1.8 μm/2.2 μm 45/55 | 2.2 μm/2.8 μm 44/56 | 2.7 μm/3.3 μm 45/55 | 3.1 μm/3.9 μm 44/56 | 3.6 μm/4.4 μm 45/55 |

FIG. 22(a) is a graph showing Δnd dependence of the transmittance of Examples 4-1 to 4-5; and FIG. 22(b) is a graph showing Δnd dependence of the transmittance of Comparative Examples 4-1 to 4-3 and 4-5.

A comparison between FIG. 22(a) and FIG. 22(b) indicates that, in the liquid crystal display panels of Examples, the transmittance significantly changes depending on L+S in the slit structure, and the transmittance significantly changes depending on Δnd of the liquid crystal layer, unlike in the liquid crystal display panels of Comparative Examples. FIG. 22(a) and Table 4 indicate that, as L+S increases from 4 μm to 8 μm, the Δnd that is conducive to the largest transmittance increases, and a preferable Δnd exists for a given L+S. So long as L+S is not less than 4 μm and not more than 8 μm, it may be said that a Δnd that confers the largest transmittance exists in a range of Δnd from not less than 360 nm to not more than 440 nm. More preferably, when L+S is within the range of 4 μm±0.5 μm, a transmittance of 30% or more can be obtained in a range of Δnd from not less than 360 nm to not more than 440 nm. When L+S is within the range of 5 μm±0.5 μm, a transmittance of 30% or more can be obtained in a range of Δnd from not less than 370 nm to not more than 440 nm. When L+S is within the range of 6 μm±0.5 μm, a transmittance of 30% or more can be obtained in a range of Δnd from not less than 370 nm to not more than 450 nm. When L+S is within the range of 7 μm±0.5 μm, a transmittance of 30% or more can be obtained in a range of Δnd from not less than 380 nm to not more than 440 nm. When L+S is within the range of 8 μm±0.5 μm, a transmittance of 30% or more can be obtained in a range of Δnd from not less than 400 nm to not more than 440 nm.

It can be seen from FIG. 22(b) that transmittances of the liquid crystal display panels of Comparative Examples do not depend much on Δnd, and a Δnd that confers the largest transmittance exists near 400 nm. Thus, in the constructions of Examples, regions of high transmittance exist only in limited ranges of Δnd of the liquid crystal layer, unlike in the constructions of Comparative Examples.

Figure 23:
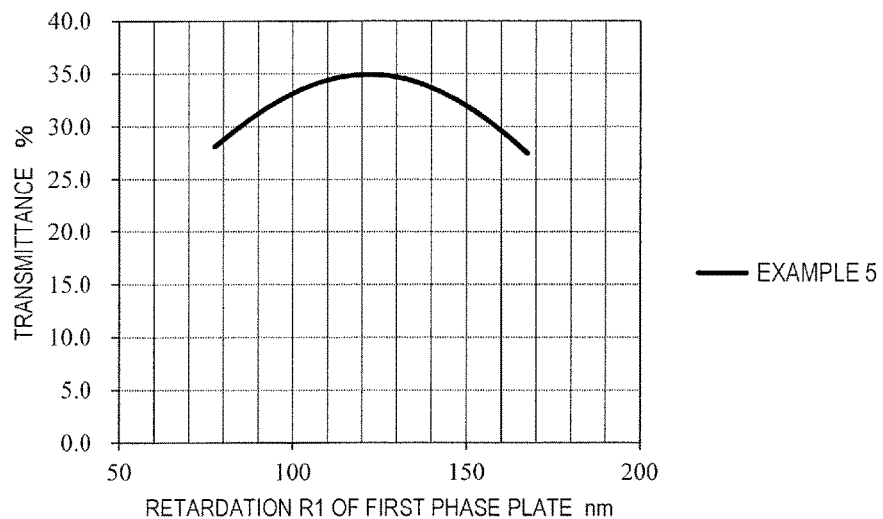
FIG. 23 (*a*) is a graph showing dependence of the transmittance of the liquid crystal display panel according to Example 5 on the retardation R1 of the first phase plate 24; and (*b*) is a graph showing dependence of the contrast ratio of the liquid crystal display panel according to Example 5 under a high illuminance on the retardation R1 of the first phase plate 24.
Figure 23:
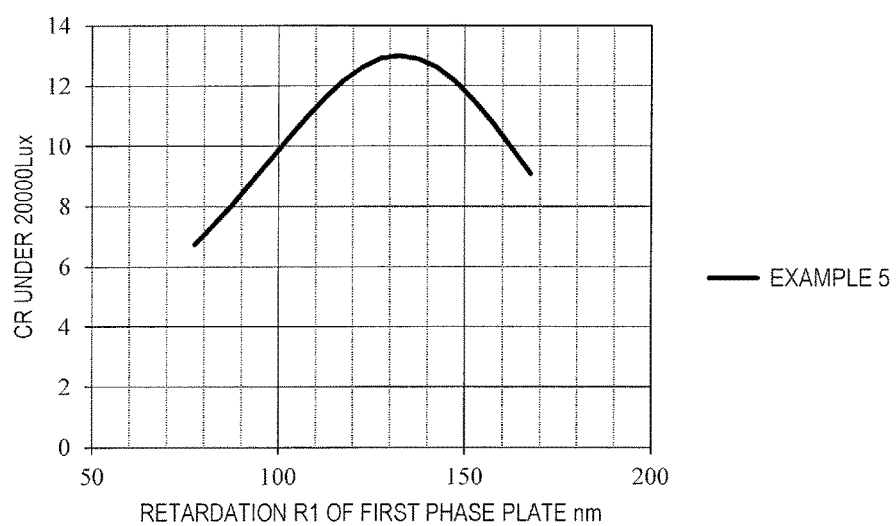

Next, with reference to FIG. 23, a result of studying the tolerable range for retardation R1 of the first phase plate 32 will be described. For a liquid crystal display panel of Example 5 in which, based on the construction of Example 3-3, Δnd of the liquid crystal layer 18 was 412.5 nm and retardation R1 of the first phase plate 32 was varied, transmittances and contrast ratios under a high illuminance were determined through simulation. The retardation R2 of the second phase plate 34 was R2=Δnd−R1. The results are shown in FIGS. 23(a) and (b).

The largest antireflection effect is obtained when the retardation R1 of the first phase plate 32 is 137.5 nm(λ/4). On the other hand, transmittance increases when R1 fails to meet this condition. As can be seen from FIG. 23(a), the maximum value of transmittance exists near 120 nm. The contrast ratio under a high illuminance of 20000 Lux is susceptible to both the degree of antireflection effect and the transmittance. As can be seen from FIG. 23(b), the R1 value at which the contrast ratio takes the maximum value under a high illuminance of 20000 Lux is 130 nm, which is slightly deviated toward the smaller side from 137.5 nm, at which the antireflection effect is maximum. It can be seen from the result of FIG. 23(b) that a contrast ratio of 10 or more is obtained under a high illuminance when R1 is not less than 100 nm and not more than 160 nm.

Figure 24:
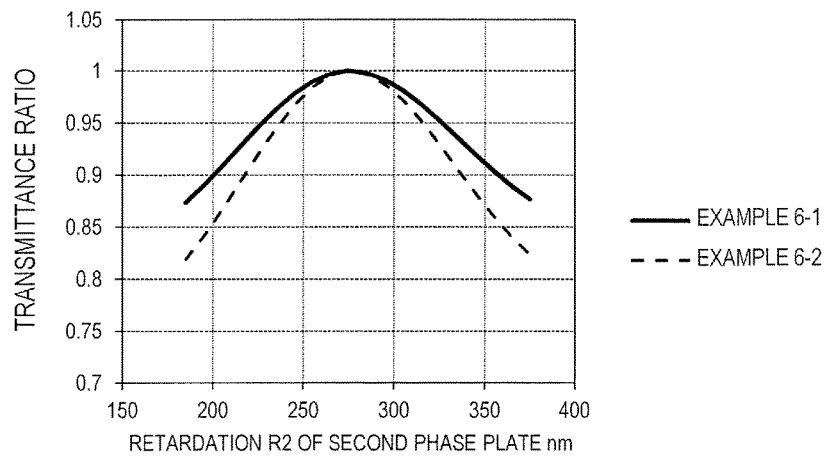
FIG. 24 A graph showing dependence of the luminance ratio of the liquid crystal display panels according to Examples 6-1 and 6-2 on the retardation R2 of the second phase plate 34.

Next, with reference to FIG. 24, a result of studying the tolerable range for retardation R2 of the second phase plate 34 will be described. Based on the construction of Example 3-3, retardation R1 of the first phase plate 32 was set to 137.5 nm(λ/4) and the value of retardation R2 of the second phase plate 34 was varied, and transmittance ratios were determined through simulation. The Δnd of the liquid crystal layer was Δnd=R1+R2. Transmittance ratios were determined for two liquid crystal display panels, namely, Example 6-1 with an aperture ratio of 50% and Example 6-2 with an aperture ratio of 30%. Herein, the transmittance ratio is a value based on the transmittance when the second phase plate 34 had a retardation R2 of 275 nm(λ/2) in each of Examples 6-1 and 6-2 being defined as 1. The result is shown in FIG. 24. As can be seen from FIG. 24, light which has been reflected toward the backlight enjoys a high efficiency of reutilization when the retardation R2 of the second phase plate 34 is 275 nm(λ/2). This remains the same when the aperture ratio is 30% or 50%. From FIG. 24, the retardation R2 of the second phase plate is preferably not less than 200 nm and not more than 360 nm, and more preferably not less than 220 nm and not more than 330 nm. As the aperture ratio of the liquid crystal display panel decreases, it is more preferable that the retardation R2 of the second phase plate is near 275 nm.

Figure 25:
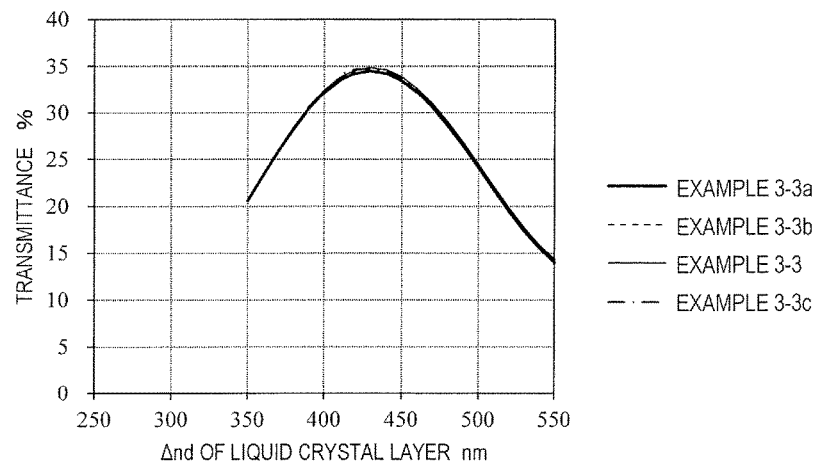
FIG. 25 A graph showing Δnd dependence of the transmittance of liquid crystal display panels (Examples 3-3a, 3-3b, 3-3c) with varying L/S.

Next, with respect to liquid crystal display panels according to Example 3-3 being structured so that the Δnd of the liquid crystal layer was 412.5 nm, results of determining transmittances of liquid crystal display panels (Examples 3-3a, 3-3b, 3-3c) in which L/S was varied are shown in FIG. 25. L/S values in the liquid crystal display panels of Examples 3-3a, 3-3b and 3-3c are shown in Table 5 below.

TABLE 5

|  | Example 3-3 | Example 3-3a | Example 3-3b | Example 3-3c |
|---|---|---|---|---|
| liquid crystal layer Δnd | 412.5 nm | 412.5 nm | 412.5 nm | 412.5 nm |
| L + S | 6 μm | 6 μm | 6 μm | 6 μm |
| L/S | 2.7 μm/3.3 μm 45/55 | 3.3 μm/2.7 μm 55/45 | 3.0 μm/3.0 μm 50/50 | 2.5 μm/3.5 μm 42/58 |

As can be seen from FIG. 25, transmittance is hardly affected by L/S in a range of L/S from more than 40/60 to not more than 55/45.

Figure 26:
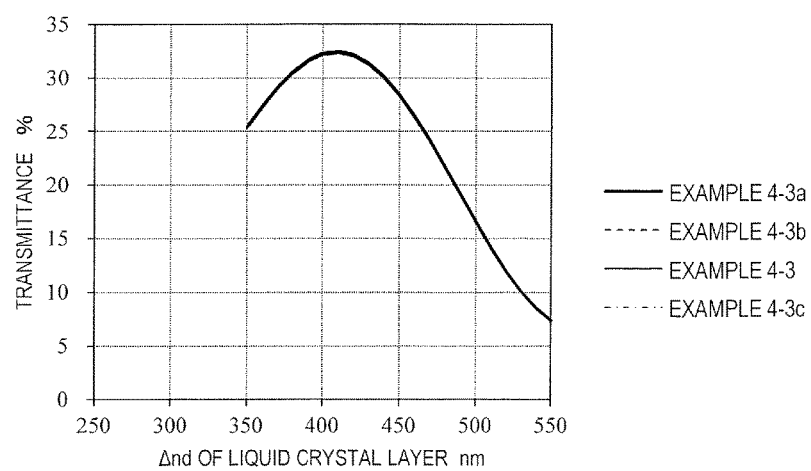
FIG. 26 A graph showing Δnd dependence of the transmittance of liquid crystal display panels (Examples 4-3a, 4-3b, 4-3c) with varying L/S.

Next, with respect to liquid crystal display panels according to Example 4-3 being structured so that the Δnd of the liquid crystal layer was 412.5 nm, results of determining transmittances of liquid crystal display panels (Examples 4-3a, 4-3b, 4-3c) in which L/S was varied are shown in FIG. 26. L/S values in the liquid crystal display panels of Examples 4-3a, 4-3b and 4-3c are shown in Table 6 below.

TABLE 6

|  | Example 4-3 | Example 4-3a | Example 4-3b | Example 4-3c |
|---|---|---|---|---|
| liquid crystal layer Δ nd | 412.5 nm | 412.5 nm | 412.5 nm | 412.5 nm |
| L + S | 6 μm | 6 μm | 6 μm | 6 μm |
| L/S | 2.7 μm/3.3 μm 45/55 | 3.3 μm/2.7 μm 55/45 | 3.0 μm/3.0 μm 50/50 | 2.5 μm/3.5 μm 42/58 |

As can be seen from FIG. 26, also when nematic liquid crystal having a positive dielectric anisotropy is used, transmittance is hardly affected by L/S in a range of L/S from more than 40/60 to not more than 55/45.

Figure 27:
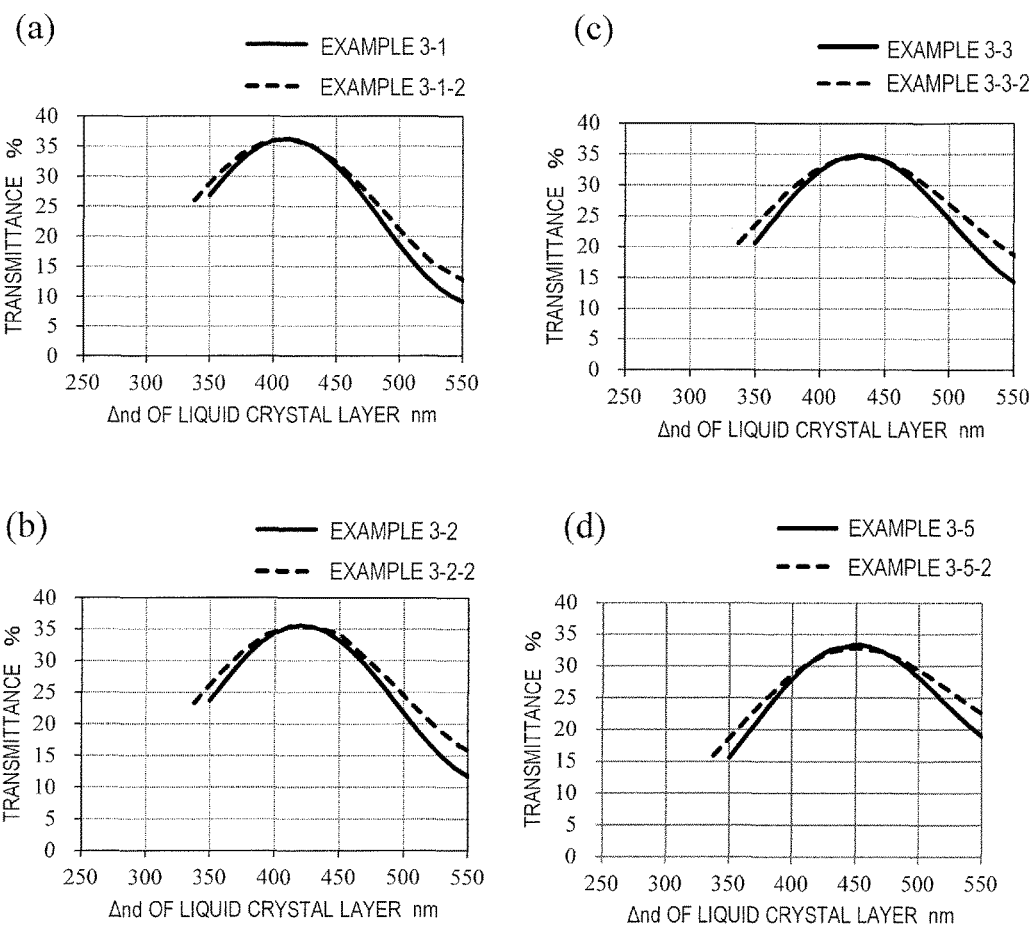
FIG. 27 (*a*) to (*d*) are graphs showing Δnd dependence of the transmittance of liquid crystal display panels (Examples 3-1-2, 3-2-2, 3-3-2, 3-5-2) with varying Δn but fixed d.
Figure 28:
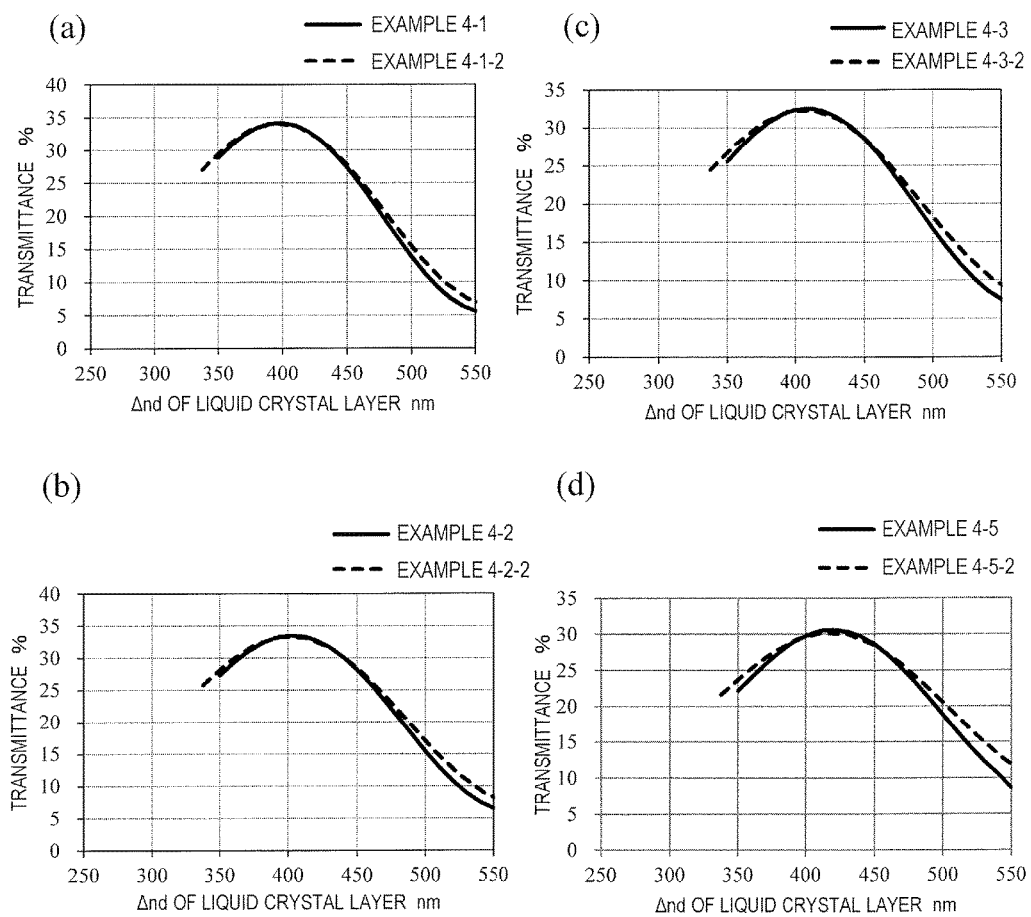
FIG. 28 (*a*) to (*d*) are graphs showing Δnd dependence of the transmittance of liquid crystal display panels (Examples 4-1-2, 4-2-2, 4-3-2, 4-5-2) with varying Δn but fixed d.

Next, with reference to FIG. 27 and FIG. 28, a result of studying the effect of Δn of the liquid crystal material will be described. In the aforementioned Examples 3-1, 3-2, 3-3 and 3-5, Δnd of the liquid crystal layer was varied by allowing d to vary, while fixing Δn. For the respective cases, simulation results obtained by allowing Δn to vary while fixing d are shown in FIGS. 27(a) to (d) as Examples 3-1-2, 3-2-2, 3-3-2 and 3-5-2. Similarly for the aforementioned Examples 4-1, 4-2, 4-3 and 4-5 in which nematic liquid crystal having a positive dielectric anisotropy was used, simulation results obtained by allowing Δn to vary while fixing d are shown in FIGS. 28(a) to (d) as Examples 4-1-2, 4-2-2, 4-3-2 and 4-5-2.

As can be seen from FIGS. 27(a) to (d) and FIGS. 28(a) to (d), given the same Δnd, the influence of d is small.

Figure 29:
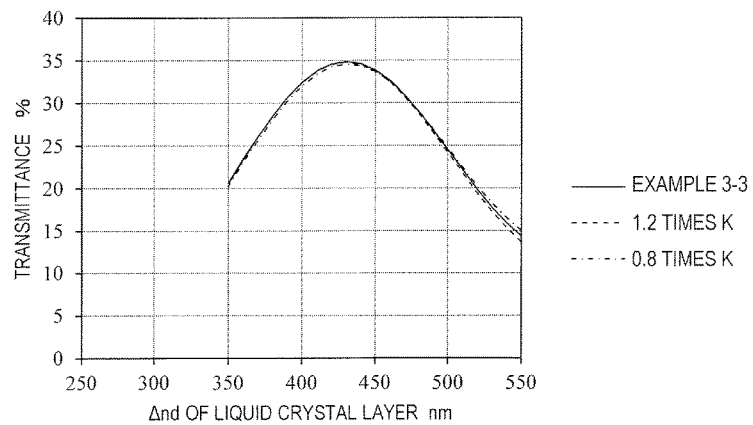
FIG. 29 A graph showing a result where elastic constants K of different values are used in a Δnd dependence simulation of the transmittance of the liquid crystal display panel according to Example 3-3.

FIG. 29 shows results of using a value which is 1.2 times greater, and a value which is 0.8 times greater, than the elastic constant of the liquid crystal material used in the simulation of Example 3-3. As can be seen from FIG. 29, the value of the elastic constant does not affect the aforementioned simulation results, either.

The above embodiment illustrates a liquid crystal display panel according to an embodiment of the present invention with respect to an exemplary liquid crystal display panel in which the lower substrate is a TFT substrate and the lower substrate has an electrode pair to generate a lateral electric field across the liquid crystal layer; alternatively, the upper substrate may be a TFT substrate, and the upper substrate may have the electrode pair to generate a lateral electric field across the liquid crystal layer. In a liquid crystal display panel according to an embodiment of the present invention, the first phase plate and the first polarizer basically function as a circular polarizer, so that reflected light from wiring lines or the like that are formed on the TFT substrate is reduced. Therefore, display quality will not be degraded even if a TFT substrate is used as the upper substrate.

A liquid crystal display panel according to an embodiment of the present invention can be produced by using any known method for producing a liquid crystal cell of a lateral electric field mode. Moreover, the step of attaching a polarizer and a phase plate in predetermined directions onto the liquid crystal cell may of course be performed by a known method.

The liquid crystal cell 10 of the liquid crystal display panel 100 may be produced in the following manner, for example.

A lower substrate 10Sa is produced by a known method. For example, on a glass substrate 12a, circuit elements such as TFTs, gate bus lines, source bus lines, common lines are formed. Thereafter, a common electrode 14, a dielectric layer 15, and pixel electrodes 16 are formed. An alignment film is formed on the surface of the lower substrate 10Sa that is closer to the liquid crystal layer 18. The alignment film is subjected to a rubbing treatment, for example, in order to align liquid crystal molecules near the lower substrate 10Sa in a predetermined direction.

An upper substrate 10Sb which has been produced by a known method is provided. The upper substrate 10Sb has a black matrix and a color filter layer on e.g., a glass substrate 12b, and an alignment film on the liquid crystal layer 18 side. The alignment film is subjected to a rubbing treatment, for example, in order to align liquid crystal molecules near the upper substrate 10Sb in a predetermined direction.

While controlling the thickness of the liquid crystal layer 18 with spacers which are formed on the lower substrate 10Sa or the upper substrate 10Sb, the liquid crystal layer 18 is formed by e.g., a drop injection method, and the lower substrate 10Sa and the upper substrate 10Sb are attached together, thus producing the liquid crystal cell 10.

It will be appreciated that the alignment treatment for the alignment films is not limited to a rubbing treatment. A photo-alignment treatment may be performed by using a photo-alignment film. Moreover, a rubbing treatment and a photo-alignment treatment may be combined.

The TFTs in the liquid crystal display panel 100 according to an embodiment of the present invention may be known TFTs such as amorphous silicon TFTs (a-Si TFTs), polysilicon TFTs (p-Si TFTs), or microcrystalline silicon TFTs (μC-Si TFTs); however, it is preferable to use TFTs (oxide TFTs) that include an oxide semiconductor layer. Use of oxide TFTs reduces the geometric area of TFTs, thus allowing for an increased pixel aperture ratio.

The oxide semiconductor layer may contain at least one metallic element of In, Ga and Zn, for example. The oxide semiconductor layer may contain an In—Ga—Zn—O-based semiconductor, for example. Herein, the In—Ga—Zn—O-based semiconductor is a ternary oxide of In (indium), Ga (gallium) and Zn (zinc), where the ratio between In, Ga and Zn (composition ratio) is not particularly limited, including In:Ga:Zn=2:2:1, In:Ga:Zn=1:1:1, In:Ga:Zn=1:1:2, and the like, for example. Such an oxide semiconductor layer may be made of an oxide semiconductor film containing an In—Ga—Zn—O-based semiconductor. Note that a channel-etch type TFT having an active layer which contains an In—Ga—Zn—O-based semiconductor may be referred to as a "CE-InGaZnO-TFT".

The In—Ga—Zn—O-based semiconductor may be amorphous or crystalline. As a crystalline In—Ga—Zn—O-based semiconductor, a crystalline In—Ga—Zn—O-based semiconductor whose c axis is oriented generally perpendicular to the layer plane is preferable.

Crystal structures of crystalline In—Ga—Zn—O-based semiconductors are disclosed in, for example, Japanese Laid-Open Patent Publication No. 2014-007399, Japanese Laid-Open Patent Publication No. 2012-134475, Japanese Laid-Open Patent Publication No. 2014-209727, and so on. The entire disclosure of Japanese Laid-Open Patent Publication No. 2012-134475 and Japanese Laid-Open Patent Publication No. 2014-209727 is incorporated herein for reference. A TFT including an In—Ga—Zn—O-based semiconductor layer has a high mobility (more than 20 times that of an a-Si TFT) and a low leakage current (less than 1/100 of that of an a-Si TFT), and therefore is suitably used as a driving TFT or a pixel TFT.

Instead an In—Ga—Zn—O-based semiconductor, the oxide semiconductor layer may contain other oxide semiconductors. For example, it may contain an In—Sn—Zn—O-based semiconductor (e.g., $In_2O_3$—$SnO_2$—ZnO). An In—Sn—Zn—O-based semiconductor is a ternary oxide of In (indium), Sn (tin) and Zn (zinc). Alternatively, the oxide semiconductor layer may contain an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, CdO (cadmium oxide), an Mg—Zn—O-based semiconductor, an In—Ga—Sn—O-based semiconductor, an In—Ga—O-based semiconductor, a Zr—In—Zn—O-based semiconductor, an Hf—In—Zn—O-based semiconductor, or the like.

INDUSTRIAL APPLICABILITY

The present invention is broadly applicable to liquid crystal display panels of lateral electric field modes. In particular, it is suitably used in liquid crystal display panels of lateral electric field modes for outdoor use.

REFERENCE SIGNS LIST 10 liquid crystal cell
10Sa lower substrate (first substrate)
10Sb upper substrate (second substrate)
12a, 12b transparent substrate (glass substrate)
14 common electrode
15 dielectric layer
16 pixel electrode
16a aperture (slit) in pixel electrode
22 first polarizer
24 second polarizer
32 first phase plate
34 second phase plate
100 liquid crystal display panel

The invention claimed is:

1. A liquid crystal display panel comprising:
a liquid crystal cell including a lower substrate, an upper substrate on a viewer's side of the lower substrate, a liquid crystal layer provided between the lower substrate and the upper substrate, and an electrode pair formed on one of the lower substrate and the upper substrate to generate a lateral electric field across the liquid crystal layer;
a first polarizer disposed on the viewer's side of the liquid crystal cell;
a first phase plate disposed between the liquid crystal layer and the first polarizer;
a second polarizer disposed on a rear face side of the liquid crystal cell; and
a second phase plate disposed between the second polarizer and the liquid crystal layer, wherein,
the liquid crystal layer contains nematic liquid crystal, and takes a homogeneous alignment in the absence of an applied electric field, such that $\Delta nd$ is not less than 360 nm and not more than 490 nm, where $\Delta n$ is a birefringence of the nematic liquid crystal and d is a thickness of the liquid crystal layer;
a retardation R1 of the first phase plate is not less than 100 nm and not more than 160 nm;
a retardation R2 of the second phase plate is not less than 200 nm and not more than 360 nm; and
a slow axis of the first phase plate and a slow axis of the second phase plate are substantially parallel to each other, and substantially orthogonal to an azimuth direction of a director of the nematic liquid crystal under a homogeneous alignment, wherein,
the electrode pair includes a pixel electrode having a plurality of rectangular apertures extending in parallel to one another, and a common electrode formed opposite to the pixel electrode with a dielectric layer interposed therebetween; and
L+S is not less than 4 μm and not more than 8 μm, where S is a width of the aperture and L is a distance between adjacent ones of the apertures.

2. The liquid crystal display panel of claim 1, having a plurality of pixels, wherein a structure corresponding to each of the plurality of pixels has a region in which an azimuth direction of the director, an azimuth direction of the lateral electric field, and azimuth directions of the slow axes of the first and second phase plates are set so that the director of the nematic liquid crystal on the lower substrate is rotated in a left-handed direction by the lateral electric field, and light which has passed through the first phase plate from the viewer's side becomes left-handed circularly polarized light or left-handed elliptically polarized light; or the director of the nematic liquid crystal on the lower substrate is rotated in a right-handed direction by the lateral electric field, and light which has passed through the first phase plate from the viewer's side becomes right-handed circularly polarized light or right-handed elliptically polarized light.

3. The liquid crystal display panel of claim 1, wherein $\Delta nd$ of the liquid crystal layer is substantially equal to a sum R1+R2 of the retardation R1 of the first phase plate and the retardation R2 of the second phase plate.

4. The liquid crystal display panel of claim 1, wherein the retardation R2 of the second phase plate is not less than 220 nm and not more than 330 nm.

5. The liquid crystal display panel of claim 1, wherein L/S is more than 40/60 but not more than 55/45.

6. The liquid crystal display panel of claim 1, wherein the nematic liquid crystal has a negative dielectric anisotropy.

* * * * *